US012782688B2

(12) United States Patent
Huang et al.

(10) Patent No.: US 12,782,688 B2
(45) Date of Patent: Nov. 3, 2026

(54) IMAGING OPTICAL LENS ASSEMBLY, IMAGE CAPTURING UNIT AND ELECTRONIC DEVICE

(71) Applicant: LARGAN INDUSTRIAL OPTICS CO., LTD., Taichung City (TW)

(72) Inventors: Hsuan-Chin Huang, Taichung City (TW); Shiu Sheng Li, Taichung City (TW); Yu-Han Shih, Taichung City (TW); Guan-Jr Liao, Taichung City (TW)

(73) Assignee: LARGAN INDUSTRIAL OPTICS CO., LTD., Taichung City (TW)

( * ) Notice: Subject to any disclaimer, the term of this patent is extended or adjusted under 35 U.S.C. 154(b) by 304 days.

(21) Appl. No.: 18/630,857

(22) Filed: Apr. 9, 2024

(65) Prior Publication Data

US 2026/0118633 A1 Apr. 30, 2026

(30) Foreign Application Priority Data

Feb. 21, 2024 (TW) ................................ 113106069

(51) Int. Cl.
*G02B 13/00* (2006.01)
*G02B 1/04* (2006.01)
(Continued)

(52) U.S. Cl.
CPC ......... *G02B 13/0045* (2013.01); *G02B 1/041* (2013.01); *G02B 9/64* (2013.01);
(Continued)

(58) Field of Classification Search
CPC ...... G02B 1/041; G02B 9/64; G02B 13/0045; G02B 13/006; G02B 13/0065;
(Continued)

(56) References Cited

U.S. PATENT DOCUMENTS 5,155,629 A 10/1992 Ito et al.
5,625,495 A 4/1997 Moskovich
(Continued)

FOREIGN PATENT DOCUMENTS

CN 101339290 A 1/2009
CN 101520546 A 9/2009
(Continued)

OTHER PUBLICATIONS

UK Search Report dated Jun. 13, 2025 as received in application No. 2500253.6.

*Primary Examiner* — Jonathan Y Jung
(74) *Attorney, Agent, or Firm* — Maschoff Brennan

(57) ABSTRACT

An imaging optical lens assembly includes eight lens elements which are, in order from an object side to an image side: a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side. The fourth lens element has positive refractive power. The fifth lens element has positive refractive power. The object-side surface of the seventh lens element is concave in a paraxial region thereof. The object-side surface of the eighth lens element has at least one inflection point. The imaging optical lens assembly further includes an aperture stop disposed between an imaged object and the fourth lens element.

29 Claims, 35 Drawing Sheets

(51) Int. Cl.
*G02B 9/64* (2006.01)
*H04N 23/55* (2023.01)

(52) U.S. Cl.
CPC ....... *G02B 13/006* (2013.01); *G02B 13/0065* (2013.01); *H04N 23/55* (2023.01)

(58) Field of Classification Search
CPC .......... G02B 13/04; G02B 13/06; G02B 9/62; G03B 30/00; H04N 23/55
See application file for complete search history.

(56) References Cited

U.S. PATENT DOCUMENTS

| | | | | |
|---|---|---|---|---|
| 5,912,771 | A | 6/1999 | Ozaki et al. | |
| 5,940,220 | A | 8/1999 | Suenaga et al. | |
| 6,169,635 | B1 | 1/2001 | Ozaki et al. | |
| 6,366,400 | B1 | 4/2002 | Ohzawa | |
| 8,064,143 | B2 | 11/2011 | Tomioka | |
| 9,753,261 | B2 | 9/2017 | Yamamoto | |
| 10,386,602 | B2 | 8/2019 | Chen et al. | |
| 11,002,942 | B2 | 5/2021 | Chen et al. | |
| 11,137,576 | B2 | 10/2021 | Kuo | |
| 11,506,869 | B2 | 11/2022 | Zeng et al. | |
| 11,782,249 | B2 | 10/2023 | Hua et al. | |
| 2015/0103413 | A1 | 4/2015 | Uchida et al. | |
| 2019/0053695 | A1 | 2/2019 | Fujii et al. | |
| 2020/0012078 | A1 | 1/2020 | Kuo | |
| 2020/0393652 | A1 | 12/2020 | Kuo | |
| 2021/0037183 | A1 | 2/2021 | Pang et al. | |
| 2021/0349288 | A1 | 11/2021 | Ke | |
| 2021/0396959 | A1* | 12/2021 | Tseng | G02B 3/04 |
| 2022/0026691 | A1 | 1/2022 | Chang et al. | |
| 2022/0236533 | A1 | 7/2022 | Takahashi et al. | |
| 2022/0236541 | A1 | 7/2022 | Kurokawa et al. | |
| 2022/0326482 | A1* | 10/2022 | Kuo | G02B 9/64 |
| 2022/0404582 | A1* | 12/2022 | Huang | G02B 27/0025 |
| 2023/0086139 | A1 | 3/2023 | Wang et al. | |
| 2023/0133460 | A1 | 5/2023 | Yang et al. | |
| 2024/0231044 | A1* | 7/2024 | Lin | G02B 13/0045 |

FOREIGN PATENT DOCUMENTS

| | | | |
|---|---|---|---|
| CN | 204832653 | U | 12/2015 |
| CN | 204883011 | U | 12/2015 |
| CN | 204989599 | U | 1/2016 |
| CN | 204989601 | U | 1/2016 |
| CN | 204989602 | U | 1/2016 |
| CN | 108363162 | A | 8/2018 |
| CN | 108363163 | A | 8/2018 |
| CN | 110376716 | A | 10/2019 |
| CN | 110609378 | A | 12/2019 |
| CN | 111239970 | A | 6/2020 |
| CN | 111258035 | A | 6/2020 |
| CN | 111367061 | A | 7/2020 |
| CN | 211123453 | U | 7/2020 |
| CN | 211979308 | U | 11/2020 |
| CN | 112955804 | A | 6/2021 |
| CN | 114002832 | A | 2/2022 |
| CN | 114815179 | A | 7/2022 |
| CN | 217060614 | U | 7/2022 |
| CN | 115047602 | A | 9/2022 |
| CN | 115291364 | A | 11/2022 |
| CN | 218158528 | U | 12/2022 |
| CN | 115826195 | A | 3/2023 |
| CN | 115826201 | A | 3/2023 |
| CN | 116184626 | A | 5/2023 |
| CN | 218956900 | U | 5/2023 |
| CN | 115185061 | B | 6/2023 |
| CN | 116482839 | A | 7/2023 |
| CN | 117031693 | A | 11/2023 |
| DE | 20 2023 106 881 | U1 | 12/2023 |
| JP | S60-55311 | A | 3/1985 |
| JP | H11-223768 | A | 8/1999 |
| JP | 2000-241705 | A | 9/2000 |
| JP | 2015-184304 | A | 10/2015 |
| TW | 202204959 | A | 2/2022 |
| TW | M632271 | U | 9/2022 |
| WO | 2021/164013 | A1 | 8/2021 |
| WO | 2021/189463 | A1 | 9/2021 |
| WO | 2022/082760 | A1 | 4/2022 |
| WO | 2022/102299 | A1 | 5/2022 |

* cited by examiner

10

500

IMAGING OPTICAL LENS ASSEMBLY, IMAGE CAPTURING UNIT AND ELECTRONIC DEVICE

RELATED APPLICATIONS

This application claims priority to Taiwan Application 113106069, filed on Feb. 21, 2024, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

Preferably, the fourth lens element has positive refractive power. Preferably, the fifth lens element has positive refractive power. Preferably, the object-side surface of the seventh lens element is concave in a paraxial region thereof. Preferably, the object-side surface of the eighth lens element has at least one inflection point. Preferably, the imaging optical lens assembly further includes an aperture stop disposed between an imaged object and the fourth lens element.

When an axial distance between the object-side surface of the first lens element and an image surface is TL, a focal length of the imaging optical lens assembly is f, an axial distance between the first lens element and the second lens element is T12, an axial distance between the third lens element and the fourth lens element is T34, and a central thickness of the sixth lens element is CT6, the following conditions are preferably satisfied:

$$3.00 < TL/f < 6.00; \text{ and}$$

$$0.05 < (T12 + T34)/CT6 < 1.50.$$

According to another aspect of the present disclosure, an imaging optical lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

Preferably, the fifth lens element has positive refractive power. Preferably, the sixth lens element has positive refractive power. Preferably, the image-side surface of the fourth lens element is convex in a paraxial region thereof. Preferably, the object-side surface of the eighth lens element is convex in a paraxial region thereof. Preferably, the object-side surface of the eighth lens element has at least one inflection point. Preferably, the imaging optical lens assembly further includes an aperture stop disposed between an imaged object and the fourth lens element.

When an axial distance between the object-side surface of the first lens element and an image surface is TL, a focal length of the imaging optical lens assembly is f, a focal length of the second lens element is f2, a focal length of the third lens element is f3, a focal length of the eighth lens element is f8, a curvature radius of the object-side surface of the sixth lens element is R11, and a curvature radius of the image-side surface of the sixth lens element is R12, the following conditions are preferably satisfied:

$$3.00 < TL/f < 6.00;$$

$$-1.50 < f/f2 + f/f3 + f/f8 < 0.38; \text{ and}$$

$$-3.00 < (R11 + R12)/(R11 - R12) < 3.00.$$

According to another aspect of the present disclosure, an imaging optical lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

Preferably, the fourth lens element has positive refractive power. Preferably, the fifth lens element has positive refractive power. Preferably, the sixth lens element has positive refractive power. Preferably, the image-side surface of fifth lens element is convex in a paraxial region thereof. Preferably, the object-side surface of the eighth lens element has at least one inflection point. Preferably, the imaging optical lens assembly further includes an aperture stop disposed between an imaged object and the fourth lens element.

When an axial distance between the object-side surface of the first lens element and an image surface is TL, a focal length of the imaging optical lens assembly is f, an Abbe number of the third lens element is V3, an Abbe number of the seventh lens element is V7, and an Abbe number of the eighth lens element is V8, the following conditions are preferably satisfied:

$$3.00 < TL/f < 6.00; \text{and}$$

$$18.0 < V3 + V7 + V8 < 105.0.$$

According to another aspect of the present disclosure, an image capturing unit includes one of the aforementioned imaging optical lens assemblies and an image sensor, wherein the image sensor is disposed on the image surface of the imaging optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements of the imaging optical lens assembly has an object-side surface facing toward the object side and an image-side surface facing toward the image side.

The first lens element can have negative refractive power. Therefore, it is favorable for cooperating with the positioning of the aperture stop so as to increase the size of image surface. The image-side surface of the first lens element can be concave in a paraxial region thereof. Therefore, it is favorable for adjusting the traveling direction of light so as to enhance the light-gathering ability of the imaging optical lens assembly.

The fourth lens element can have positive refractive power. Therefore, it is favorable for balancing the refractive power distribution in the imaging optical lens assembly. The image-side surface of the fourth lens element can be convex in a paraxial region thereof. Therefore, it is favorable for adjusting the refraction direction of light on the fourth lens element and correcting spherical aberration.

The fifth lens element has positive refractive power. Therefore, it is favorable for controlling the light path direction so as to gather light rays and obtaining a balance between the field of view and size distribution of the imaging optical lens assembly. The image-side surface of the fifth lens element can be convex in a paraxial region thereof. Therefore, adjusting the surface shape and refractive power of the fifth lens element is favorable for preventing stray light generated due to an overly large incident angle of light at peripheral region.

The sixth lens element can have positive refractive power. Therefore, it is favorable for gathering light rays so as to reduce the size of the imaging optical lens assembly. The image-side surface of the sixth lens element can be convex in a paraxial region thereof. Therefore, it is favorable for adjusting the light path direction so as to reduce size and correct aberrations.

The object-side surface of the seventh lens element can be concave in a paraxial region thereof. Therefore, it is favorable for correcting field curvature so as to reduce distortion.

The object-side surface of the eighth lens element can be convex in a paraxial region thereof. Therefore, it is favorable for reducing field curvature and the back focal length so as to prevent an overly long total length of the imaging optical lens assembly.

Figure 31:
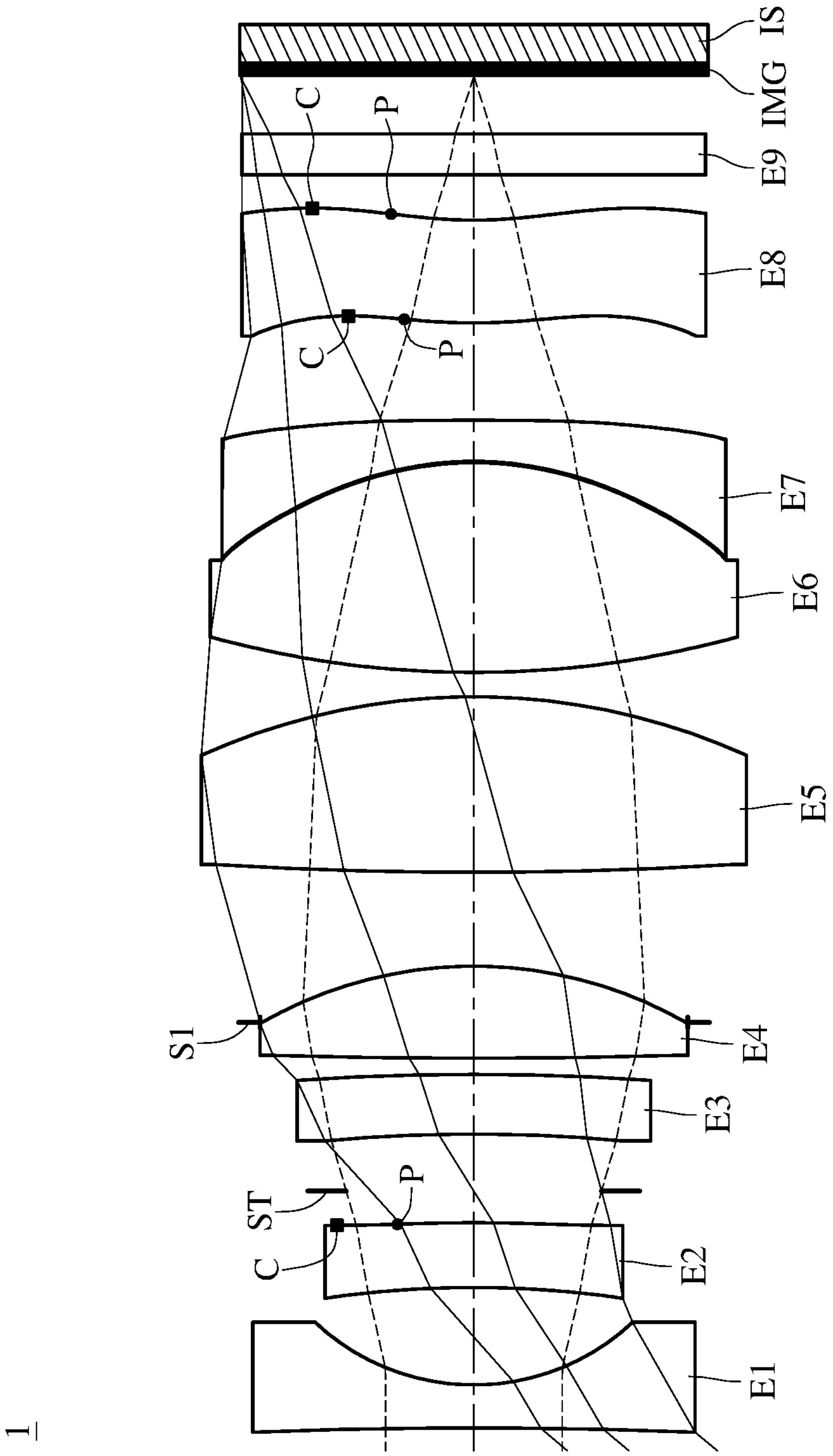
FIG. 31 shows a schematic view of inflection points and critical points on lens surfaces according to the 1st embodiment of the present disclosure.

The object-side surface of the eighth lens element has at least one inflection point. Therefore, it is favorable for reducing the back focal length and increasing relative illuminance at peripheral field of view and light gathering quality of different wavelengths through shape variation of the object-side surface of the eighth lens element. Please refer to FIG. 31, which shows a schematic view of the inflection points P on the lens surfaces according to the 1st embodiment of the present disclosure. In FIG. 31, the image-side surface of the second lens element E2, and the object-side surface and the image-side surface of the eighth lens element E8 each has one inflection point P. The 1st embodiment of the present disclosure shown in FIG. 31 is only exemplary. Each of the lens elements in various embodiments of the present disclosure can have one or more inflection points.

The object-side surface and the image-side surface of the seventh lens element can be both aspheric. Therefore, it is favorable for enhancing off-axis aberration correction capability of the seventh lens element so as to reduce chromatic aberration.

There can be at least one lens element made of glass material and at least one lens element made of plastic material in the imaging optical lens assembly. Therefore, it is favorable for collaborating with spherical and aspheric surface design, balancing manufacturing feasibility and manufacturing costs, and maintaining excellent stability under various environments.

The imaging optical lens assembly can include at least one cemented lens set, and the at least one cemented lens set is formed by cementing two adjacent lens elements together from among the first lens element, the second lens element, the third lens element, the fourth lens element, the fifth lens element, the sixth lens element, the seventh lens element and the eighth lens element. Therefore, by reducing the difference in refractive index between lens elements, it is favorable for reducing total reflection of peripheral light, thereby preventing image ghosting. Moreover, two adjacent cemented surfaces of the two adjacent lens elements can be both aspheric. Therefore, it is favorable for increasing the flexibility of optical design so as to correct astigmatism. The two adjacent cemented surfaces of the two adjacent lens elements refer to the image-side surface of the lens element located closer to the object side and the object-side surface of the other lens element located closer to the image side in the cemented lens set. Moreover, the imaging optical lens assembly can also include at least two cemented lens sets.

According to the present disclosure, the imaging optical lens assembly further include an aperture stop disposed between an imaged object and the fourth lens element. Therefore, it is favorable for adjusting the position of the aperture stop so as to increase the relative illuminance at peripheral field of view and increase the field of view. Moreover, the aperture stop can be located between the first lens element and the third lens element. Moreover, the aperture stop can be located between the second lens element and the third lens element.

When an axial distance between the object-side surface of the first lens element and an image surface is TL, and a focal length of the imaging optical lens assembly is f, the following condition is satisfied: $3.00<TL/f<6.00$. Therefore, it is favorable for obtaining a balance between the total track length and the field of view so as to meet market application requirements. Moreover, the following condition can also be satisfied: $3.50<TL/f<6.00$. Moreover, the following condition can also be satisfied: $4.00<TL/f<5.80$. Moreover, the following condition can also be satisfied: $3.90\leq TL/f\leq 5.50$.

When an axial distance between the first lens element and the second lens element is T12, an axial distance between the third lens element and the fourth lens element is T34, and a central thickness of the sixth lens element is CT6, the following condition can be satisfied: $0.05<(T12+T34)/CT6<1.50$. Therefore, it is favorable for enhancing the spatial utilization of the imaging optical lens assembly, while improving the manufacturing yield. Moreover, the following condition can also be satisfied: $0.20<(T12+T34)/CT6<1.50$. Moreover, the following condition can also be satisfied: $0.43\leq(T12+T34)/CT6\leq 0.99$.

When the focal length of the imaging optical lens assembly is f, a focal length of the second lens element is f2, a focal length of the third lens element is f3, and a focal length of the eighth lens element is f8, the following condition can be satisfied: $-1.50<f/f2+f/f3+f/f8<0.38$. Therefore, it is favorable for a rational distribution of the refractive power of the imaging optical lens assembly so as to balance the convergence or divergence of light, thereby enhancing the light-gathering quality across the entire field of view. Moreover, the following condition can also be satisfied: $-1.00<f/f2+f/f3+f/f8<0.35$. Moreover, the following condition can also be satisfied: $-0.50<f/f2+f/f3+f/f8<0.30$. Moreover, the following condition can also be satisfied: $-0.16\leq f/f2+f/f3+f/f8\leq 0.14$.

When a curvature radius of the object-side surface of the sixth lens element is R11, and a curvature radius of the image-side surface of the sixth lens element is R12, the following condition can be satisfied: $-3.00<(R11+R12)/(R11-R12)<3.00$. Therefore, it is favorable for adjusting the surface shape and refractive power of the sixth lens element so as to gather light rays, and improving the quality of central light gathering. Moreover, the following condition can also be satisfied: $-0.85<(R11+R12)/(R11-R12)<2.80$. Moreover, the following condition can also be satisfied: $0.32\leq(R11+R12)/(R11-R12)\leq 1.51$.

When an Abbe number of the third lens element is V3, an Abbe number of the seventh lens element is V7, and an Abbe number of the eighth lens element is V8, the following condition can be satisfied: $18.0<V3+V7+V8<105.0$. Therefore, it is favorable for balancing the material arrangement of the imaging optical lens assembly, thereby reducing chromatic aberrations in the central field of view and adjacent fields. Moreover, the following condition can also be satisfied: $20.0<V3+V7+V8<101.0$. Moreover, the following condition can also be satisfied: $27.0<V3+V7+V8<86.0$. Moreover, the following condition can also be satisfied: $56.4\leq V3+V7+V8\leq 99.9$.

When a curvature radius of the image-side surface of the fourth lens element is R8, and a curvature radius of the object-side surface of the fifth lens element is R9, the following condition can be satisfied: $-10.00<R8/R9<0.15$. Therefore, by designing the shapes of the image-side surface of the fourth lens element and the object-side surface of the fifth lens element to control the direction of light beams, it is favorable for increasing the systematic balance of the imaging optical lens assembly. Moreover, the following condition can also be satisfied: $-5.00<R8/R9<0.15$.

When half of a maximum field of view of the imaging optical lens assembly is HFOV, the following condition can be satisfied: $0.82<\tan(HFOV)<2.75$. Therefore, it is favorable for the imaging optical lens assembly to have a sufficient imaging range to meet the field of view requirements of application devices. Moreover, the following condition can also be satisfied: $1.00<\tan(HFOV)<2.15$.

When the focal length of the imaging optical lens assembly is f, a focal length of the first lens element is f1, the focal length of the second lens element is f2, a focal length of the seventh lens element is f7, and the focal length of the eighth lens element is f8, the following condition can be satisfied: $0.00\leq(|f1|+|f7|)/(|f2|+|f8|)<0.62$. Therefore, it is favorable for balancing the refractive power arrangement of the imaging optical lens assembly so as to enhance the capability of image quality correction.

When a curvature radius of the image-side surface of the first lens element is R2, and a curvature radius of the object-side surface of the second lens element is R3, the following condition can be satisfied: $0.00\leq|R2/R3|<0.60$. Therefore, it is favorable for receiving light and adjusting the light path by having the shapes of the image-side surface of the first lens element and the object-side surface of the second lens element complement each other. Moreover, the following condition can also be satisfied: $0.00\leq|R2/R3|<0.45$.

When an Abbe number of the fourth lens element is V4, and a refractive index of the fourth lens element is N4, the following condition can be satisfied: $6.50<V4/N4<35.70$. Therefore, limiting the choice of materials for the fourth lens element is favorable for chromatic aberration correction, thereby improving image resolution. Moreover, the following condition can also be satisfied: $17.00<V4/N4<35.70$.

When a refractive index of the second lens element is N2, a refractive index of the third lens element is N3, and a refractive index of the sixth lens element is N6, the following condition can be satisfied: $1.25<(N2+N6)/N3<1.85$. Therefore, it is favorable for adjusting the material distribution of the imaging optical lens assembly so as to balance the convergence ability between different wavelength bands of light.

When an f-number of the imaging optical lens assembly is Fno, the following condition can be satisfied: $1.30<Fno<1.85$. Therefore, it is favorable for adjusting the aperture stop size so as to increase the light intake of the imaging optical lens assembly, allowing for better image quality in low-light conditions. Moreover, the following condition can also be satisfied: $1.40<Fno<1.80$.

Figure 32:
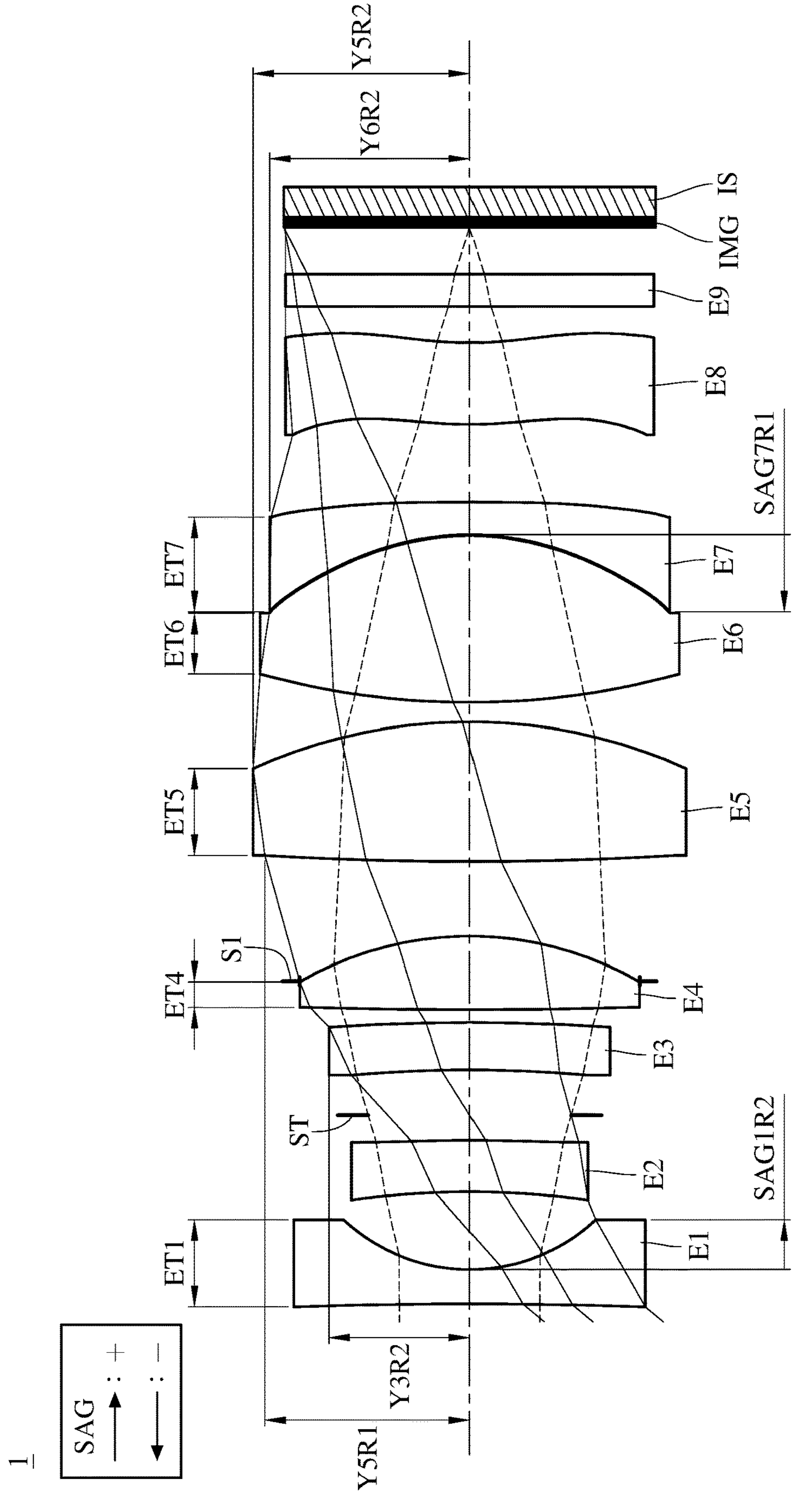
FIG. 32 shows a schematic view of Y3R2, Y5R1, Y5R2, Y6R2, ET1, ET4, ET5, ET6, ET7, SAG1R2 and SAG7R1 according to the 1st embodiment of the present disclosure.

When a distance in parallel with an optical axis between a maximum effective radius position of the object-side surface of the fourth lens element and a maximum effective radius position of the image-side surface of the fourth lens element is ET4, and a distance in parallel with the optical axis between a maximum effective radius position of the object-side surface of the fifth lens element and a maximum effective radius position of the image-side surface of the fifth lens element is ET5, the following condition can be satisfied: $0.15<ET4/ET5<3.00$. Therefore, it is favorable for guiding the direction of peripheral light paths so as to prevent total reflection. Moreover, the following condition can also be satisfied: $0.18<ET4/ET5<2.60$. Please refer to FIG. 32, which shows a schematic view of ET4 and ET5 according to the 1st embodiment of the present disclosure.

When a maximum effective radius of the image-side surface of the fifth lens element is Y5R2, and a maximum effective radius of the image-side surface of the sixth lens element is Y6R2, the following condition can be satisfied: $0.75<Y5R2/Y6R2<1.30$. Therefore, it is favorable for restricting the height of light refraction so as to prevent ineffective light gathering caused by excessive refraction angles in peripheral areas. Please refer to FIG. 32, which shows a schematic view of Y5R2 and Y6R2 according to the 1st embodiment of the present disclosure.

When an axial distance between the object-side surface of the first lens element and the image-side surface of the eighth lens element is TD, and an entrance pupil diameter of the imaging optical lens assembly is EPD, the following condition can be satisfied: $5.10<TD/EPD<8.00$. Therefore, it is favorable for increasing the relative illuminance of the peripheral field of view, and obtaining a balance between illuminance, depth of field, and size of the imaging optical lens assembly. Moreover, the following condition can also be satisfied: $5.20<TD/EPD<7.60$.

When the focal length of the imaging optical lens assembly is f, the focal length of the first lens element is f1, and the focal length of the seventh lens element is f7, the following condition can be satisfied: $-1.75<f/f1+f/f7<-0.85$. Therefore, it is favorable for the refractive power of the first lens element and the seventh lens element to work together so as to correct aberrations and field curvature, and adjust the field of view. Moreover, the following condition can also be satisfied: $-1.75<f/f1+f/f7<-0.95$.

When a central thickness of the first lens element is CT1, and a central thickness of the seventh lens element is CT7, the following condition can be satisfied: $0.10<CT7/CT1<2.10$. Therefore, it is favorable for adjusting the arrangement space of lens elements so as to reduce manufacturing tolerances. Moreover, the following condition can also be satisfied:

$$0.16<CT7/CT1<1.80.$$

When the axial distance between the third lens element and the fourth lens element is T34, and the central thickness of the sixth lens element is CT6, the following condition can be satisfied: $0.00\leq T34/CT6<1.10$. Therefore, it is favorable for improving manufacturing feasibility so as to reduce the total track length. Moreover, the following condition can also be satisfied: $0.00\leq T34/CT6<0.60$.

When an Abbe number of the first lens element is V1, the Abbe number of the third lens element is V3, and the Abbe number of the seventh lens element is V7, the following condition can be satisfied: $0.3<(V3+V7)/V1<1.0$. Therefore, it is favorable for the third lens element and the seventh lens element to have the capability of correcting chromatic aberration so as to reduce color distortion in images.

When a curvature radius of the object-side surface of the seventh lens element is R13, and a curvature radius of the image-side surface of the seventh lens element is R14, the following condition can be satisfied: $-1.70<(R13+R14)/(R13-R14)<0.70$. Therefore, by adjusting the surface shape and refractive power of the seventh lens element so as to constrain systematic distortion within an acceptable range. Moreover, the following condition can also be satisfied: $-1.60<(R13+R14)/(R13-R14)<0.55$.

When a displacement in parallel with the optical axis from an axial vertex of the image-side surface of the first lens element to a maximum effective radius position of the image-side surface of the first lens element is SAG1R2, and a distance in parallel with the optical axis between a maximum effective radius position of the object-side surface of the first lens element and the maximum effective radius position of the image-side surface of the first lens element is ET1, the following condition can be satisfied: $0.20<SAG1R2/ET1<0.85$. Therefore, it is favorable for constraining the edge shape of the first lens element so as to ensure the manufacturability of the imaging optical lens assembly. Please refer to FIG. 32, which shows a schematic view of SAG1R2 and ET1 according to the 1st embodiment of the present disclosure. When the direction from the axial vertex of one surface to the maximum effective radius position of the same surface is facing towards the image side of the imaging optical lens assembly, the value of displacement is positive; when the direction from the axial vertex of the surface to the maximum effective radius position of the same surface is facing towards the object side of the imaging optical lens assembly, the value of displacement is negative.

When a maximum effective radius of the image-side surface of the third lens element is Y3R2, and a maximum effective radius of the object-side surface of the fifth lens element is Y5R1, the following condition can be satisfied: $1.00<Y5R1/Y3R2<3.50$. Therefore, it is favorable for adjusting peripheral light rays and correcting off-axis aberrations so as to improve image quality. Please refer to FIG. 32, which shows a schematic view of Y5R1 and Y3R2 according to the 1st embodiment of the present disclosure.

When a distance in parallel with the optical axis between a maximum effective radius position of the object-side surface of the sixth lens element and a maximum effective radius position of the image-side surface of the sixth lens element is ET6, and a distance in parallel with the optical axis between a maximum effective radius position of the object-side surface of the seventh lens element and a maximum effective radius position of the image-side surface of the seventh lens element is ET7, the following condition can be satisfied: $0.28<ET6/ET7<1.10$. Therefore, by coordinating with the peripheral surface design to adjust the refractive power at the lens edges, it is favorable for controlling peripheral light rays and improve correcting astigmatism and distortion. Please refer to FIG. 32, which shows a schematic view of ET6 and ET7 according to the 1st embodiment of the present disclosure.

When an Abbe number of the second lens element is V2, the following condition can be satisfied: $5.0<V2<53.0$. Therefore, it is favorable for preventing image ghosting and improving imaging performance. Moreover, the following condition can also be satisfied:

$$10.0<V2<37.5.$$

When a focal length of the fourth lens element is f4, and a curvature radius of the object-side surface of the fourth lens element is R7, the following condition can be satisfied: $0.00\leq|f4/R7|<1.20$. Therefore, it is favorable for controlling the refractive power and shape of the object-side surface of the fourth lens element so as to correct spherical aberration. Moreover, the following condition can also be satisfied: $0.00\leq|f4/R7|<0.55$.

When a central thickness of the fifth lens element is CT5, and a central thickness of the eighth lens element is CT8, the following condition can be satisfied: $0.18<CT8/CT5<1.85$. Therefore, it is favorable for adjusting the arrangement space for the fifth lens element and the eighth lens element so as to balance the size distribution of the imaging optical lens assembly, thereby reducing assembly difficulty. Moreover, the following condition can also be satisfied: $0.30<CT8/CT5<1.55$.

When an axial distance between the aperture stop and the object-side surface of the third lens element is Dsr5, and an axial distance between the aperture stop and the object-side surface of the fifth lens element is Dsr9, the following condition can be satisfied: $0.00<|Dsr5/Dsr9|<0.90$. Therefore, it is favorable for balancing the range of the field of view and the total track length of the imaging optical lens assembly for meeting various applications.

When the curvature radius of the image-side surface of the seventh lens element is R14, and a curvature radius of the object-side surface of the eighth lens element is R15, the following condition can be satisfied: $-0.08<(R14-R15)/(R14+R15)<6.00$. Therefore, it is favorable for the curvature radii of the image-side surface of the seventh lens element and the object-side surface of the eighth lens element to complement each other so as to correct field curvature, thereby improving image quality. Moreover, the following condition can also be satisfied: $-0.05<(R14-R15)/(R14+R15)<2.50$.

When a displacement in parallel with the optical axis from an axial vertex of the object-side surface of the seventh lens element to the maximum effective radius position of the object-side surface of the seventh lens element is SAG7R1, and the central thickness of the seventh lens element is CT7, the following condition can be satisfied: $-3.50<SAG7R1/CT7<-0.50$. Therefore, it is favorable for constraining the curvature of the peripheral surface on the object side of the seventh lens element so as to guide peripheral light rays onto the image surface and correct distortion. Please refer to FIG. 32, which shows a schematic view of SAG7R1 according to the 1st embodiment of the present disclosure.

When the direction from the axial vertex of one surface to the maximum effective radius position of the same surface is facing towards the image side of the imaging optical lens assembly, the value of displacement is positive; when the direction from the axial vertex of the surface to the maximum effective radius position of the same surface is facing towards the object side of the imaging optical lens assembly, the value of displacement is negative.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis. Please refer to FIG. 31, which shows a schematic view of the critical points C on the lens surfaces according to the 1st embodiment of the present disclosure. In FIG. 31, the image-side surface of the second lens element E2, and the object-side surface and the image-side surface of the eighth lens element E8 each has a critical point C in an off-axis region thereof. The 1st embodiment of the present disclosure shown in FIG. 31 is only exemplary. Each of the lens elements in various embodiments of the present disclosure can have one or more critical points in an off-axis region thereof.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 33:
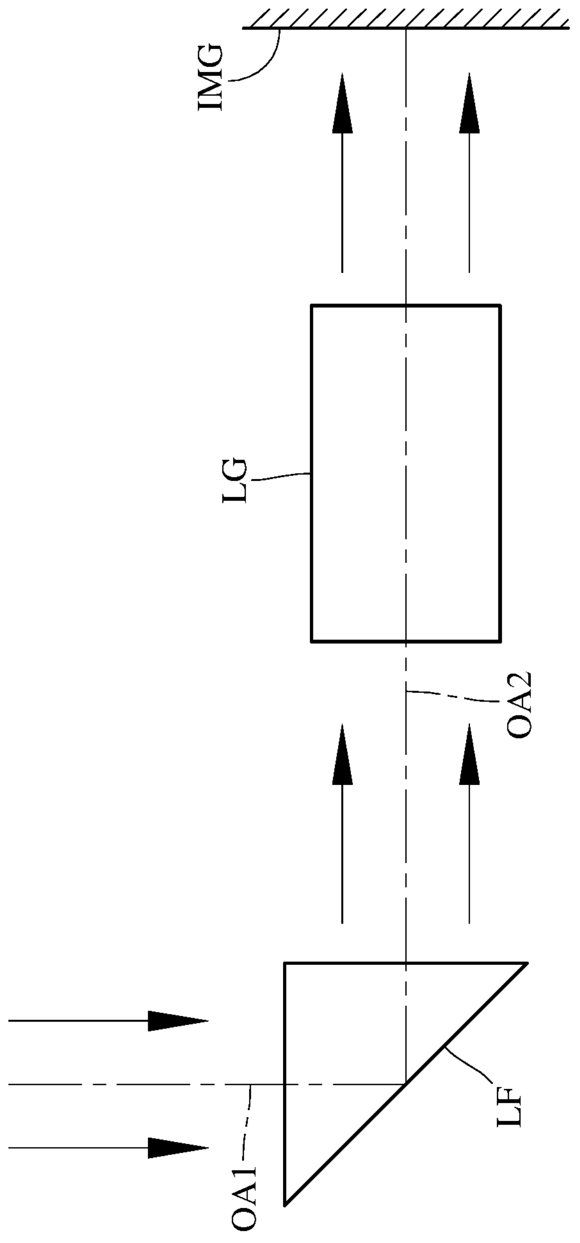
FIG. 33 shows a schematic view of a configuration of one light-folding element in an imaging optical lens assembly according to one embodiment of the present disclosure.
Figure 34:
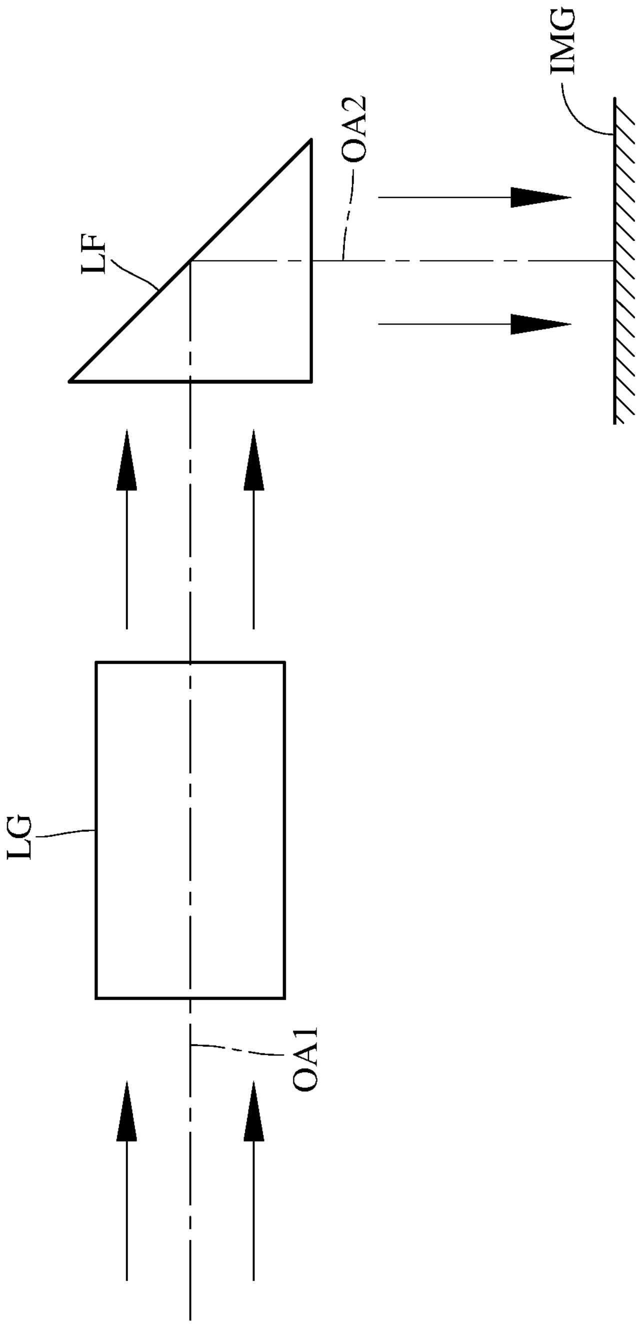
FIG. 34 shows a schematic view of another configuration of one light-folding element in an imaging optical lens assembly according to one embodiment of the present disclosure.
Figure 35:
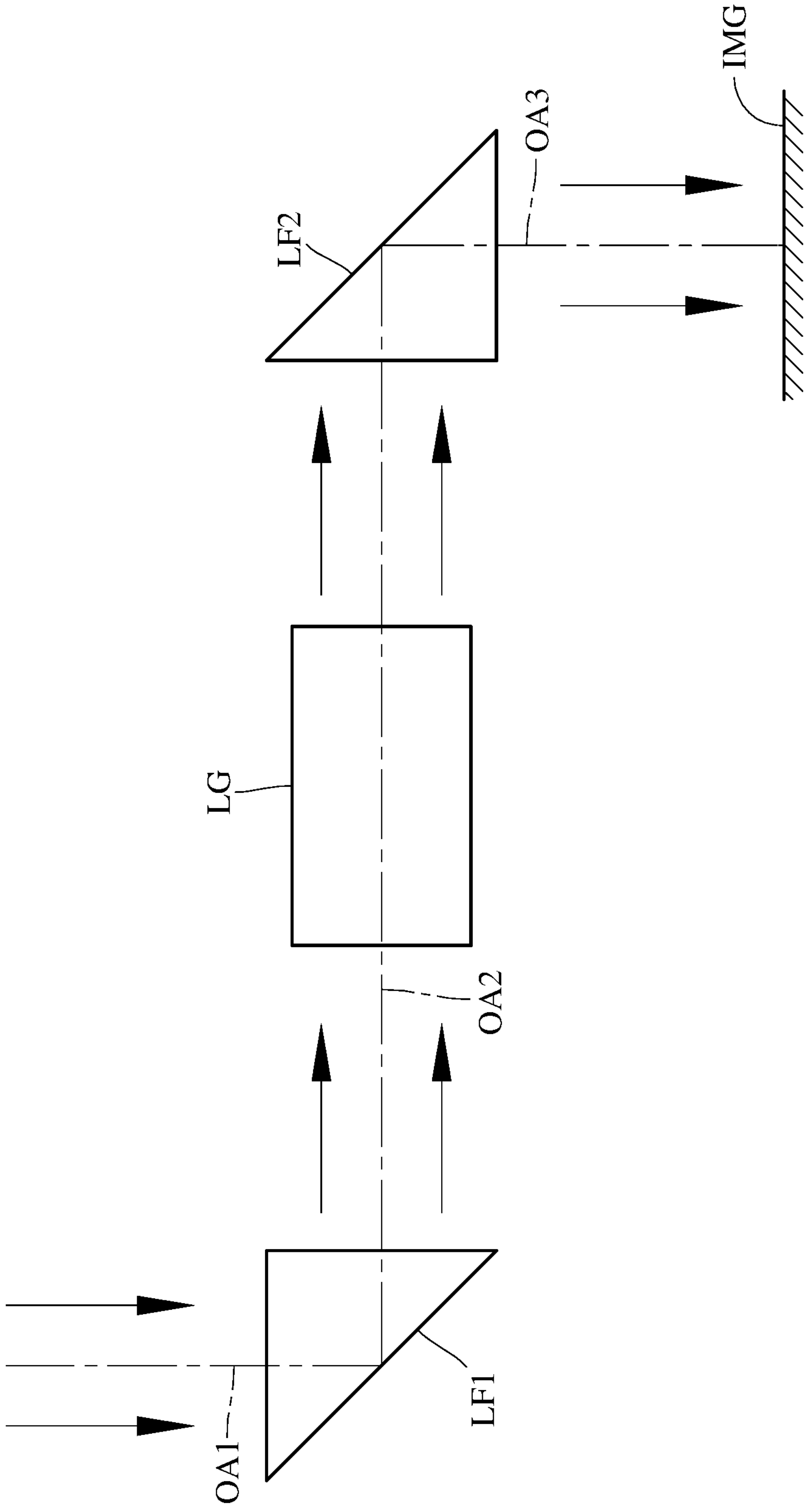
FIG. 35 shows a schematic view of a configuration of two light-folding elements in an imaging optical lens assembly according to one embodiment of the present disclosure.

According to the present disclosure, at least one light-folding element, such as a prism or a mirror, can be optionally provided between an imaged object and the image surface on the imaging optical path, and the surface shape of the prism or mirror can be planar, spherical, aspheric or freeform surface, such that the imaging optical lens assembly can be more flexible in space arrangement, and therefore the dimensions of an electronic device is not restricted by the total track length of the imaging optical lens assembly. Specifically, please refer to FIG. 33 and FIG. 34. FIG. 33 shows a schematic view of a configuration of one light-folding element in an imaging optical lens assembly according to one embodiment of the present disclosure, and FIG. 34 shows a schematic view of another configuration of one light-folding element in an imaging optical lens assembly according to one embodiment of the present disclosure. In FIG. 33 and FIG. 34, the imaging optical lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging optical lens assembly as shown in FIG. 33, or disposed between a lens group LG and the image surface IMG of the imaging optical lens assembly as shown in FIG. 34. Furthermore, please refer to FIG. 35, which shows a schematic view of a configuration of two light-folding elements in an imaging optical lens assembly according to one embodiment of the present disclosure. In FIG. 35, the imaging optical lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens assembly, the second light-folding element LF2 is disposed between the lens group LG and the image surface IMG of the imaging optical lens assembly, and the travelling direction of light on the first optical axis OA1 can be the same direction as the travelling direction of light on the third optical axis OA3 as shown in FIG. 35. The imaging optical lens assembly can be optionally provided with three or more light-folding elements, and the present disclosure is not limited to the type, amount and position of the light-folding elements of the embodiments disclosed in the aforementioned figures.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging optical lens assembly can include one or more optical elements for limiting the form of light passing through the imaging optical lens assembly. Each optical element can be, but not limited to, a filter, a polarizer, etc., and each optical element can be, but not limited to, a single-piece element, a composite component, a thin film, etc. The optical element can be located at the object side or the image side of the imaging optical lens assembly or between any two adjacent lens elements so as to allow light in a specific form to pass through, thereby meeting application requirements.

According to the present disclosure, the imaging optical lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element, the axial optical data are also calculated along the deflected optical axis.

According to the above description of the present disclosure, the following specific embodiments are provided for further explanation.

1st Embodiment

Figure 1:
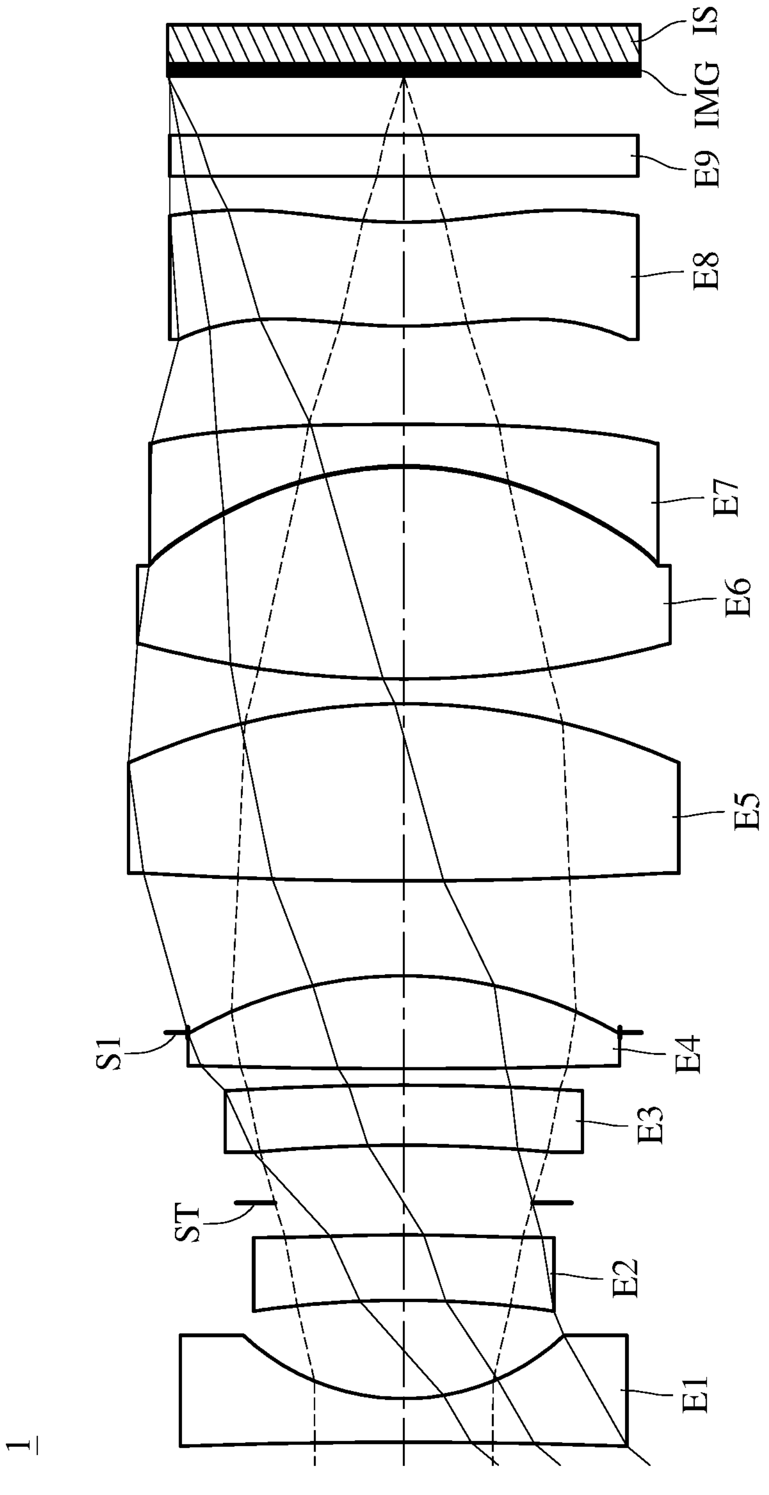
FIG. 1 is a schematic view of an image capturing unit according to the 1st embodiment of the present disclosure.
Figure 2:
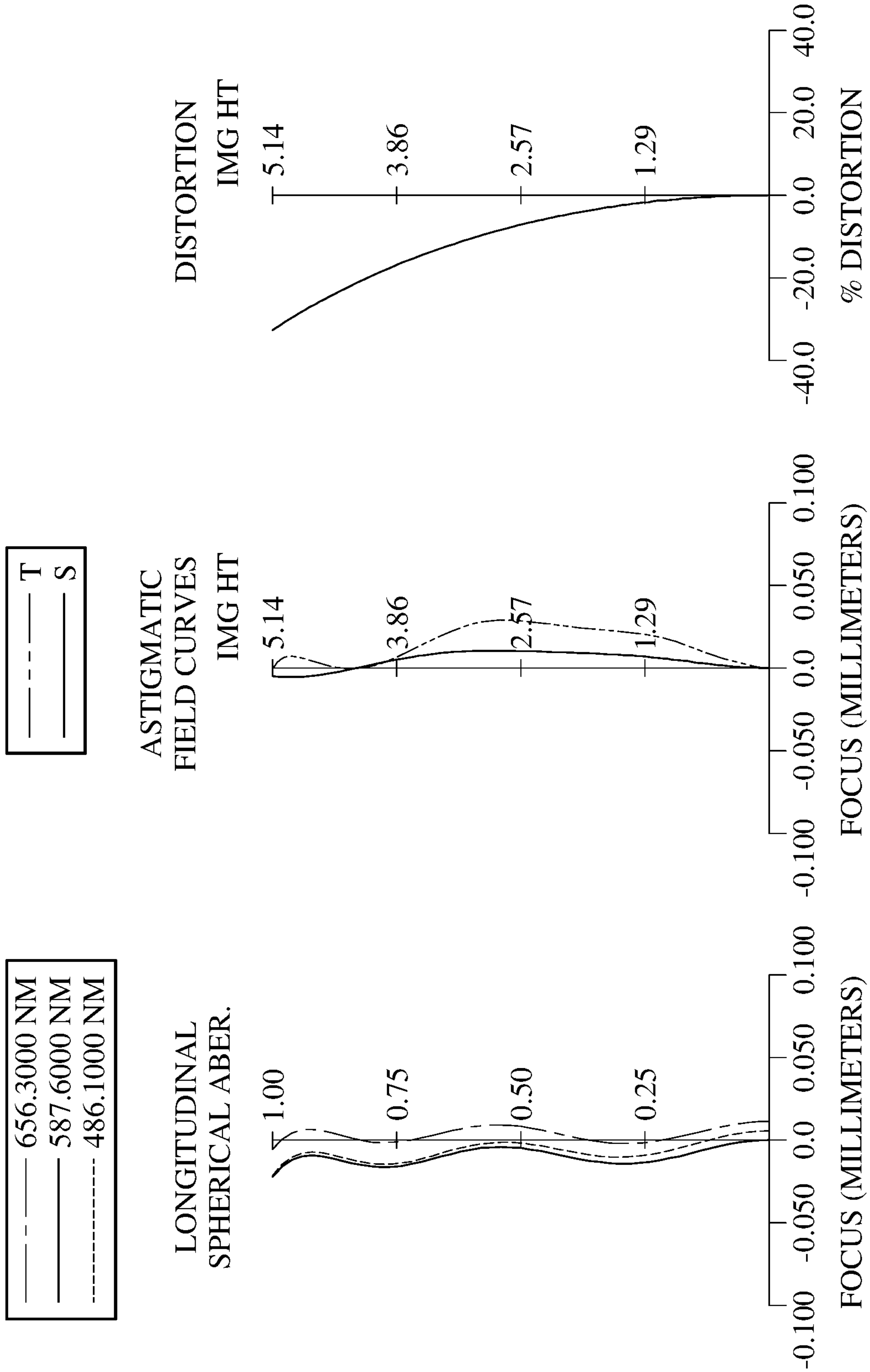
FIG. 2 shows spherical aberration curves, astigmatic field curves and a distortion curve of the image capturing unit according to the 1st embodiment.

FIG. 1 is a schematic view of an image capturing unit according to the 1 st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging optical lens assembly (its reference numeral is omitted) of the present disclosure and an image sensor IS. The imaging optical lens assembly includes, in order from an object side to an image side along an optical path, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 and the image-side surface of the sixth lens element E6 are cemented to each other.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 1st embodiment, the imaging optical lens assembly includes a cemented lens set (its reference numeral is omitted), the cemented lens set is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, and 16.

In the imaging optical lens assembly of the image capturing unit 1 according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=6.41 millimeters (mm), Fno=1.65, and HFOV=50.0 degrees (deg.).

When the maximum field of view of the imaging optical lens assembly is FOV, the following condition is satisfied: FOV=100.0 degrees.

When half of the maximum field of view of the imaging optical lens assembly is HFOV, the following condition is satisfied: tan (HFOV)=1.19.

When an axial distance between the object-side surface of the first lens element E1 and the image-side surface of the eighth lens element E8 is TD, and an entrance pupil diameter of the imaging optical lens assembly is EPD, the following condition is satisfied: TD/EPD=6.85.

When an axial distance between the object-side surface of the first lens element E1 and the image surface IMG is TL, and the focal length of the imaging optical lens assembly is f, the following condition is satisfied: TL/f=4.65.

When a focal length of the first lens element E1 is f1, a focal length of the second lens element E2 is f2, a focal length of the seventh lens element E7 is f7, and a focal length of the eighth lens element E8 is f8, the following condition is satisfied: (|f1|+|f7|)/(|f2|+|f8|)=0.07. In this embodiment, a focal length of a single lens element is calculated under the condition that a medium on both object side and image side of the single lens element is air.

When the focal length of the imaging optical lens assembly is f, the focal length of the second lens element E2 is f2, a focal length of the third lens element E3 is f3, and the focal length of the eighth lens element E8 is f8, the following condition is satisfied:

$$f/f2 + f/f3 + f/f8 = -0.16.$$

When the focal length of the imaging optical lens assembly is f, the focal length of the first lens element E1 is f1, and the focal length of the seventh lens element E7 is f7, the following condition is satisfied: f/f1+f/f7=−1.26.

When a focal length of the fourth lens element E4 is f4, and a curvature radius of the object-side surface of the fourth lens element E4 is R7, the following condition is satisfied:

$$|f4/R7| = 0.07.$$

When a curvature radius of the image-side surface of the first lens element E1 is R2, and a curvature radius of the object-side surface of the second lens element E2 is R3, the following condition is satisfied: |R2/R3|=0.22.

When a curvature radius of the image-side surface of the fourth lens element E4 is R8, and a curvature radius of the object-side surface of the fifth lens element E5 is R9, the following condition is satisfied: R8/R9=−0.10.

When a curvature radius of the object-side surface of the sixth lens element E6 is R11, and a curvature radius of the image-side surface of the sixth lens element E6 is R12, the following condition is satisfied: (R11+R12)/(R11−R12)=0.52.

When a curvature radius of the object-side surface of the seventh lens element E7 is R13, and a curvature radius of the image-side surface of the seventh lens element E7 is R14, the following condition is satisfied: (R13+R14)/(R13−R14)=−1.09.

When the curvature radius of the image-side surface of the seventh lens element E7 is R14, and a curvature radius of the object-side surface of the eighth lens element E8 is R15, the following condition is satisfied: (R14−R15)/(R14+R15)=1.15.

When a central thickness of the first lens element E1 is CT1, and a central thickness of the seventh lens element E7 is CT7, the following condition is satisfied: CT7/CT1=0.95.

When an axial distance between the third lens element E3 and the fourth lens element E4 is T34, and a central thickness of the sixth lens element E6 is CT6, the following condition is satisfied: T34/CT6=0.08. In this embodiment, an axial distance between two adjacent lens elements is a distance in a paraxial region between two adjacent lens surfaces of the two adjacent lens elements.

When a central thickness of the fifth lens element E5 is CT5, and a central thickness of the eighth lens element E8 is CT8, the following condition is satisfied: CT8/CT5=0.59.

When an axial distance between the aperture stop ST and the object-side surface of the third lens element E3 is Dsr5, and an axial distance between the aperture stop ST and the object-side surface of the fifth lens element E5 is Dsr9, the following condition is satisfied:

$$|Dsr5/Dsr9| = 0.18.$$

When an axial distance between the first lens element E1 and the second lens element E2 is T12, the axial distance between the third lens element E3 and the fourth lens element E4 is T34, and the central thickness of the sixth lens element E6 is CT6, the following condition is satisfied: (T12+T34)/CT6=0.54.

When an Abbe number of the first lens element E1 is V1, an Abbe number of the third lens element E3 is V3, and an Abbe number of the seventh lens element E7 is V7, the following condition is satisfied: (V3+V7)/V1=0.6.

When the Abbe number of the third lens element E3 is V3, the Abbe number of the seventh lens element E7 is V7, and an Abbe number of the eighth lens element E8 is V8, the following condition is satisfied: V3+V7+V8=58.1.

When an Abbe number of the fourth lens element E4 is V4, and a refractive index of the fourth lens element E4 is N4, the following condition is satisfied: V4/N4=26.57.

When a refractive index of the second lens element E2 is N2, a refractive index of the third lens element E3 is N3, and a refractive index of the sixth lens element E6 is N6, the following condition is satisfied: (N2+N6)/N3=1.78.

When a distance in parallel with an optical axis between a maximum effective radius position of the object-side surface of the fourth lens element E4 and a maximum effective radius position of the image-side surface of the fourth lens element E4 is ET4, and a distance in parallel with the optical axis between a maximum effective radius position of the object-side surface of the fifth lens element E5 and a maximum effective radius position of the image-side surface of the fifth lens element E5 is ET5, the following condition is satisfied:

$$ET4/ET5 = 0.29.$$

When a maximum effective radius of the image-side surface of the fifth lens element E5 is Y5R2, and a maximum effective radius of the image-side surface of the sixth lens element E6 is Y6R2, the following condition is satisfied: Y5R2/Y6R2=1.08.

When a displacement in parallel with the optical axis from an axial vertex of the image-side surface of the first lens element E1 to a maximum effective radius position of the image-side surface of the first lens element E1 is SAG1R2, and a distance in parallel with the optical axis between a maximum effective radius position of the object-side surface of the first lens element E1 and the maximum effective radius position of the image-side surface of the first lens element E1 is ET1, the following condition is satisfied: SAG1R2/ET1=0.57. In this embodiment, the direction of SAG1R2 faces towards the image side of the imaging optical lens assembly, and the value of SAG1R2 is positive.

When a maximum effective radius of the image-side surface of the third lens element E3 is Y3R2, and a maximum effective radius of the object-side surface of the fifth lens element E5 is Y5R1, the following condition is satisfied: Y5R1/Y3R2=1.40.

When a distance in parallel with the optical axis between a maximum effective radius position of the object-side surface of the sixth lens element E6 and a maximum effective radius position of the image-side surface of the sixth lens element E6 is ET6, and a distance in parallel with the optical axis between a maximum effective radius position of the object-side surface of the seventh lens element E7 and a maximum effective radius position of the image-side surface of the seventh lens element E7 is ET7, the following condition is satisfied:

$$ET6/ET7 = 0.64.$$

When a displacement in parallel with the optical axis from an axial vertex of the object-side surface of the seventh lens element E7 to the maximum effective radius position of the object-side surface of the seventh lens element E7 is SAG7R1, and the central thickness of the seventh lens element E7 is CT7, the following condition is satisfied: SAG7R1/CT7=−2.38. In this embodiment, the direction of SAG7R1 faces towards the object side of the imaging optical lens assembly, and the value of SAG7R1 is negative.

When an Abbe number of the second lens element E2 is V2, the following condition is satisfied: V2=20.4.

The detailed optical data of the 1st embodiment are shown in Table 1A and the aspheric surface data are shown in Table 1B below.

TABLE 1

| 1st Embodiment<br>f = 6.41 mm, Fno = 1.65, HFOV = 50.0 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | −134.2375 (SPH) | 0.950 | Glass | 1.500 | 66.1 | −9.83 |
| 2 | | 5.1205 (SPH) | 2.146 | | | | |
| 3 | Lens 2 | −23.3097 (ASP) | 1.427 | Plastic | 1.660 | 20.4 | −91.73 |
| 4 | | −38.8278 (ASP) | 0.700 | | | | |
| 5 | Ape. Stop | Plano | 1.258 | | | | |
| 6 | Lens 3 | −35.4410 (SPH) | 1.315 | Glass | 1.805 | 25.5 | −116.06 |
| 7 | | −58.0384 (SPH) | 0.352 | | | | |
| 8 | Lens 4 | 151.9651 (SPH) | 2.031 | Glass | 1.788 | 47.5 | 11.34 |
| 9 | | −9.4340 (SPH) | −1.240 | | | | |
| 10 | Stop | Plano | 3.309 | | | | |
| 11 | Lens 5 | 94.7071 (SPH) | 3.870 | Glass | 1.678 | 55.5 | 18.97 |
| 12 | | −14.6382 (SPH) | 0.537 | | | | |
| 13 | Lens 6 | 22.4716 (ASP) | 4.624 | Plastic | 1.544 | 56.0 | 10.41 |
| 14 | | −7.0236 (ASP) | 0.030 | Cemented | 1.485 | 53.2 | — |
| 15 | Lens 7 | −7.0236 (ASP) | 0.901 | Plastic | 1.697 | 16.3 | −10.54 |
| 16 | | −166.2464 (ASP) | 2.146 | | | | |
| 17 | Lens 8 | 11.5068 (ASP) | 2.266 | Plastic | 1.697 | 16.3 | −214.37 |
| 18 | | 9.8199 (ASP) | 1.000 | | | | |
| 19 | Filter | Plano | 0.900 | Glass | 1.517 | 64.2 | — |
| 20 | | Plano | 1.290 | | | | |
| 21 | Image | Plano | — | | | | |

Note:
Reference wavelength is 587.6 nm (d-line).
An effective radius of the stop S1 (Surface 10) is 4.716 mm.

TABLE 1B

| Aspheric Coefficients | | | | |
|---|---|---|---|---|
| Surface # | 3 | 4 | 13 | 14 |
| k= | 4.21166E+01 | −9.00000E+01 | 1.23135E+01 | 4.23818E−01 |
| A4= | 9.448E−05 | −7.034E−05 | −1.772E−04 | 2.381E−03 |
| A6= | 2.928E−04 | 4.801E−04 | 1.012E−05 | −2.669E−04 |
| A8= | −9.395E−05 | −1.652E−04 | −8.469E−07 | 1.964E−05 |
| A10= | 1.729E−05 | 3.060E−05 | 2.672E−08 | −7.136E−07 |
| A12= | −1.716E−06 | −2.998E−06 | −4.099E−10 | 1.313E−08 |
| A14= | 8.544E−08 | 1.388E−07 | — | −9.194E−11 |
| A16= | −1.551E−09 | −2.130E−09 | — | — |
| Surface # | 15 | 16 | 17 | 18 |
| k= | 4.23818E−01 | −9.00000E+01 | −2.43097E+01 | −1.91010E+01 |
| A4= | 2.381E−03 | −6.194E−04 | −1.641E−03 | −1.052E−03 |
| A6= | −2.669E−04 | 5.907E−06 | −3.674E−05 | −3.874E−05 |
| A8= | 1.964E−05 | 1.987E−07 | 1.198E−06 | 2.776E−06 |
| A10= | −7.136E−07 | 2.791E−08 | 7.413E−08 | −2.544E−08 |
| A12= | 1.313E−08 | −1.635E−09 | −1.498E−09 | −1.833E−09 |
| A14= | −9.194E−11 | 1.972E−11 | −5.520E−11 | 7.696E−11 |
| A16= | — | — | 7.364E−13 | −1.214E−12 |

In Table 1A, the curvature radius, the thickness and the focal length are shown in millimeters (mm). Surface numbers 0-21 represent the surfaces sequentially arranged from the object side to the image side along the optical axis. In Table 1B, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
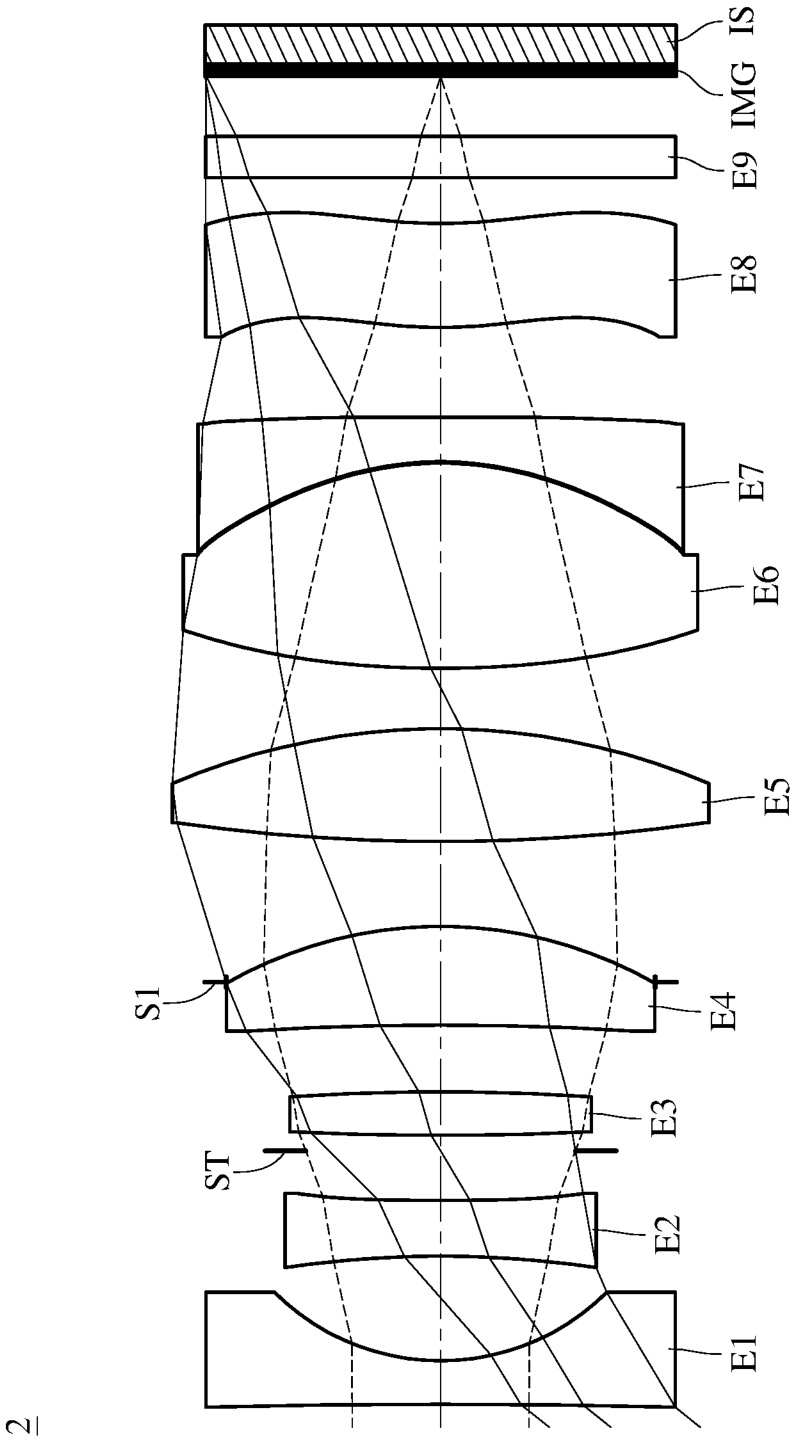
FIG. 3 is a schematic view of an image capturing unit according to the 2nd embodiment of the present disclosure.
Figure 4:
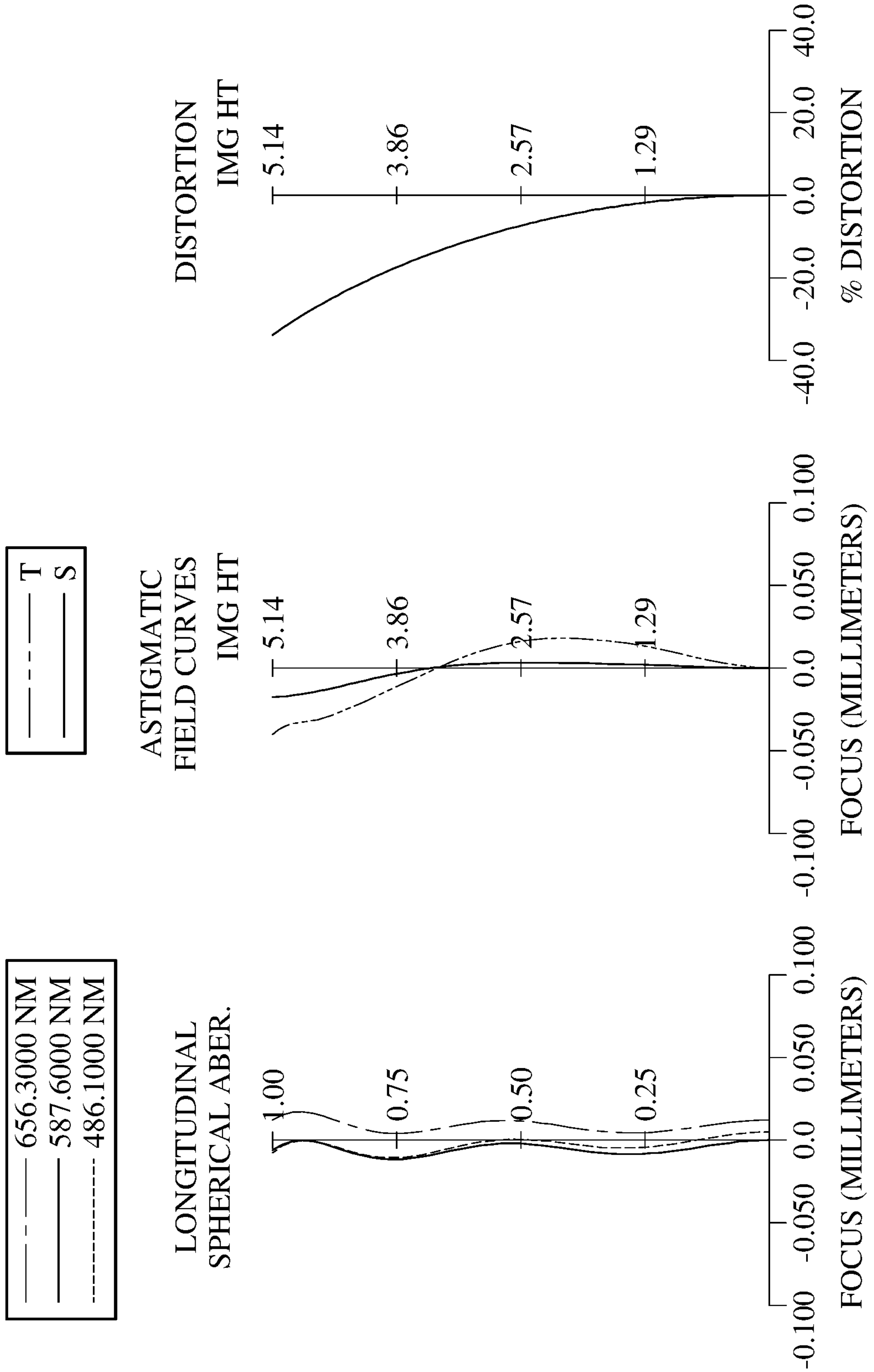
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging optical lens assembly (its reference numeral is omitted) of the present disclosure and an image sensor IS. The imaging optical lens assembly includes, in order from an object side to an image side along an optical path, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one critical point in an off-axis region thereof. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 2nd embodiment, the imaging optical lens assembly includes a cemented lens set (its reference numeral is omitted), the cemented lens set is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 2nd embodiment are shown in Table 2A and the aspheric surface data are shown in Table 2B below.

TABLE 2A

| 2nd Embodiment<br>f = 6.18 mm, Fno = 1.60, HFOV = 51.5 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | −201.4075 (SPH) | 0.950 | Glass | 1.497 | 81.6 | −10.08 |
| 2 | | 5.1473 (SPH) | 2.283 | | | | |
| 3 | Lens 2 | −21.0249 (ASP) | 1.218 | Plastic | 1.661 | 20.3 | −26.20 |
| 4 | | 100.0000 (ASP) | 1.079 | | | | |
| 5 | Ape. Stop | Plano | 0.339 | | | | |
| 6 | Lens 3 | 66.6667 (SPH) | 0.950 | Glass | 1.847 | 23.8 | 34.96 |
| 7 | | −52.8744 (SPH) | 1.457 | | | | |
| 8 | Lens 4 | −70.0919 (SPH) | 2.157 | Glass | 1.729 | 54.7 | 14.73 |
| 9 | | −9.4340 (SPH) | −1.219 | | | | |
| 10 | Stop | Plano | 3.071 | | | | |
| 11 | Lens 5 | 40.6830 (SPH) | 2.464 | Glass | 1.640 | 60.2 | 17.37 |
| 12 | | −14.9379 (SPH) | 1.318 | | | | |
| 13 | Lens 6 | 22.3156 (ASP) | 4.481 | Plastic | 1.544 | 56.0 | 10.15 |
| 14 | | −6.8163 (ASP) | 0.030 | Cemented | 1.485 | 53.2 | — |
| 15 | Lens 7 | −6.8163 (ASP) | 0.963 | Plastic | 1.697 | 16.3 | −9.37 |
| 16 | | 164.0370 (ASP) | 1.968 | | | | |
| 17 | Lens 8 | 9.8559 (ASP) | 2.269 | Plastic | 1.697 | 16.3 | 101.49 |
| 18 | | 10.3679 (ASP) | 1.000 | | | | |

TABLE 2A-continued

| 2nd Embodiment f = 6.18 mm, Fno = 1.60, HFOV = 51.5 deg. | | | | | | | |
|---|---|---|---|---|---|---|---|
| Surface # | | Curvature Radius | Thickness | Material | Index | Abbe # | Focal Length |
| 19 | Filter | Plano | 0.900 | Glass | 1.517 | 64.2 | — |
| 20 | | Plano | 1.313 | | | | |
| 21 | Image | Plano | — | | | | |

Note:
Reference wavelength is 587.6 nm (d-line).
An effective radius of the stop S1 (Surface 10) is 4.680 mm.

TABLE 2B

| Aspheric Coefficients | | | | |
|---|---|---|---|---|
| Surface # | 3 | 4 | 13 | 14 |
| k= | 3.11574E+01 | 9.00000E+01 | 1.31944E+01 | 4.97908E−01 |
| A4= | 6.131E−04 | 7.517E−04 | −1.131E−04 | 2.405E−03 |
| A6= | 2.689E−04 | 4.008E−04 | 9.270E−06 | −2.527E−04 |
| A8= | −9.516E−05 | −1.520E−04 | −7.595E−07 | 1.944E−05 |
| A10= | 1.747E−05 | 2.904E−05 | 2.470E−08 | −7.194E−07 |
| A12= | −1.722E−06 | −2.926E−06 | −4.357E−10 | 1.323E−08 |
| A14= | 8.489E−08 | 1.388E−07 | — | −8.386E−11 |
| A16= | −1.551E−09 | −2.130E−09 | — | — |
| Surface # | 15 | 16 | 17 | 18 |
| k= | 4.97908E−01 | 9.00000E+01 | −1.14417E+01 | −1.35967E+01 |
| A4= | 2.405E−03 | −6.731E−04 | −1.840E−03 | −1.374E−03 |
| A6= | −2.527E−04 | 1.215E−05 | −3.652E−05 | −4.042E−05 |
| A8= | 1.944E−05 | 3.295E−07 | 1.020E−06 | 3.053E−06 |
| A10= | −7.194E−07 | 2.387E−08 | 6.996E−08 | −2.855E−08 |
| A12= | 1.323E−08 | −1.833E−09 | −1.391E−09 | −2.237E−09 |
| A14= | −8.386E−11 | 2.047E−11 | −3.622E−11 | 8.053E−11 |
| A16= | — | — | −3.075E−13 | −1.058E−12 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Optical and Physical Parameters/Definitions | | | |
|---|---|---|---|
| f [mm] | 6.18 | CT7/CT1 | 1.01 |
| Fno | 1.60 | T34/CT6 | 0.33 |
| HFOV [deg.] | 51.5 | CT8/CT5 | 0.92 |
| FOV [deg.] | 103.0 | \|Dsr5/Dsr9\| | 0.05 |
| tan(HFOV) | 1.26 | (T12 + T34)/CT6 | 0.83 |
| TD/EPD | 6.67 | (V3 + V7)/V1 | 0.5 |
| TL/f | 4.69 | V3 + V7 + V8 | 56.4 |
| (\|f1\| + \|f7\|)/(\|f2\| + \|f8\|) | 0.15 | V4/N4 | 31.64 |
| f/f2 + f/f3 + f/f8 | 0.0017 | (N2 + N6)/N3 | 1.74 |
| f/f1 + f/f7 | −1.27 | ET4/ET5 | 1.22 |
| \|f4/R7\| | 0.21 | Y5R2/Y6R2 | 1.10 |
| \|R2/R3\| | 0.24 | SAG1R2/ET1 | 0.60 |
| R8/R9 | −0.23 | Y5R1/Y3R2 | 1.64 |
| (R11 + R12)/(R11 − R12) | 0.53 | ET6/ET7 | 0.58 |
| (R13 + R14)/(R13 − R14) | −0.92 | SAG7R1/CT7 | −2.06 |
| (R14 − R15)/(R14 + R15) | 0.89 | V2 | 20.3 |

3rd Embodiment

Figure 5:
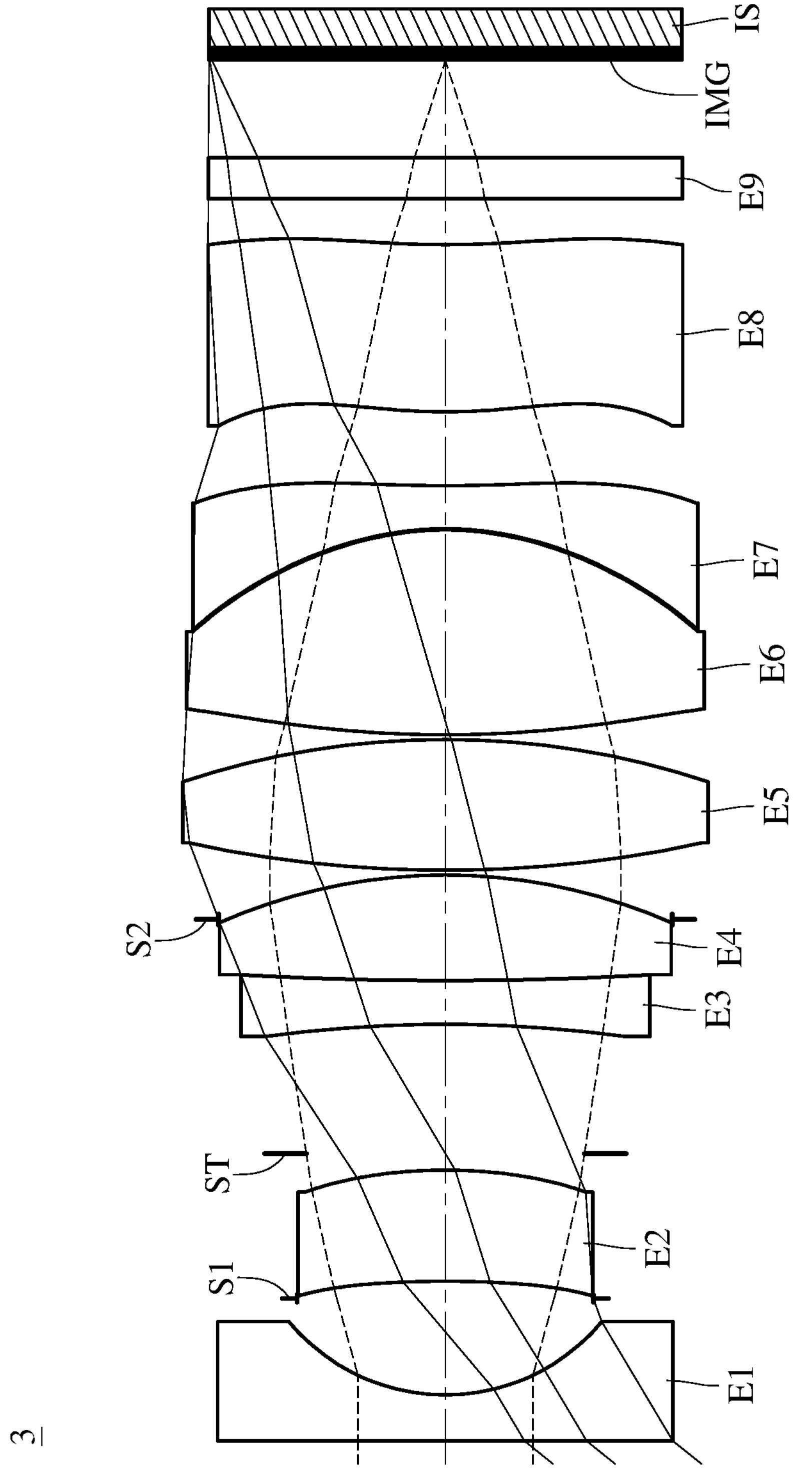
FIG. 5 is a schematic view of an image capturing unit according to the 3rd embodiment of the present disclosure.
Figure 6:
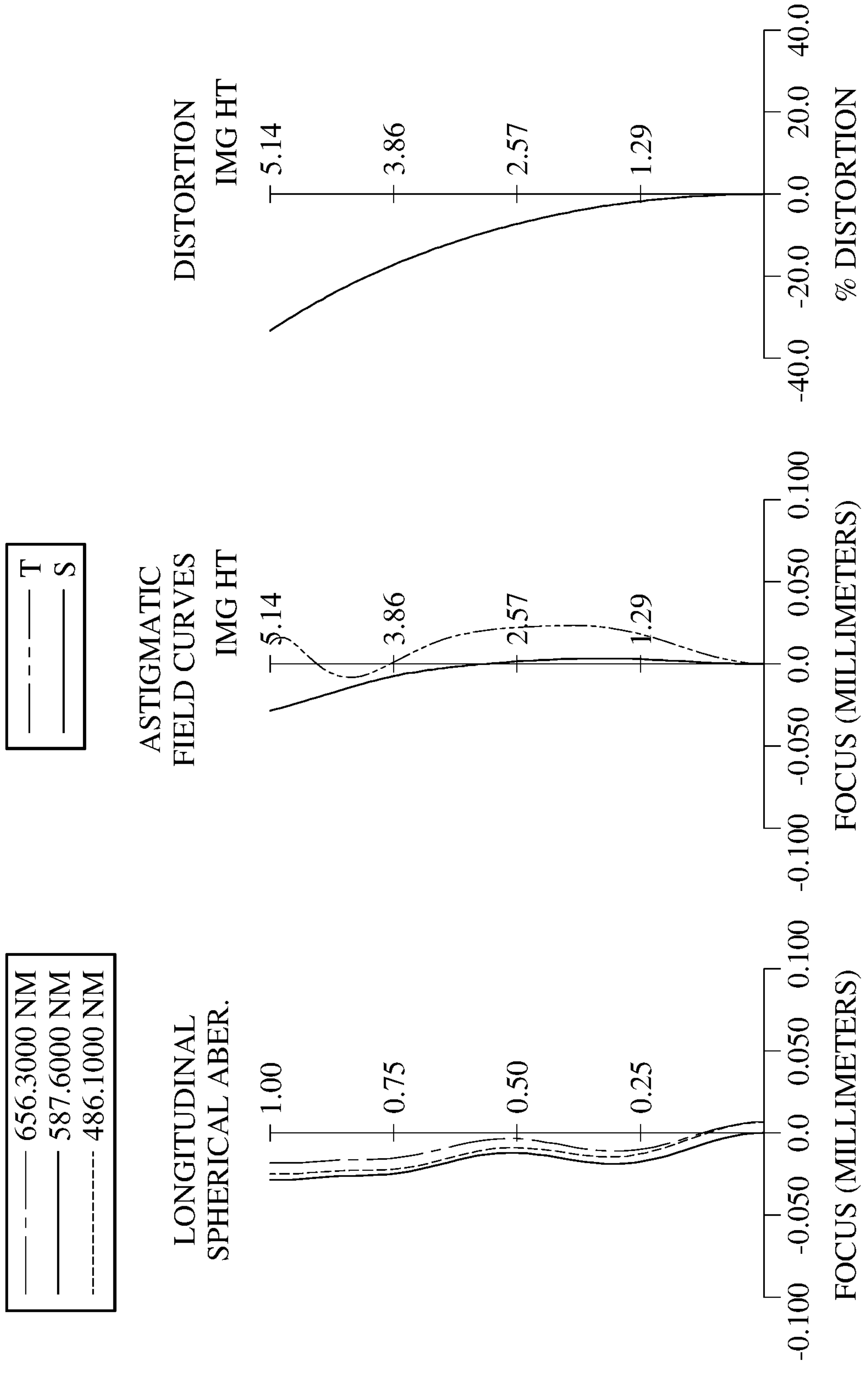
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being planar in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both spherical. The object-side surface of the fourth lens element E4 and the image-side surface of the third lens element E3 are cemented to each other.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one critical point in an off-axis region thereof. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 3rd embodiment, the imaging optical lens assembly includes two cemented lens sets (their reference numerals are omitted), one of the two cemented lens sets is formed by cementing the third lens element E3 and the fourth lens element E4 together, and two adjacent cemented surfaces of the third lens element E3 and the fourth lens element E4 are the image-side surface of the third lens element E3 and the object-side surface of the fourth lens element E4, respectively. The other of the two cemented lens sets is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 3rd embodiment are shown in Table 3A and the aspheric surface data are shown in Table 3B below.

TABLE 3A

| 3rd Embodiment<br>f = 6.26 mm, Fno = 1.64, HFOV = 50.9 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | infinity (SPH) | 1.000 | Glass | 1.517 | 64.2 | −8.58 |
| 2 | | 4.4346 (SPH) | 2.107 | | | | |
| 3 | Stop | Plano | 0.375 | | | | |
| 4 | Lens 2 | −26.0568 (ASP) | 2.427 | Plastic | 1.656 | 21.3 | 28.93 |
| 5 | | −11.3869 (ASP) | 0.360 | | | | |
| 6 | Ape. Stop | Plano | 2.824 | | | | |
| 7 | Lens 3 | −29.6606 (SPH) | 0.950 | Glass | 1.808 | 22.7 | −26.58 |
| 8 | | 79.0023 (SPH) | 0.005 | Cemented | 1.550 | 43.9 | — |
| 9 | Lens 4 | 79.0023 (SPH) | 2.307 | Plastic | 1.755 | 52.3 | 14.10 |
| 10 | | −12.1474 (SPH) | −0.974 | | | | |
| 11 | Stop | Plano | 1.075 | | | | |
| 12 | Lens 5 | 26.5027 (SPH) | 2.857 | Glass | 1.729 | 54.7 | 15.24 |
| 13 | | −18.2676 (SPH) | 0.100 | | | | |
| 14 | Lens 6 | 23.2303 (ASP) | 4.472 | Plastic | 1.544 | 55.9 | 10.03 |
| 15 | | −6.6388 (ASP) | 0.030 | Cemented | 1.485 | 53.2 | — |
| 16 | Lens 7 | −6.6658 (ASP) | 0.936 | Plastic | 1.656 | 21.3 | −8.10 |
| 17 | | 27.7138 (ASP) | 1.613 | | | | |
| 18 | Lens 8 | 12.1405 (ASP) | 3.650 | Plastic | 1.656 | 21.3 | 39.19 |
| 19 | | 20.2627 (ASP) | 1.000 | | | | |

TABLE 3A-continued

| 3rd Embodiment f = 6.26 mm, Fno = 1.64, HFOV = 50.9 deg. | | | | | | | |
|---|---|---|---|---|---|---|---|
| Surface # | | Curvature Radius | Thickness | Material | Index | Abbe # | Focal Length |
| 20 | Filter | Plano | 0.900 | Glass | 1.517 | 64.2 | — |
| 21 | | Plano | 2.136 | | | | |
| 22 | Image | Plano | — | | | | |

Note:
Reference wavelength is 587.6 nm (d-line).
An effective radius of the stop S1 (Surface 3) is 3.232 mm.
An effective radius of the stop S2 (Surface 11) is 4.950 mm.

TABLE 3B

| Aspheric Coefficients | | | | |
|---|---|---|---|---|
| Surface # | 4 | 5 | 14 | 15 |
| k= | 4.76443E+01 | 8.13520E+00 | 1.26773E+01 | 7.45165E−02 |
| A4= | −5.309E−04 | −1.874E−04 | −3.104E−04 | 2.183E−03 |
| A6= | 1.688E−05 | 2.571E−04 | 1.142E−05 | −2.605E−04 |
| A8= | −1.508E−05 | −8.455E−05 | −9.180E−07 | 2.012E−05 |
| A10= | 4.634E−06 | 1.674E−05 | 2.762E−08 | −7.665E−07 |
| A12= | −7.117E−07 | −1.829E−06 | −3.848E−10 | 1.395E−08 |
| A14= | 5.389E−08 | 1.055E−07 | — | −9.074E−11 |
| A16= | −1.592E−09 | −2.441E−09 | — | — |
| Surface # | 16 | 17 | 18 | 19 |
| k= | 7.45165E−02 | −2.61448E+01 | −4.51149E+00 | −2.53449E+01 |
| A4= | 2.157E−03 | −1.335E−03 | −2.290E−03 | −8.969E−04 |
| A6= | −2.553E−04 | 1.768E−05 | 2.334E−05 | −5.741E−06 |
| A8= | 1.956E−05 | −3.229E−07 | −2.499E−06 | 5.763E−07 |
| A10= | −7.390E−07 | 3.323E−08 | 1.269E−07 | 1.130E−08 |
| A12= | 1.334E−08 | −1.526E−09 | −1.053E−09 | −1.661E−09 |
| A14= | −8.607E−11 | 2.094E−11 | −3.538E−11 | 7.285E−11 |
| A16= | — | — | 1.971E−13 | −1.195E−12 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Optical and Physical Parameters/Definitions | | | |
|---|---|---|---|
| f [mm] | 6.26 | CT7/CT1 | 0.94 |
| Fno | 1.64 | T34/CT6 | 0.0011 |
| HFOV [deg.] | 50.9 | CT8/CT5 | 1.28 |
| FOV [deg.] | 101.8 | \|Dsr5/Dsr9\| | 0.46 |
| tan(HFOV) | 1.23 | (T12 + T34)/CT6 | 0.56 |
| TD/EPD | 6.84 | (V3 + V7)/V1 | 0.7 |
| TL/f | 4.81 | V3 + V7 + V8 | 65.3 |
| (\|f1\| + \|f7\|)/(\|f2\| + \|f8\|) | 0.24 | V4/N4 | 29.80 |
| f/f2 + f/f3 + f/f8 | 0.14 | (N2 + N6)/N3 | 1.77 |
| f/f1 + f/f7 | −1.50 | ET4/ET5 | 0.84 |
| \|f4/R7\| | 0.18 | Y5R2/Y6R2 | 1.04 |
| \|R2/R3\| | 0.17 | SAG1R2/ET1 | 0.62 |
| R8/R9 | −0.46 | Y5R1/Y3R2 | 1.22 |
| (R11 + R12)/(R11 − R12) | 0.56 | ET6/ET7 | 0.61 |
| (R13 + R14)/(R13 − R14) | −0.61 | SAG7R1/CT7 | −2.35 |
| (R14 − R15)/(R14 + R15) | 0.39 | V2 | 21.3 |

4th Embodiment

Figure 7:
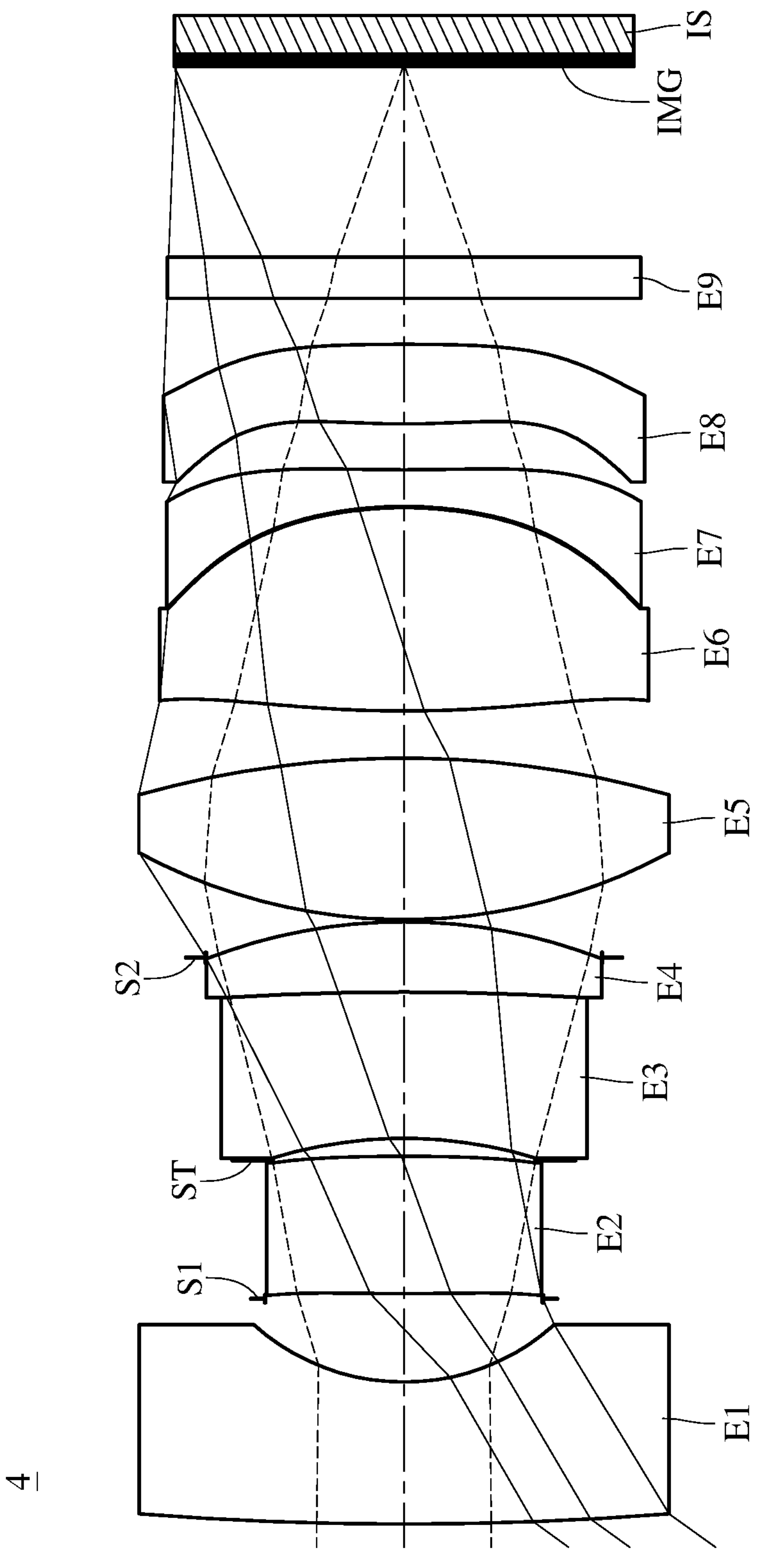
FIG. 7 is a schematic view of an image capturing unit according to the 4th embodiment of the present disclosure.
Figure 8:
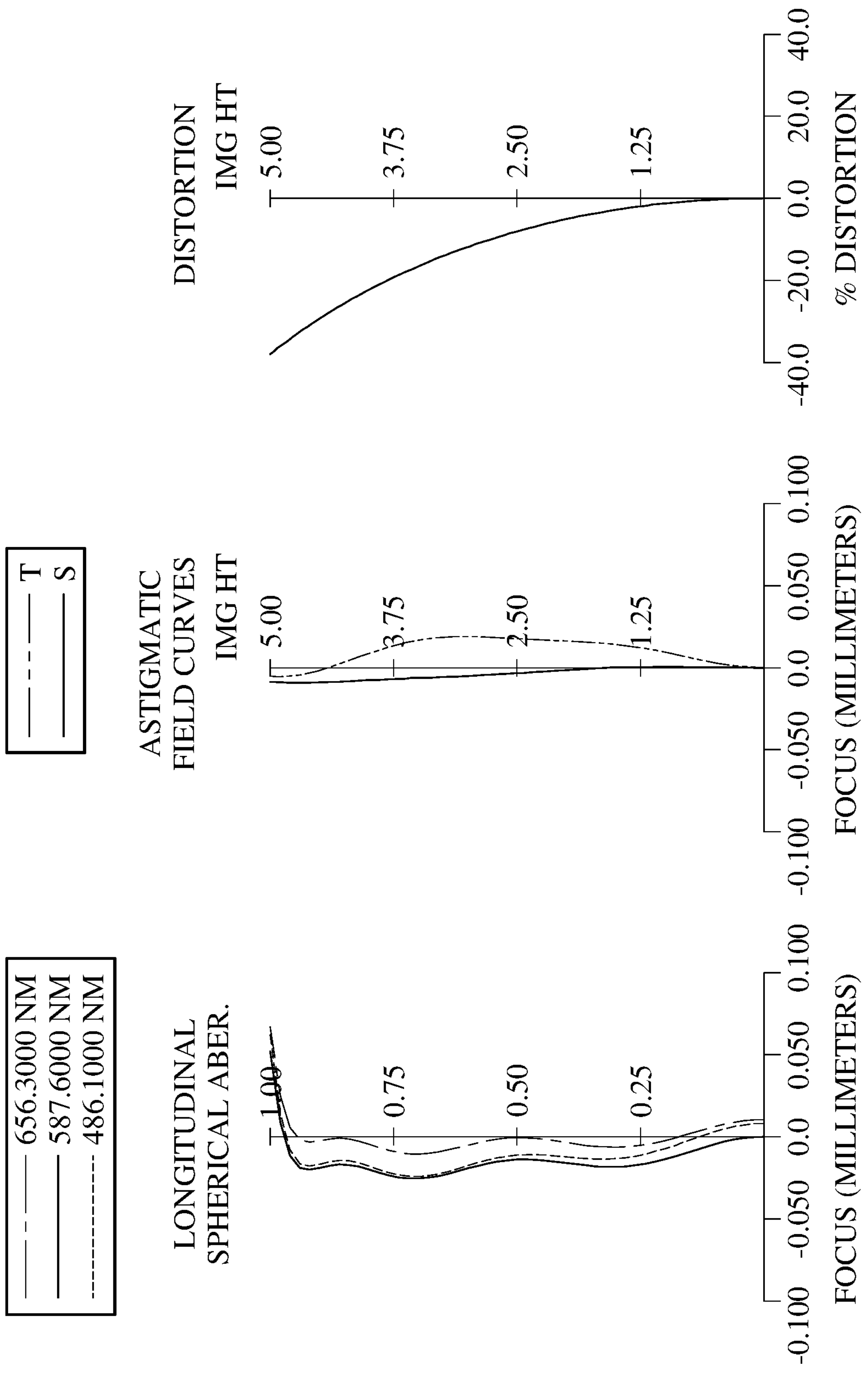
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical. The object-side surface of the fourth lens element E4 and the image-side surface of the third lens element E3 are cemented to each other.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The image-side surface of the seventh lens element E7 has one critical point in an off-axis region thereof. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being convex in a paraxial region thereof. The eighth lens element E8 is made of plastic material and has the object-side surface and the image-side surface being both aspheric. The object-side surface of the eighth lens element E8 has two inflection points. The image-side surface of the eighth lens element E8 has one inflection point. The object-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 4th embodiment, the imaging optical lens assembly includes two cemented lens sets (their reference numerals are omitted), one of the two cemented lens sets is formed by cementing the third lens element E3 and the fourth lens element E4 together, and two adjacent cemented surfaces of the third lens element E3 and the fourth lens element E4 are the image-side surface of the third lens element E3 and the object-side surface of the fourth lens element E4, respectively. The other of the two cemented lens sets is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 4th embodiment are shown in Table 4A and the aspheric surface data are shown in Table 4B below.

TABLE 4A

4th Embodiment
f = 5.79 mm, Fno = 1.52, HFOV = 54.3 deg.

| Surface # | | Curvature Radius | Thickness | Material | Index | Abbe # | Focal Length |
|---|---|---|---|---|---|---|---|
| 0 | Object | infinity | infinity | | | | |
| 1 | Lens 1 | 73.9795 (SPH) | 3.100 | Plastic | 1.697 | 56.2 | −7.70 |
| 2 | | 4.9150 (SPH) | 1.818 | | | | |
| 3 | Stop | Plano | 0.114 | | | | |
| 4 | Lens 2 | 76.9231 (ASP) | 2.996 | Plastic | 1.697 | 16.3 | 43.62 |
| 5 | | −49.4969 (ASP) | −0.081 | | | | |
| 6 | Ape. Stop | Plano | 0.474 | | | | |
| 7 | Lens 3 | −9.8254 (SPH) | 3.193 | Glass | 1.847 | 23.8 | −14.11 |
| 8 | | −63.5194 (SPH) | 0.005 | Cemented | 1.550 | 43.9 | — |
| 9 | Lens 4 | −63.5194 (SPH) | 1.529 | Glass | 1.804 | 46.6 | 18.08 |
| 10 | | −11.9584 (SPH) | −0.784 | | | | |
| 11 | Stop | Plano | 0.834 | | | | |
| 12 | Lens 5 | 12.1808 (SPH) | 3.524 | Glass | 1.804 | 46.6 | 10.11 |
| 13 | | −21.2946 (SPH) | 1.028 | | | | |
| 14 | Lens 6 | 24.2363 (ASP) | 4.438 | Plastic | 1.544 | 56.0 | 12.57 |
| 15 | | −8.9099 (ASP) | 0.030 | Cemented | 1.485 | 53.2 | — |
| 16 | Lens 7 | −8.9099 (ASP) | 0.798 | Plastic | 1.697 | 16.3 | −10.69 |
| 17 | | 47.3018 (ASP) | 1.001 | | | | |
| 18 | Lens 8 | 18.9164 (ASP) | 1.738 | Plastic | 1.639 | 23.5 | 23.26 |

TABLE 4A-continued

| 4th Embodiment f = 5.79 mm, Fno = 1.52, HFOV = 54.3 deg. | | | | | | | |
|---|---|---|---|---|---|---|---|
| Surface # | | Curvature Radius | Thickness | Material | Index | Abbe # | Focal Length |
| 19 | | −66.6667 (ASP) | 1.000 | | | | |
| 20 | Filter | Plano | 0.900 | Glass | 1.517 | 64.2 | — |
| 21 | | Plano | 4.158 | | | | |
| 22 | Image | Plano | — | | | | |

Note:
Reference wavelength is 587.6 nm (d-line).
An effective radius of the stop S1 (Surface 3) is 3.029 mm.
An effective radius of the stop S2 (Surface 11) is 4.322 mm.

TABLE 4B

| Aspheric Coefficients | | | | |
|---|---|---|---|---|
| Surface # | 4 | 5 | 14 | 15 |
| k= | 9.50000E+01 | −4.12203E+01 | 1.38198E+01 | 8.76278E−01 |
| A4= | −1.209E−03 | −1.274E−03 | −4.975E−04 | 6.548E−04 |
| A6= | 1.346E−04 | 3.623E−04 | 3.860E−06 | −2.161E−04 |
| A8= | −6.569E−05 | −1.388E−04 | −6.471E−07 | 1.724E−05 |
| A10= | 1.396E−05 | 2.756E−05 | 2.264E−08 | −7.494E−07 |
| A12= | −1.566E−06 | −2.858E−06 | −4.221E−10 | 1.601E−08 |
| A14= | 8.459E−08 | 1.382E−07 | — | −1.139E−10 |
| A16= | −1.635E−09 | −2.046E−09 | — | — |
| Surface # | 16 | 17 | 18 | 19 |
| k= | 8.76278E−01 | −9.00000E+01 | −4.56731E+01 | 4.86640E+01 |
| A4= | 6.548E−04 | −1.412E−03 | −2.367E−03 | −1.269E−03 |
| A6= | −2.161E−04 | 1.948E−06 | −6.037E−05 | −4.200E−05 |
| A8= | 1.724E−05 | 1.995E−07 | 2.496E−07 | 2.076E−06 |
| A10= | −7.494E−07 | 2.038E−08 | 6.202E−08 | −1.230E−08 |
| A12= | 1.601E−08 | −2.019E−09 | 4.543E−10 | −7.995E−10 |
| A14= | −1.139E−10 | 4.140E−11 | −1.255E−11 | 4.271E−11 |
| A16= | — | — | −3.683E−13 | −6.367E−13 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Optical and Physical Parameters/Definitions | | | |
|---|---|---|---|
| f [mm] | 5.79 | CT7/CT1 | 0.26 |
| Fno | 1.52 | T34/CT6 | 0.0011 |
| HFOV [deg.] | 54.3 | CT8/CT5 | 0.49 |
| FOV [deg.] | 108.6 | \|Dsr5/Dsr9\| | 0.09 |
| tan(HFOV) | 1.39 | (T12 + T34)/CT6 | 0.44 |
| TD/EPD | 6.76 | (V3 + V7)/V1 | 0.7 |
| TL/f | 5.50 | V3 + V7 + V8 | 63.6 |
| (\|f1\| + \|f7\|)/(\|f2\| + \|f8\|) | 0.27 | V4/N4 | 25.83 |
| f/f2 + f/f3 + f/f8 | −0.03 | (N2 + N6)/N3 | 1.75 |
| f/f1 + f/f7 | −1.29 | ET4/ET5 | 0.67 |
| \|f4/R7\| | 0.28 | Y5R2/Y6R2 | 1.12 |
| \|R2/R3\| | 0.06 | SAG1R2/ET1 | 0.30 |
| R8/R9 | −0.98 | Y5R1/Y3R2 | 1.43 |
| (R11 + R12)/(R11 − R12) | 0.46 | ET6/ET7 | 0.87 |
| (R13 + R14)/(R13 − R14) | −0.68 | SAG7R1/CT7 | −2.75 |
| (R14 − R15)/(R14 + R15) | 0.43 | V2 | 16.3 |

5th Embodiment

Figure 9:
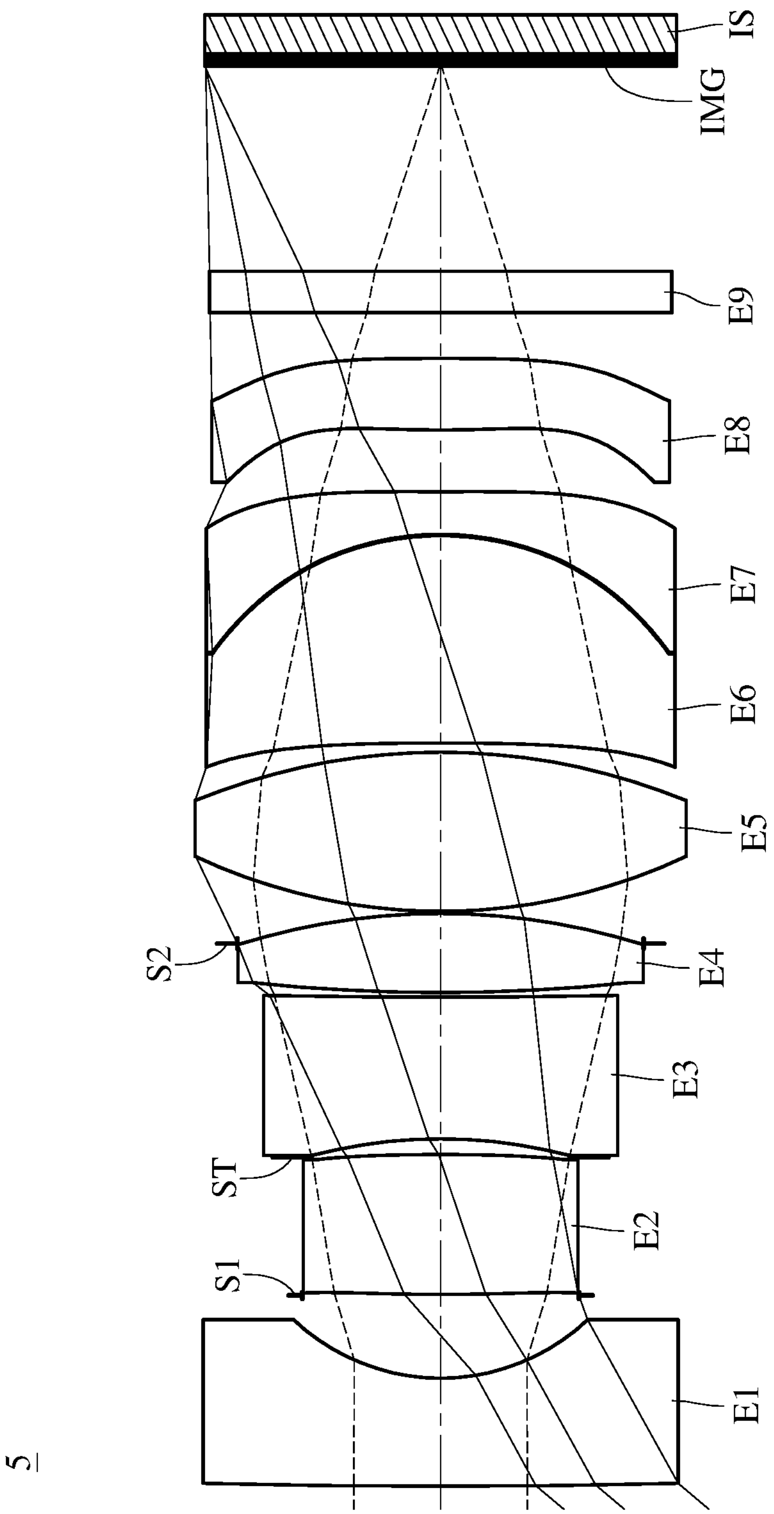
FIG. 9 is a schematic view of an image capturing unit according to the 5th embodiment of the present disclosure.
Figure 10:
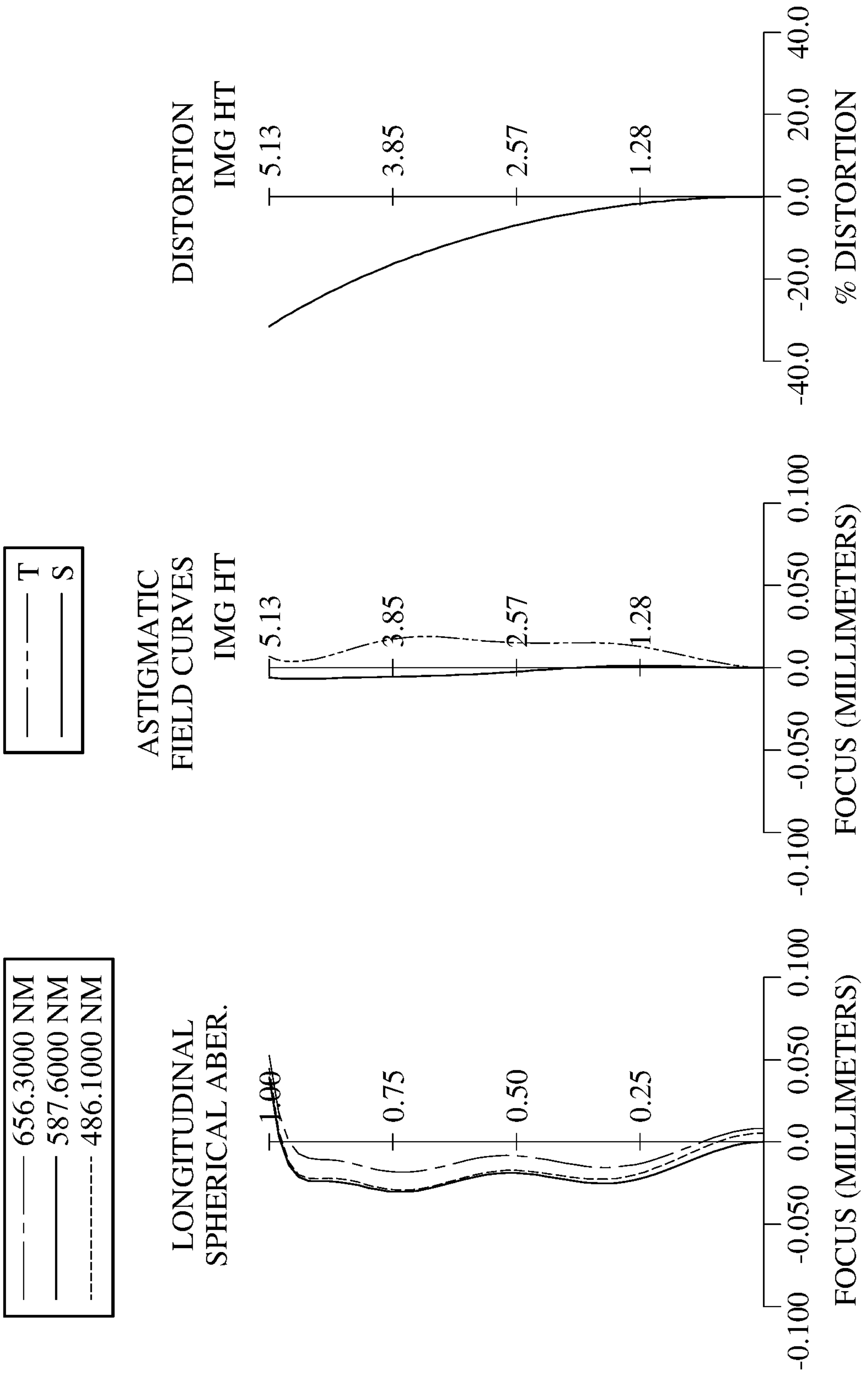
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one critical point in an off-axis region thereof. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being convex in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 5th embodiment, the imaging optical lens assembly includes a cemented lens set (its reference numeral is omitted), the cemented lens set is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 5th embodiment are shown in Table 5A and the aspheric surface data are shown in Table 5B below.

TABLE 5A

| 5th Embodiment<br>f = 6.29 mm, Fno = 1.66, HFOV = 50.0 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | 212.7259 (SPH) | 2.359 | Glass | 1.617 | 53.9 | −7.77 |
| 2 | | 4.6711 (SPH) | 1.805 | | | | |
| 3 | Stop | Plano | 0.022 | | | | |
| 4 | Lens 2 | 41.9988 (ASP) | 3.052 | Plastic | 1.697 | 16.3 | 33.89 |
| 5 | | −52.3872 (ASP) | −0.062 | | | | |
| 6 | Ape. Stop | Plano | 0.406 | | | | |
| 7 | Lens 3 | −11.1050 (SPH) | 3.090 | Glass | 1.805 | 25.5 | −12.90 |
| 8 | | 179.9611 (SPH) | 0.100 | | | | |
| 9 | Lens 4 | 37.9997 (SPH) | 1.725 | Glass | 1.804 | 46.6 | 13.47 |
| 10 | | −14.8387 (SPH) | −0.655 | | | | |
| 11 | Stop | Plano | 0.705 | | | | |
| 12 | Lens 5 | 12.5103 (SPH) | 3.473 | Glass | 1.772 | 49.6 | 9.11 |
| 13 | | −14.1294 (SPH) | 0.199 | | | | |
| 14 | Lens 6 | −90.9091 (ASP) | 4.526 | Plastic | 1.544 | 56.0 | 12.00 |
| 15 | | −6.1957 (ASP) | 0.030 | Cemented | 1.485 | 53.2 | — |
| 16 | Lens 7 | −6.1957 (ASP) | 0.929 | Plastic | 1.660 | 20.4 | −9.19 |
| 17 | | 306.5627 (ASP) | 1.347 | | | | |
| 18 | Lens 8 | 23.3886 (ASP) | 1.560 | Plastic | 1.639 | 23.5 | 33.10 |
| 19 | | −213.6451 (ASP) | 1.000 | | | | |
| 20 | Filter | Plano | 0.900 | Glass | 1.517 | 64.2 | — |
| 21 | | Plano | 4.481 | | | | |
| 22 | Image | Plano | — | | | | |

Note:
Reference wavelength is 587.6 nm (d-line).
An effective radius of the stop S1 (Surface 3) is 3.016 mm.
An effective radius of the stop S2 (Surface 11) is 4.433 mm.

TABLE 5B

| Aspheric Coefficients | | | | |
|---|---|---|---|---|
| Surface # | 4 | 5 | 14 | 15 |
| k= | 5.14122E+01 | −7.84455E+01 | 9.00000E+01 | 2.86119E−01 |
| A4= | −1.006E−03 | −1.215E−03 | −5.162E−04 | 1.253E−03 |
| A6= | 1.377E−04 | 3.812E−04 | 5.745E−06 | −2.236E−04 |
| A8= | −6.555E−05 | −1.425E−04 | −5.581E−07 | 1.808E−05 |
| A10= | 1.396E−05 | 2.778E−05 | 2.210E−08 | −7.287E−07 |
| A12= | −1.565E−06 | −2.857E−06 | −3.980E−10 | 1.484E−08 |
| A14= | 8.451E−08 | 1.382E−07 | — | −9.577E−11 |
| A16= | −1.635E−09 | −2.046E−09 | — | — |
| Surface # | 16 | 17 | 18 | 19 |
| k= | 2.86119E−01 | 8.37200E+01 | −7.23153E+01 | 9.00000E+01 |
| A4= | 1.253E−03 | −1.370E−03 | −2.590E−03 | −1.604E−03 |
| A6= | −2.236E−04 | 5.514E−06 | −6.087E−05 | −3.671E−05 |
| A8= | 1.808E−05 | 1.827E−07 | 4.196E−07 | 2.294E−06 |
| A10= | −7.287E−07 | 1.814E−08 | 7.741E−08 | −1.379E−08 |
| A12= | 1.484E−08 | −1.774E−09 | −1.298E−10 | −1.176E−09 |
| A14= | −9.577E−11 | 3.079E−11 | −9.222E−12 | 6.257E−11 |
| A16= | — | — | −7.111E−13 | −9.909E−13 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE C

| Values of Optical and Physical Parameters/Definitions | | | |
|---|---|---|---|
| f [mm] | 6.29 | CT7/CT1 | 0.39 |
| Fno | 1.66 | T34/CT6 | 0.02 |
| HFOV [deg.] | 50.0 | CT8/CT5 | 0.45 |
| FOV [deg.] | 100.0 | \|Dsr5/Dsr9\| | 0.08 |
| tan(HFOV) | 1.19 | (T12 + T34)/CT6 | 0.43 |
| TD/EPD | 6.50 | (V3 + V7)/V1 | 0.9 |
| TL/f | 4.93 | V3 + V7 + V8 | 69.4 |
| (\|f1\| + \|f7\|)/(\|f2\| + \|f8\|) | 0.25 | V4/N4 | 25.83 |
| f/f2 + f/f3 + f/f8 | −0.11 | (N2 + N6)/N3 | 1.80 |
| f/f1 + f/f7 | −1.49 | ET4/ET5 | 0.67 |
| \|f4/R7\| | 0.35 | Y5R2/Y6R2 | 1.07 |
| \|R2/R3\| | 0.11 | SAG1R2/ET1 | 0.36 |
| R8/R9 | −1.19 | Y5R1/Y3R2 | 1.34 |
| (R11 + R12)/(R11 − R12) | 1.15 | ET6/ET7 | 0.91 |
| (R13 + R14)/(R13 − R14) | −0.96 | SAG7R1/CT7 | −2.77 |
| (R14 − R15)/(R14 + R15) | 0.86 | V2 | 16.3 |

6th Embodiment

Figure 11:
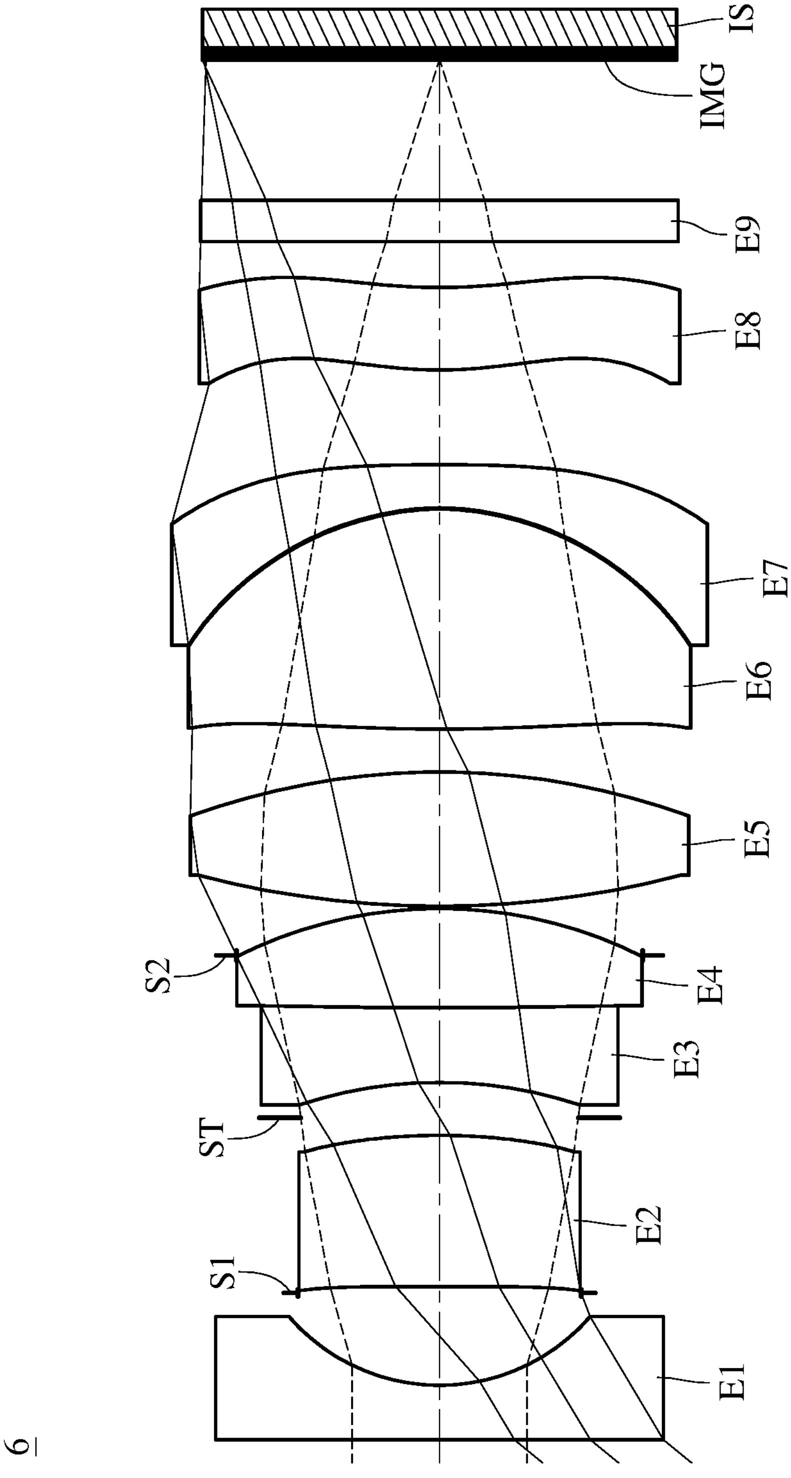
FIG. 11 is a schematic view of an image capturing unit according to the 6th embodiment of the present disclosure.
Figure 12:
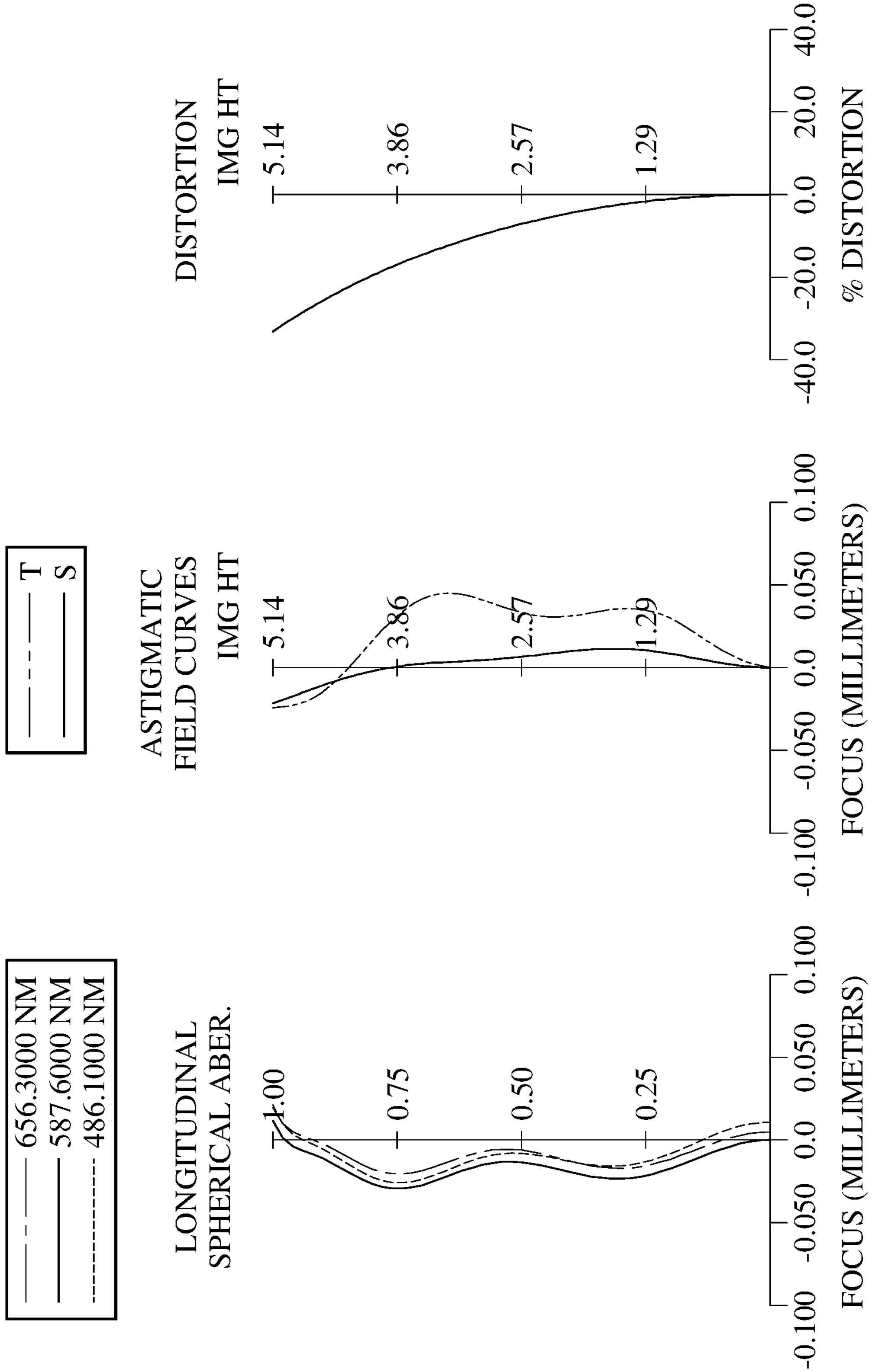
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being planar in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 and the image-side surface of the third lens element E3 are cemented to each other.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The object-side surface of the sixth lens element E6 has one critical point in an off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 6th embodiment, the imaging optical lens assembly includes two cemented lens sets (their reference numerals are omitted), one of the two cemented lens sets is formed by cementing the third lens element E3 and the fourth lens element E4 together, and two adjacent cemented surfaces of the third lens element E3 and the fourth lens element E4 are the image-side surface of the third lens element E3 and the object-side surface of the fourth lens element E4, respectively. The other of the two cemented lens sets is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 6th embodiment are shown in Table 6A and the aspheric surface data are shown in Table 6B below.

TABLE 6A

| 6th Embodiment<br>f = 6.25 mm, Fno = 1.64, HFOV = 50.9 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | infinity (SPH) | 1.190 | Glass | 1.517 | 64.2 | −8.40 |
| 2 | | 4.3430 (SPH) | 2.017 | | | | |
| 3 | Stop | Plano | 0.138 | | | | |
| 4 | Lens 2 | 3182.6857 (ASP) | 3.300 | Plastic | 1.656 | 21.3 | 21.73 |
| 5 | | −14.3152 (ASP) | 0.384 | | | | |
| 6 | Ape. Stop | Plano | 0.773 | | | | |
| 7 | Lens 3 | −9.8163 (SPH) | 1.628 | Glass | 1.805 | 25.5 | −11.52 |
| 8 | | 179.7489 (SPH) | 0.005 | Cemented | 1.550 | 43.9 | — |
| 9 | Lens 4 | 179.7489 (SPH) | 2.164 | Glass | 1.772 | 49.6 | 12.15 |
| 10 | | −9.8497 (SPH) | −1.027 | | | | |
| 11 | Stop | Plano | 1.077 | | | | |
| 12 | Lens 5 | 20.8880 (SPH) | 2.926 | Glass | 1.697 | 55.5 | 13.38 |
| 13 | | −15.8651 (SPH) | 0.937 | | | | |
| 14 | Lens 6 | 39.5440 (ASP) | 4.800 | Plastic | 1.544 | 55.9 | 9.32 |
| 15 | | −5.5645 (ASP) | 0.030 | Cemented | 1.485 | 53.2 | — |
| 16 | Lens 7 | −5.5645 (ASP) | 0.940 | Plastic | 1.656 | 21.3 | −9.45 |
| 17 | | −57.8092 (ASP) | 2.068 | | | | |
| 18 | Lens 8 | 9.1800 (ASP) | 1.800 | Plastic | 1.656 | 21.3 | 46.63 |
| 19 | | 12.0974 (ASP) | 1.000 | | | | |
| 20 | Filter | Plano | 0.900 | Glass | 1.517 | 64.2 | — |
| 21 | | Plano | 3.053 | | | | |
| 22 | Image | Plano | — | | | | |

Note:
Reference wavelength is 587.6 nm (d-line).
An effective radius of the stop S1 (Surface 3) is 3.090 mm.
An effective radius of the stop S2 (Surface 11) is 4.430 mm.

TABLE 6B

| Aspheric Coefficients | | | | |
|---|---|---|---|---|
| Surface # | 4 | 5 | 14 | 15 |
| k= | −9.50000E+01 | 3.91552E−01 | 4.63302E+01 | −5.90496E−01 |
| A4= | −1.074E−03 | −1.070E−03 | −4.089E−04 | 2.664E−03 |
| A6= | 2.328E−04 | 3.485E−04 | 5.087E−06 | −3.393E−04 |

TABLE 6B-continued

| Aspheric Coefficients | | | | |
|---|---|---|---|---|
| A8= | −8.653E−05 | −1.117E−04 | −7.997E−07 | 2.137E−05 |
| A10= | 1.599E−05 | 1.824E−05 | 2.843E−08 | −7.212E−07 |
| A12= | −1.612E−06 | −1.580E−06 | −5.217E−10 | 1.211E−08 |
| A14= | 8.008E−08 | 6.485E−08 | — | −8.299E−11 |
| A16= | −1.462E−09 | −8.511E−10 | — | — |
| Surface # | 16 | 17 | 18 | 19 |
| k= | −5.90496E−01 | 8.67436E+01 | −1.58591E+01 | −2.53838E+01 |
| A4= | 2.664E−03 | −1.090E−03 | −7.932E−04 | −3.769E−04 |
| A6= | −3.393E−04 | 9.176E−06 | −1.028E−04 | −9.514E−05 |
| A8= | 2.137E−05 | −2.347E−07 | 2.065E−06 | 4.261E−06 |
| A10= | −7.212E−07 | 3.962E−08 | 6.343E−08 | −4.613E−08 |
| A12= | 1.211E−08 | −1.630E−09 | −1.065E−09 | −1.624E−09 |
| A14= | −8.299E−11 | 2.070E−11 | −3.222E−11 | 7.472E−11 |
| A16= | — | — | 2.317E−13 | −1.125E−12 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Optical and Physical Parameters/Definitions | | | |
|---|---|---|---|
| f [mm] | 6.25 | CT7/CT1 | 0.79 |
| Fno | 1.64 | T34/CT6 | 0.0010 |
| HFOV [deg.] | 50.9 | CT8/CT5 | 0.62 |
| FOV [deg.] | 101.8 | \|Dsr5/Dsr9\| | 0.17 |
| tan(HFOV) | 1.23 | (T12 + T34)/CT6 | 0.45 |
| TD/EPD | 6.60 | (V3 + V7)/V1 | 0.7 |
| TL/f | 4.82 | V3 + V7 + V8 | 68.1 |
| (\|f1\| + \|f7\|)/(\|f2\| + \|f8\|) | 0.26 | V4/N4 | 27.99 |
| f/f2 + f/f3 + f/f8 | −0.12 | (N2 + N6)/N3 | 1.77 |
| f/f1 + f/f7 | −1.41 | ET4/ET5 | 0.83 |
| \|f4/R7\| | 0.07 | Y5R2/Y6R2 | 0.99 |
| \|R2/R3\| | 0.0014 | SAG1R2/ET1 | 0.56 |
| R8/R9 | −0.47 | Y5R1/Y3R2 | 1.32 |
| (R11 + R12)/(R11 − R12) | 0.75 | ET6/ET7 | 0.67 |
| (R13 + R14)/(R13 − R14) | −1.21 | SAG7R1/CT7 | −3.19 |
| (R14 − R15)/(R14 + R15) | 1.38 | V2 | 21.3 |

7th Embodiment

Figure 13:
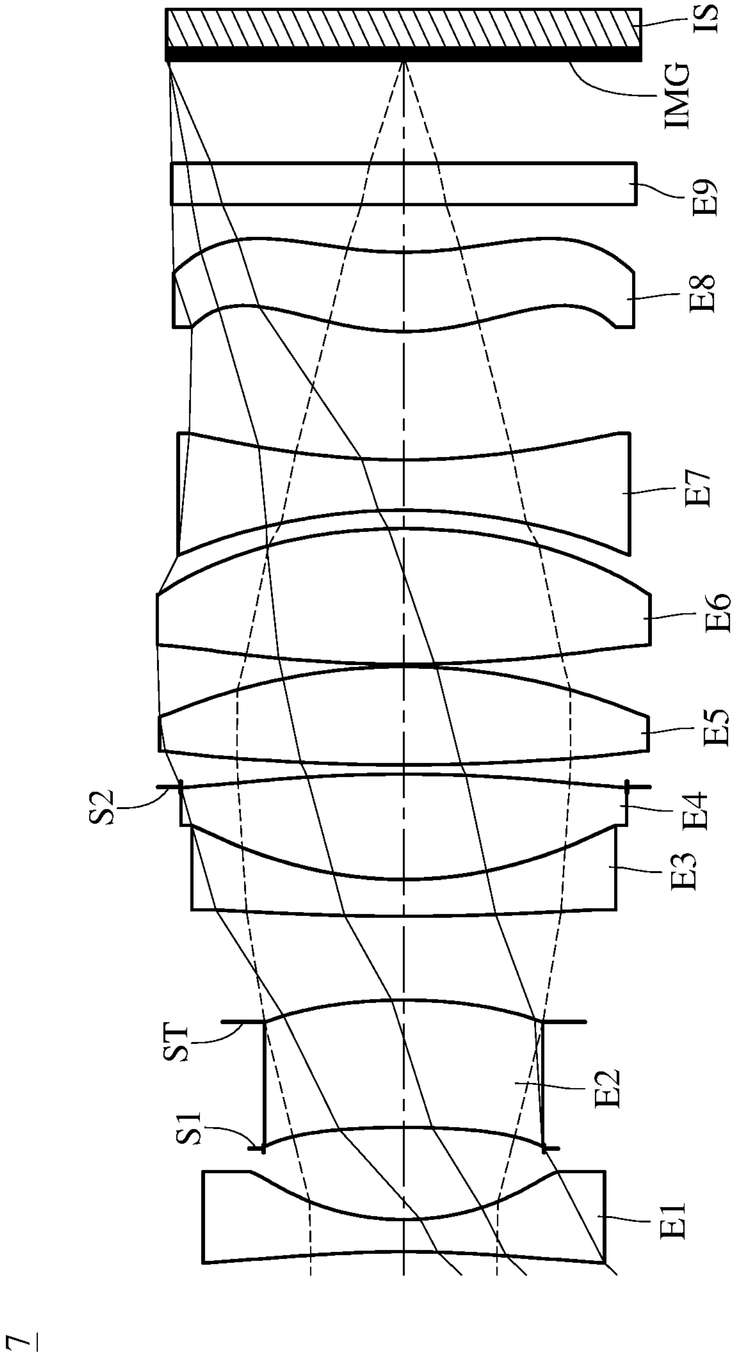
FIG. 13 is a schematic view of an image capturing unit according to the 7th embodiment of the present disclosure.
Figure 14:
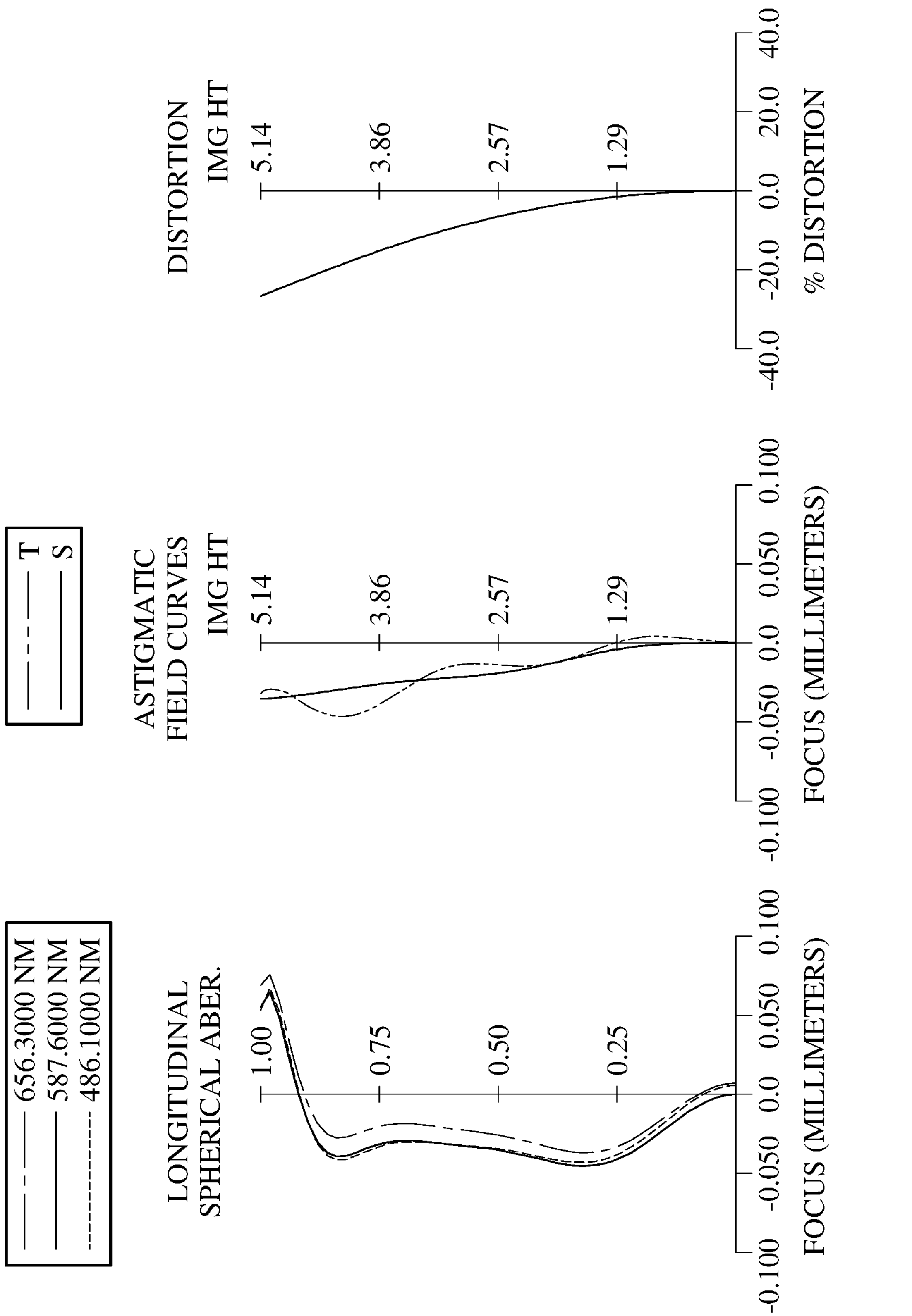
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of glass material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point. The image-side surface of the fourth lens element E4 has two inflection points. The object-side surface of the fourth lens element E4 and the image-side surface of the third lens element E3 are cemented to each other.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric. The object-side surface of the fifth lens element E5 has one inflection point. The image-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has two inflection points.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 7th embodiment, the imaging optical lens assembly includes a cemented lens set (its reference numeral is omitted), the cemented lens set is formed by cementing the third lens element E3 and the fourth lens element E4 together, and two adjacent cemented surfaces of the third lens element E3 and the fourth lens element E4 are both aspheric, where the two adjacent cemented surfaces of the third lens element E3 and the fourth lens element E4 are the image-side surface of the third lens element E3 and the object-side surface of the fourth lens element E4, respectively.

The detailed optical data of the 7th embodiment are shown in Table 7A and the aspheric surface data are shown in Table 7B below.

TABLE 7A

| 7th Embodiment<br>f = 6.66 mm, Fno = 1.64, HFOV = 46.5 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | −22.7143 (ASP) | 0.700 | Glass | 1.497 | 81.6 | −9.14 |
| 2 | | 5.7332 (ASP) | 1.548 | | | | |
| 3 | Stop | Plano | 0.465 | | | | |
| 4 | Lens 2 | −21.7824 (ASP) | 2.779 | Plastic | 1.656 | 21.3 | 34.54 |
| 5 | | −11.6668 (ASP) | −0.474 | | | | |
| 6 | Ape. Stop | Plano | 2.304 | | | | |
| 7 | Lens 3 | 50.0000 (ASP) | 0.800 | Glass | 1.808 | 22.7 | −13.11 |
| 8 | | 8.6790 (ASP) | 0.005 | Cemented | 1.550 | 43.9 | — |
| 9 | Lens 4 | 8.6790 (ASP) | 2.296 | Glass | 1.804 | 46.6 | 8.85 |
| 10 | | −34.7310 (ASP) | −0.281 | | | | |
| 11 | Stop | Plano | 0.484 | | | | |
| 12 | Lens 5 | 44.6400 (ASP) | 2.146 | Glass | 1.804 | 46.6 | 12.83 |
| 13 | | −13.1276 (ASP) | 0.050 | | | | |
| 14 | Lens 6 | 24.1885 (ASP) | 2.964 | Plastic | 1.544 | 55.9 | 15.61 |
| 15 | | −12.5000 (ASP) | 0.400 | | | | |
| 16 | Lens 7 | −13.5337 (ASP) | 1.096 | Plastic | 1.650 | 21.8 | −10.06 |
| 17 | | 13.0477 (ASP) | 2.805 | | | | |
| 18 | Lens 8 | 5.5962 (ASP) | 1.732 | Plastic | 1.562 | 44.6 | 24.10 |
| 19 | | 8.4762 (ASP) | 1.041 | | | | |
| 20 | Filter | Plano | 0.900 | Glass | 1.517 | 64.2 | — |
| 21 | | Plano | 2.239 | | | | |
| 22 | Image | Plano | — | | | | |

Note:
Reference wavelength is 587.6 nm (d-line).
An effective radius of the stop S1 (Surface 3) is 3.059 mm.
An effective radius of the stop S2 (Surface 11) is 4.872 mm.

TABLE 7B

| Aspheric Coefficients | | | | | | |
|---|---|---|---|---|---|---|
| Surface # | 1 | 2 | 4 | 5 | 7 | 8 |
| k= | −8.15181E+01 | 2.40560E−02 | 4.64378E+01 | 8.97333E+00 | −9.50000E+01 | 7.69531E−01 |
| A4= | 3.357E−04 | 1.186E−03 | −7.166E−04 | −4.405E−04 | −6.267E−06 | −6.219E−04 |
| A6= | −5.373E−05 | −1.105E−04 | −3.113E−04 | 2.957E−04 | −4.053E−06 | 3.186E−05 |
| A8= | 5.310E−06 | −1.754E−07 | 1.383E−04 | −1.201E−04 | 3.233E−07 | −4.903E−06 |

TABLE 7B-continued

| Aspheric Coefficients | | | | | | |
|---|---|---|---|---|---|---|
| A10= | −2.553E−07 | 1.324E−06 | −3.709E−05 | 2.978E−05 | −2.963E−09 | 3.392E−07 |
| A12= | 4.716E−09 | −1.307E−07 | 5.795E−06 | −4.087E−06 | −4.413E−10 | −8.211E−09 |
| A14= | — | — | −4.919E−07 | 2.928E−07 | — | — |
| A16= | — | — | 1.753E−08 | −8.377E−09 | — | — |
| Surface # | 9 | 10 | 12 | 13 | 14 | 15 |
| k= | 7.69531E−01 | −1.05533E+01 | −5.17479E+00 | −3.07744E−01 | 1.02894E+01 | 2.74393E+00 |
| A4= | −6.219E−04 | 1.845E−04 | 3.195E−04 | −8.956E−05 | −5.866E−04 | −3.777E−05 |
| A6= | 3.186E−05 | −4.975E−05 | −6.333E−05 | 1.212E−05 | 5.395E−06 | −4.725E−06 |
| A8= | −4.903E−06 | 3.338E−06 | 3.916E−06 | −9.042E−08 | 2.280E−06 | −1.193E−06 |
| A10= | 3.392E−07 | −4.862E−08 | −9.297E−08 | −2.916E−08 | −1.345E−07 | 1.963E−07 |
| A12= | −8.211E−09 | −5.974E−10 | 6.840E−10 | 7.807E−10 | 2.048E−09 | −8.378E−09 |
| A14= | — | — | — | — | — | 1.150E−10 |
| Surface # | 16 | 17 | 18 | 19 | — | — |
| k= | 2.31934E+00 | 2.61518E+00 | −4.75000E+00 | −1.28663E+01 | — | — |
| A4= | −1.569E−03 | −3.661E−03 | −8.291E−04 | −2.057E−05 | — | — |
| A6= | 4.072E−04 | 5.500E−04 | −1.293E−04 | −2.901E−04 | — | — |
| A8= | −4.282E−05 | −4.805E−05 | 4.333E−06 | 2.398E−05 | — | — |
| A10= | 2.335E−06 | 2.341E−06 | 1.580E−07 | −1.330E−06 | — | — |
| A12= | −6.534E−08 | −6.141E−08 | −3.089E−08 | 4.412E−08 | — | — |
| A14= | 7.438E−10 | 6.730E−10 | 1.182E−09 | −8.034E−10 | — | — |
| A16= | — | — | −1.517E−11 | 6.331E−12 | — | — |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Optical and Physical Parameters/Definitions | | | |
|---|---|---|---|
| f [mm] | 6.66 | CT7/CT1 | 1.57 |
| Fno | 1.64 | T34/CT6 | 0.0017 |
| HFOV [deg.] | 46.5 | CT8/CT5 | 0.81 |
| FOV [deg.] | 93.0 | \|Dsr5/Dsr9\| | 0.41 |
| tan(HFOV) | 1.05 | (T12 + T34)/CT6 | 0.68 |
| TD/EPD | 5.37 | (V3 + V7)/V1 | 0.5 |
| TL/f | 3.90 | V3 + V7 + V8 | 89.1 |
| (\|f1\| + \|f7\|)/(\|f2\| + \|f8\|) | 0.33 | V4/N4 | 25.83 |
| f/f2 + f/f3 + f/f8 | −0.04 | (N2 + N6)/N3 | 1.77 |
| f/f1 + f/f7 | −1.39 | ET4/ET5 | 1.06 |
| \|f4/R7\| | 1.02 | Y5R2/Y6R2 | 0.99 |
| \|R2/R3\| | 0.26 | SAG1R2/ET1 | 0.53 |
| R8/R9 | −0.78 | Y5R1/Y3R2 | 1.11 |
| (R11 + R12)/(R11 − R12) | 0.32 | ET6/ET7 | 0.41 |
| (R13 + R14)/(R13 − R14) | 0.02 | SAG7R1/CT7 | −0.90 |
| (R14 − R15)/(R14 + R15) | 0.40 | V2 | 21.3 |

8th Embodiment

Figure 15:
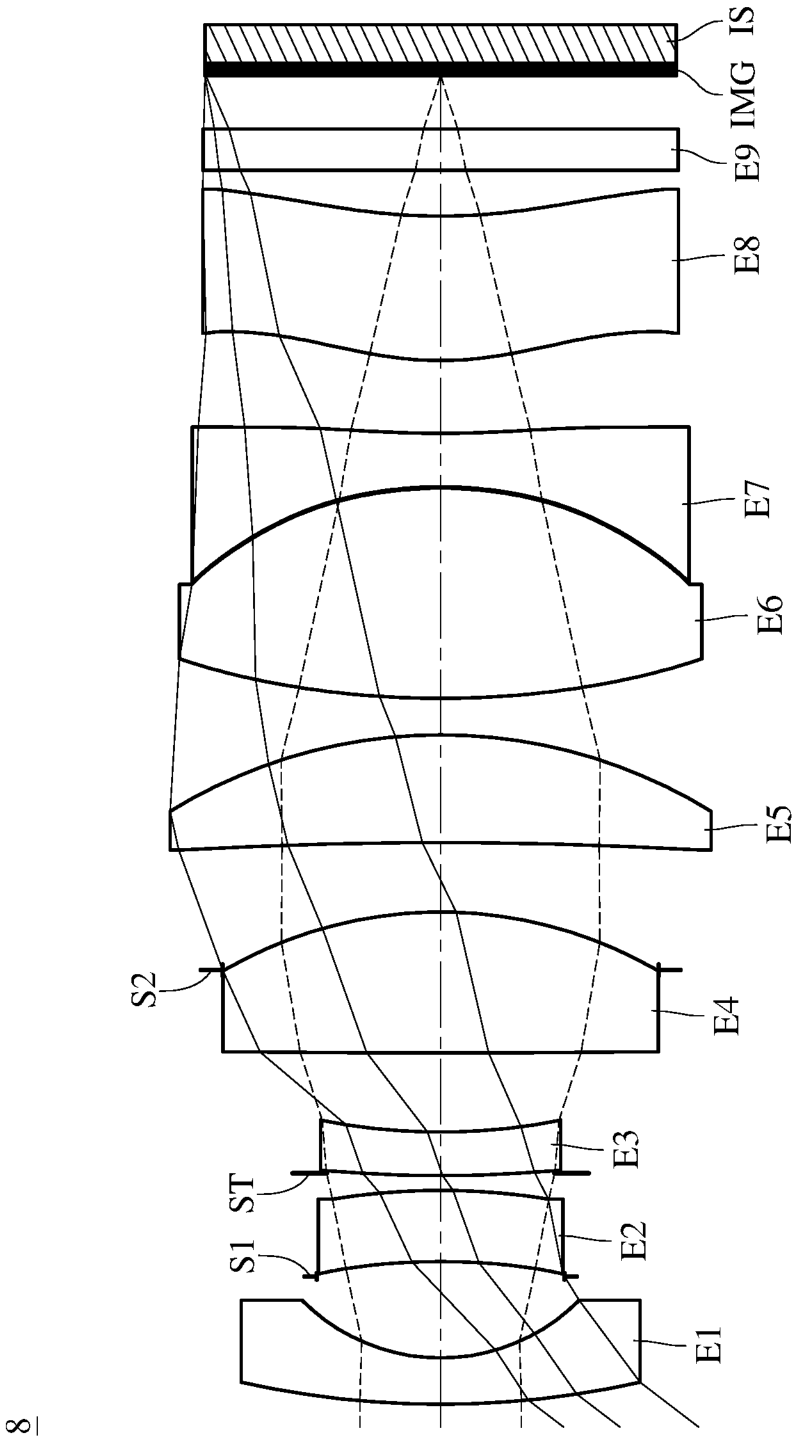
FIG. 15 is a schematic view of an image capturing unit according to the 8th embodiment of the present disclosure.
Figure 16:
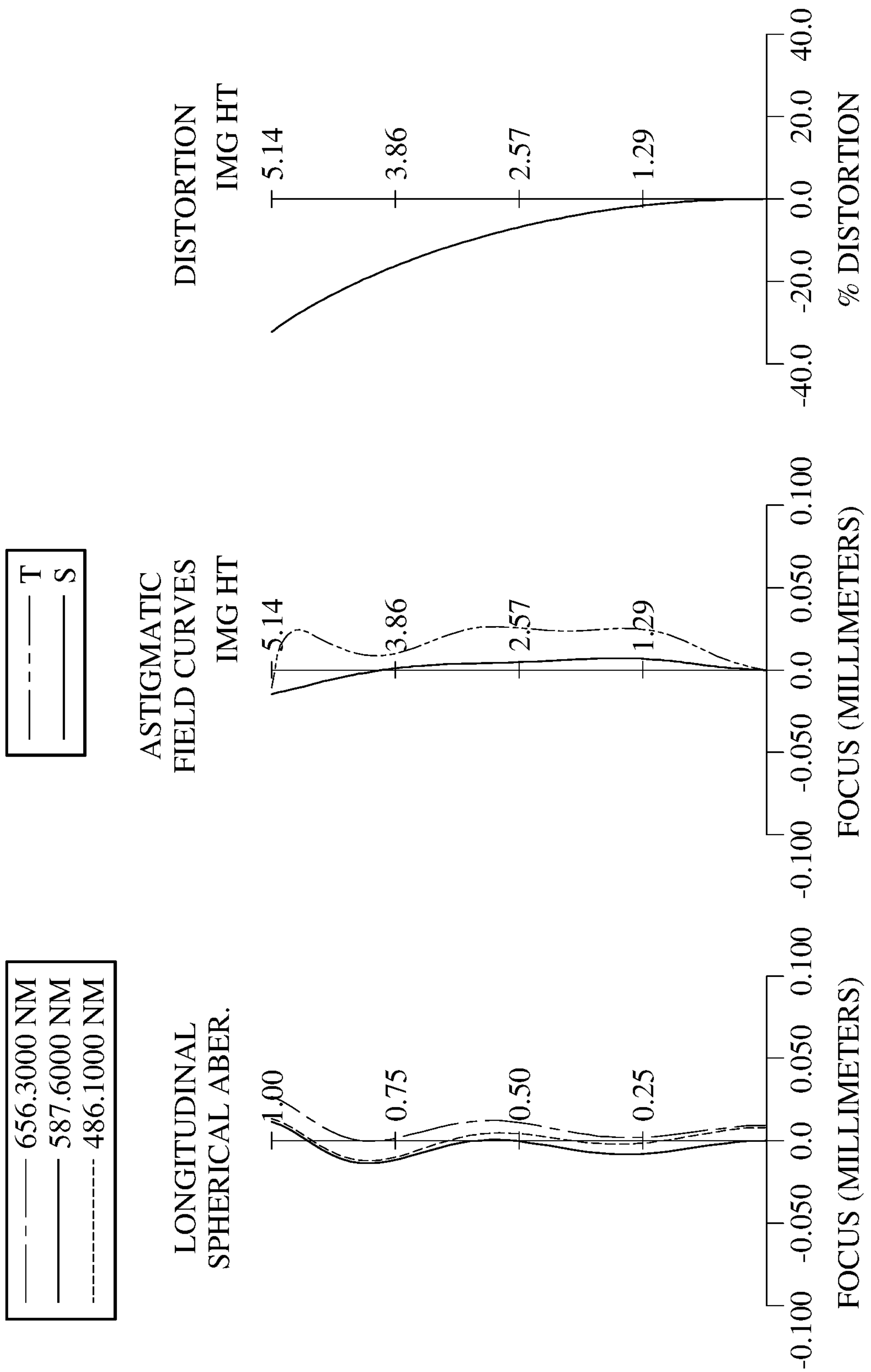
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being concave in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has three inflection points. The image-side surface of the seventh lens element E7 has one critical point in an off-axis region thereof. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 8th embodiment, the imaging optical lens assembly includes a cemented lens set (its reference numeral is omitted), the cemented lens set is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 8th embodiment are shown in Table 8A and the aspheric surface data are shown in Table 8B below.

TABLE 8A

| 8th Embodiment<br>f = 5.82 mm, Fno = 1.65, HFOV = 52.5 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | 20.0000 (SPH) | 1.010 | Glass | 1.572 | 57.5 | −9.68 |
| 2 | | 4.2581 (SPH) | 1.778 | | | | |
| 3 | Stop | Plano | 0.324 | | | | |
| 4 | Lens 2 | −15.8644 (ASP) | 1.555 | Plastic | 1.697 | 16.3 | 213.75 |
| 5 | | −14.9154 (ASP) | 0.378 | | | | |
| 6 | Ape. Stop | Plano | −0.054 | | | | |
| 7 | Lens 3 | 28.6692 (SPH) | 0.950 | Glass | 1.805 | 25.5 | −31.33 |
| 8 | | 13.2215 (SPH) | 1.729 | | | | |
| 9 | Lens 4 | 354.6948 (SPH) | 3.075 | Glass | 1.804 | 46.6 | 11.47 |
| 10 | | −9.4340 (SPH) | −1.264 | | | | |
| 11 | Stop | Plano | 2.778 | | | | |
| 12 | Lens 5 | −100.0000 (SPH) | 2.353 | Glass | 1.772 | 49.6 | 16.26 |
| 13 | | −11.2766 (SPH) | 0.796 | | | | |
| 14 | Lens 6 | 19.6418 (ASP) | 4.590 | Plastic | 1.544 | 56.0 | 11.82 |
| 15 | | −8.7731 (ASP) | 0.030 | Cemented | 1.485 | 53.2 | — |
| 16 | Lens 7 | −8.7731 (ASP) | 1.165 | Plastic | 1.697 | 16.3 | −8.75 |
| 17 | | 21.0901 (ASP) | 1.591 | | | | |
| 18 | Lens 8 | 7.2392 (ASP) | 3.152 | Plastic | 1.566 | 37.4 | 25.85 |
| 19 | | 12.0748 (ASP) | 1.000 | | | | |
| 20 | Filter | Plano | 0.900 | Glass | 1.517 | 64.2 | — |
| 21 | | Plano | 1.158 | | | | |
| 22 | Image | Plano | — | | | | |

Note:
Reference wavelength is 587.6 nm (d-line).
An effective radius of the stop S1 (Surface 3) is 2.701 mm.
An effective radius of the stop S2 (Surface 11) is 4.759 mm.

TABLE 8B

| Aspheric Coefficients | | | | |
|---|---|---|---|---|
| Surface # | 4 | 5 | 14 | 15 |
| k= | 2.12542E+01 | −6.48573E+00 | 9.12006E+00 | 1.31829E+00 |
| A4= | −3.446E−04 | −7.415E−04 | −2.830E−04 | 1.232E−03 |
| A6= | 2.400E−04 | 4.326E−04 | 1.247E−05 | −2.465E−04 |
| A8= | −7.982E−05 | −1.655E−04 | −8.557E−07 | 1.965E−05 |
| A10= | 1.601E−05 | 3.216E−05 | 2.685E−08 | −7.220E−07 |

TABLE 8B-continued

| Aspheric Coefficients | | | | |
|---|---|---|---|---|
| A12= | −1.658E−06 | −3.143E−06 | −4.030E−10 | 1.285E−08 |
| A14= | 8.538E−08 | 1.388E−07 | — | −7.955E−11 |
| A16= | −1.551E−09 | −2.130E−09 | — | — |
| Surface # | 16 | 17 | 18 | 19 |
| k= | 1.31829E+00 | −2.54555E+01 | −7.71619E+00 | −1.71818E+01 |
| A4= | 1.232E−03 | −1.052E−03 | −1.829E−04 | 4.989E−04 |
| A6= | −2.465E−04 | 1.245E−05 | −5.985E−05 | −6.520E−05 |
| A8= | 1.965E−05 | 3.991E−07 | 3.953E−07 | 2.200E−06 |
| A10= | −7.220E−07 | 2.858E−08 | 7.640E−08 | −2.246E−08 |
| A12= | 1.285E−08 | −1.720E−09 | −6.065E−10 | −1.274E−09 |
| A14= | −7.955E−11 | 1.986E−11 | −3.124E−11 | 1.021E−10 |
| A16= | — | — | −2.030E−13 | −2.349E−12 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Optical and Physical Parameters/Definitions | | | |
|---|---|---|---|
| f [mm] | 5.82 | CT7/CT1 | 1.15 |
| Fno | 1.65 | T34/CT6 | 0.38 |
| HFOV [deg.] | 52.5 | CT8/CT5 | 1.34 |
| FOV [deg.] | 105.0 | \|Dsr5/Dsr9\| | 0.01 |
| tan(HFOV) | 1.30 | (T12 + T34)/CT6 | 0.83 |
| TD/EPD | 7.35 | (V3 + V7)/V1 | 0.7 |
| TL/f | 4.98 | V3 + V7 + V8 | 79.2 |
| (\|f1\| + \|f7\|)/(\|f2\| + \|f8\|) | 0.08 | V4/N4 | 25.83 |
| f/f2 + f/f3 + f/f8 | 0.07 | (N2 + N6)/N3 | 1.80 |
| f/f1 + f/f7 | −1.27 | ET4/ET5 | 2.08 |
| \|f4/R7\| | 0.03 | Y5R2/Y6R2 | 1.09 |
| \|R2/R3\| | 0.27 | SAG1R2/ET1 | 0.70 |
| R8/R9 | 0.09 | Y5R1/Y3R2 | 2.05 |
| (R11 + R12)/(R11 − R12) | 0.38 | ET6/ET7 | 0.48 |
| (R13 + R14)/(R13 − R14) | −0.41 | SAG7R1/CT7 | −1.80 |
| (R14 − R15)/(R14 + R15) | 0.49 | V2 | 16.3 |

9th Embodiment

Figure 17:
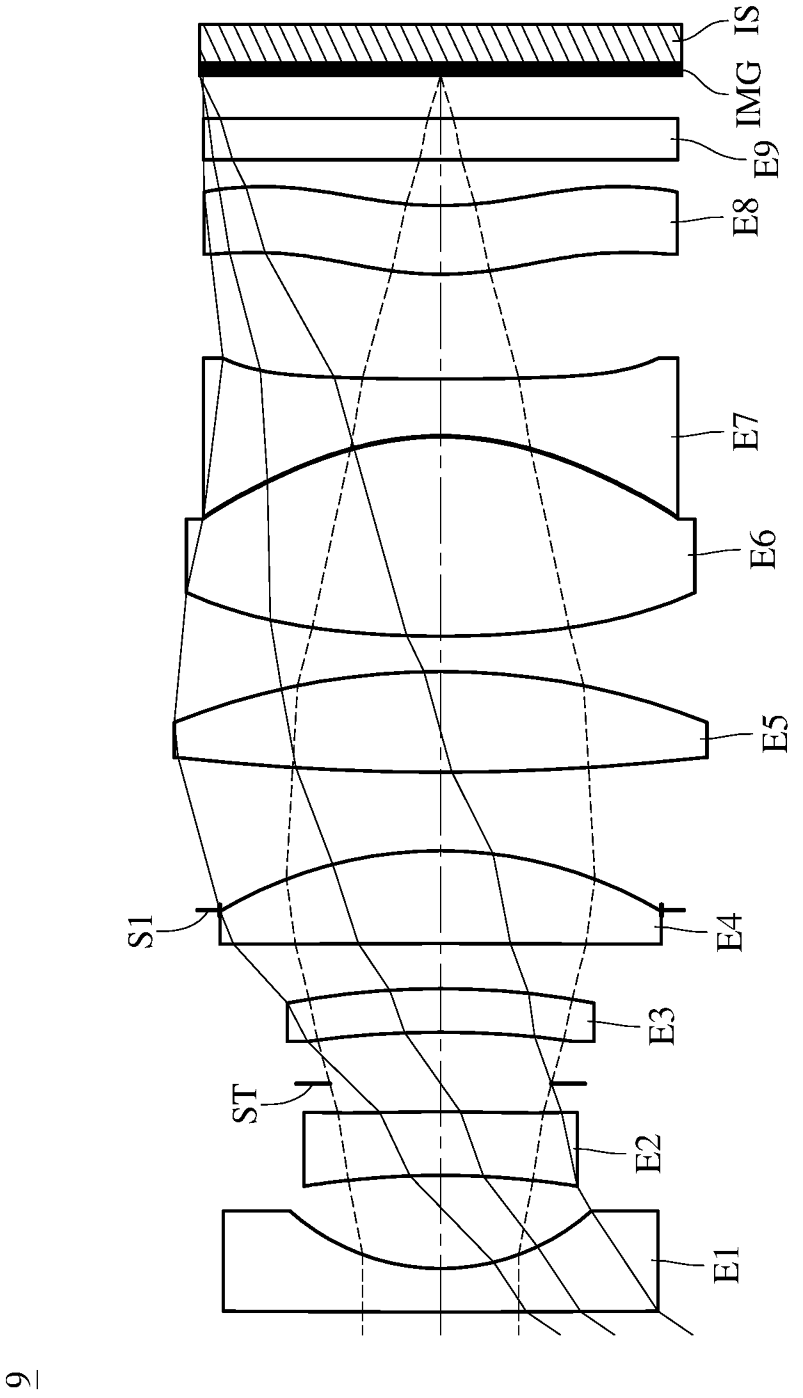
FIG. 17 is a schematic view of an image capturing unit according to the 9th embodiment of the present disclosure.
Figure 18:
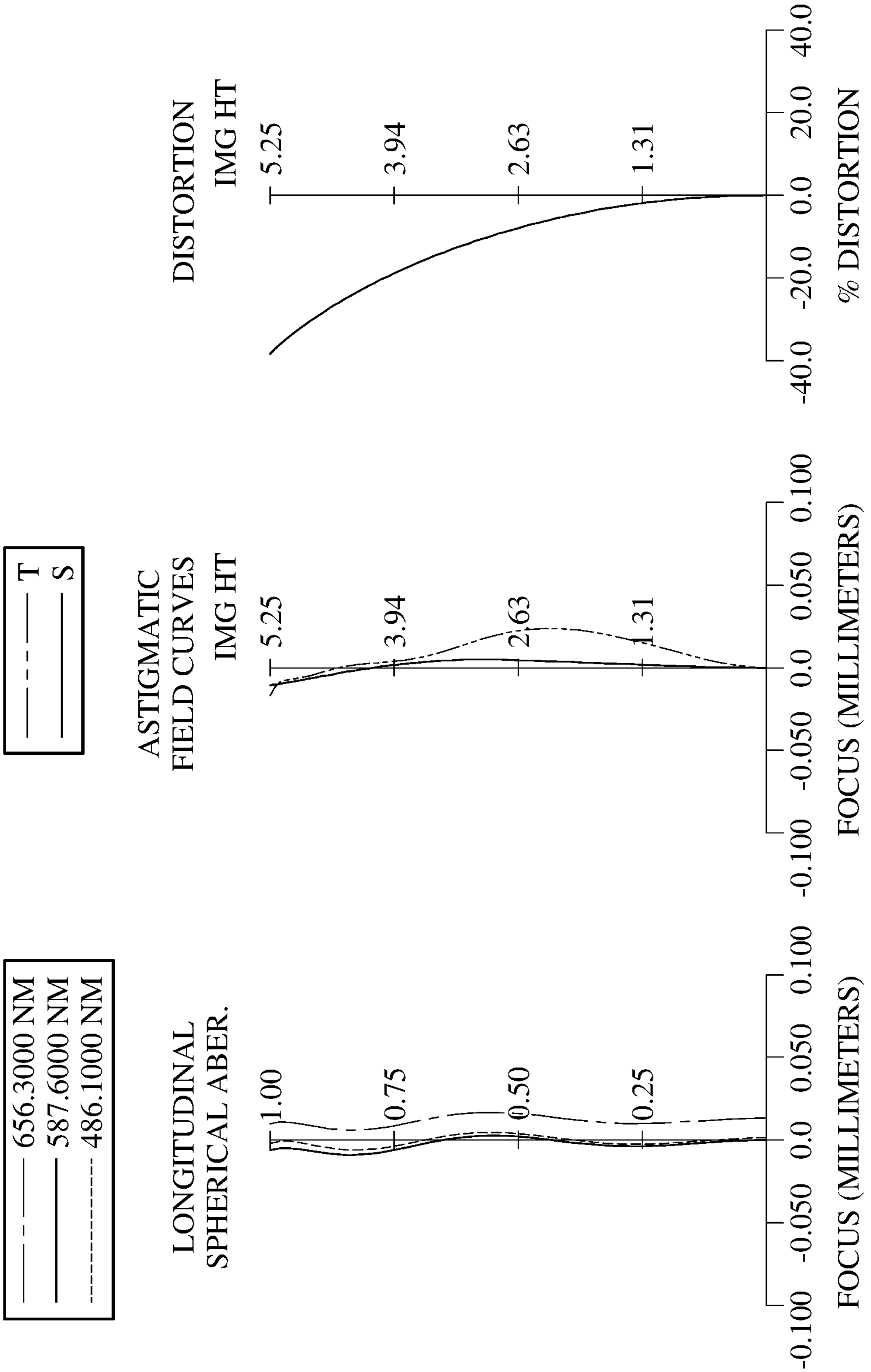
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the imaging optical lens assembly (its reference numeral is omitted) of the present disclosure and an image sensor IS. The imaging optical lens assembly includes, in order from an object side to an image side along an optical path, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has two inflection points. The image-side surface of the second lens element E2 has one critical point in an off-axis region thereof.

The third lens element E3 with positive refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 and the image-side surface of the sixth lens element E6 are cemented to each other.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

In the 9th embodiment, the imaging optical lens assembly includes a cemented lens set (its reference numeral is omitted), the cemented lens set is formed by cementing the sixth lens element E6 and the seventh lens element E7 together, and two adjacent cemented surfaces of the sixth lens element E6 and the seventh lens element E7 are both aspheric, where the two adjacent cemented surfaces of the sixth lens element E6 and the seventh lens element E7 are the image-side surface of the sixth lens element E6 and the object-side surface of the seventh lens element E7, respectively.

The detailed optical data of the 9th embodiment are shown in Table 9A and the aspheric surface data are shown in Table 9B below.

TABLE 9A

| 9th Embodiment<br>f = 5.86 mm, Fno = 1.72, HFOV = 55.5 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | 626.6294 (SPH) | 0.950 | Glass | 1.497 | 81.6 | −9.99 |
| 2 | | 4.9229 (SPH) | 2.035 | | | | |
| 3 | Lens 2 | −17.5390 (ASP) | 1.386 | Plastic | 1.697 | 16.3 | −42.28 |
| 4 | | −44.7157 (ASP) | 0.616 | | | | |
| 5 | Ape. Stop | Plano | 1.123 | | | | |
| 6 | Lens 3 | −21.2007 (SPH) | 0.950 | Glass | 1.805 | 25.5 | 129.31 |
| 7 | | −17.9661 (SPH) | 0.989 | | | | |
| 8 | Lens 4 | −596.2368 (SPH) | 2.023 | Glass | 1.804 | 46.6 | 11.90 |
| 9 | | −9.4340 (SPH) | −1.301 | | | | |
| 10 | Stop | Plano | 3.016 | | | | |
| 11 | Lens 5 | 51.5607 (SPH) | 2.200 | Glass | 1.697 | 55.5 | 17.54 |
| 12 | | −15.7383 (SPH) | 0.768 | | | | |
| 13 | Lens 6 | 22.5987 (ASP) | 4.349 | Plastic | 1.544 | 56.0 | 9.71 |
| 14 | | −6.4307 (ASP) | 0.030 | Cemented | 1.485 | 53.2 | — |
| 15 | Lens 7 | −6.4307 (ASP) | 1.233 | Plastic | 1.697 | 16.3 | −8.42 |
| 16 | | 72.9371 (ASP) | 2.288 | | | | |
| 17 | Lens 8 | 7.0747 (ASP) | 1.500 | Plastic | 1.656 | 21.3 | 65.30 |
| 18 | | 7.7623 (ASP) | 1.000 | | | | |
| 19 | Filter | Plano | 0.900 | Glass | 1.517 | 64.2 | — |
| 20 | | Plano | 0.937 | | | | |
| 21 | Image | Plano | — | | | | |

Note:
Reference wavelength is 587.6 nm (d-line).
An effective radius of the stop S1 (Surface 10) is 4.819 mm.

TABLE 9B

| Aspheric Coefficients | | | | |
|---|---|---|---|---|
| Surface # | 3 | 4 | 13 | 14 |
| k= | 2.46982E+01 | −9.00000E+01 | 1.30766E+01 | 1.87260E−01 |
| A4= | 7.373E−04 | 8.338E−04 | −1.481E−06 | 2.508E−03 |
| A6= | 2.556E−04 | 3.646E−04 | 1.278E−05 | −2.495E−04 |
| A8= | −8.671E−05 | −1.444E−04 | −8.522E−07 | 1.944E−05 |
| A10= | 1.661E−05 | 2.944E−05 | 2.512E−08 | −7.235E−07 |
| A12= | −1.689E−06 | −3.041E−06 | −3.796E−10 | 1.322E−08 |
| A14= | 8.538E−08 | 1.388E−07 | — | −8.994E−11 |
| A16= | −1.551E−09 | −2.130E−09 | — | — |
| Surface # | 15 | 16 | 17 | 18 |
| k= | 1.87260E−01 | 9.00000E+01 | −5.30327E+00 | −5.71414E+00 |
| A4= | 2.508E−03 | −5.768E−05 | −1.502E−03 | −1.542E−03 |
| A6= | −2.495E−04 | 1.525E−05 | −4.002E−05 | −4.468E−05 |
| A8= | 1.944E−05 | 3.581E−07 | 1.138E−06 | 3.120E−06 |
| A10= | −7.235E−07 | 3.538E−08 | 8.153E−08 | −1.729E−08 |
| A12= | 1.322E−08 | −1.411E−09 | −9.791E−10 | −1.958E−09 |
| A14= | −8.994E−11 | 7.546E−12 | −5.542E−11 | 6.936E−11 |
| A16= | — | — | 4.498E−13 | −1.230E−12 |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Values of Optical and Physical Parameters/Definitions | | | |
|---|---|---|---|
| f [mm] | 5.86 | CT7/CT1 | 1.30 |
| Fno | 1.72 | T34/CT6 | 0.23 |
| HFOV [deg.] | 55.5 | CT8/CT5 | 0.68 |
| FOV [deg.] | 111.0 | \|Dsr5/Dsr9\| | 0.17 |
| tan(HFOV) | 1.46 | (T12 + T34)/CT6 | 0.70 |
| TD/EPD | 7.09 | (V3 + V7)/V1 | 0.5 |
| TL/f | 4.61 | V3 + V7 + V8 | 63.1 |
| (\|f1\| + \|f7\|)/(\|f2\| + \|f8\|) | 0.17 | V4/N4 | 25.83 |
| f/f2 + f/f3 + f/f8 | −0.0035 | (N2 + N6)/N3 | 1.80 |
| f/f1 + f/f7 | −1.28 | ET4/ET5 | 0.94 |
| \|f4/R7\| | 0.02 | Y5R2/Y6R2 | 1.12 |
| \|R2/R3\| | 0.28 | SAG1R2/ET1 | 0.57 |
| R8/R9 | −0.18 | Y5R1/Y3R2 | 1.62 |
| (R11 + R12)/(R11 − R12) | 0.56 | ET6/ET7 | 0.46 |
| (R13 + R14)/(R13 − R14) | −0.84 | SAG7R1/CT7 | −1.45 |
| (R14 − R15)/(R14 + R15) | 0.82 | V2 | 16.3 |

10th Embodiment

Figure 19:
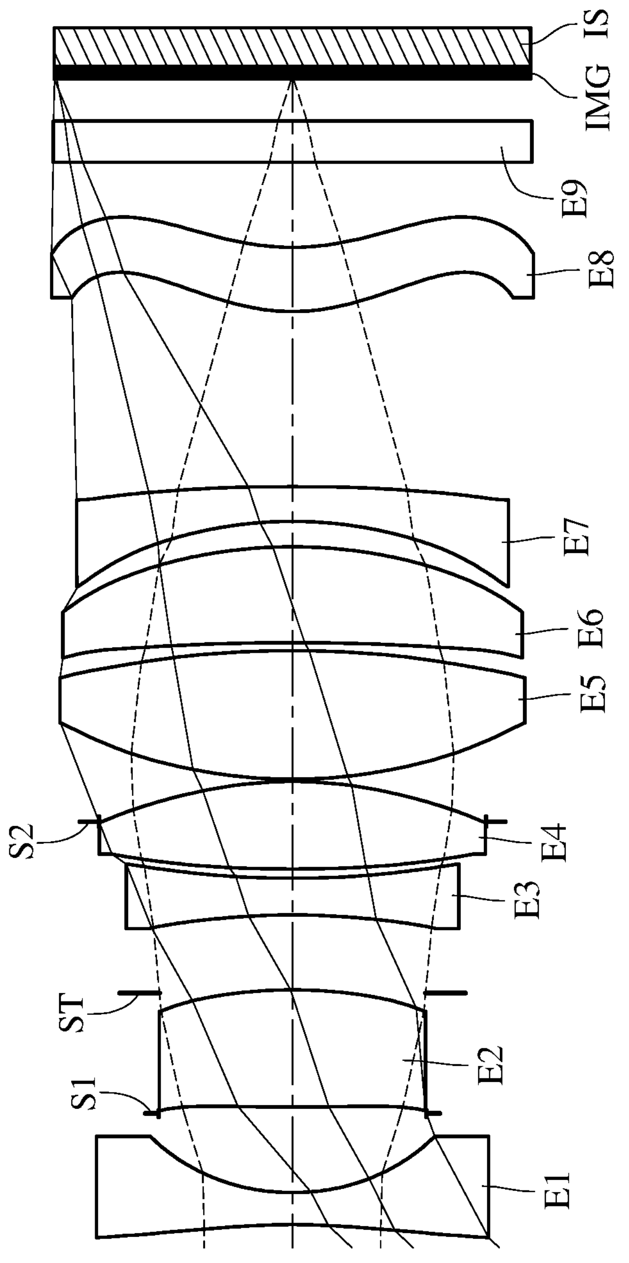
FIG. 19 is a schematic view of an image capturing unit according to the 10th embodiment of the present disclosure.
Figure 20:
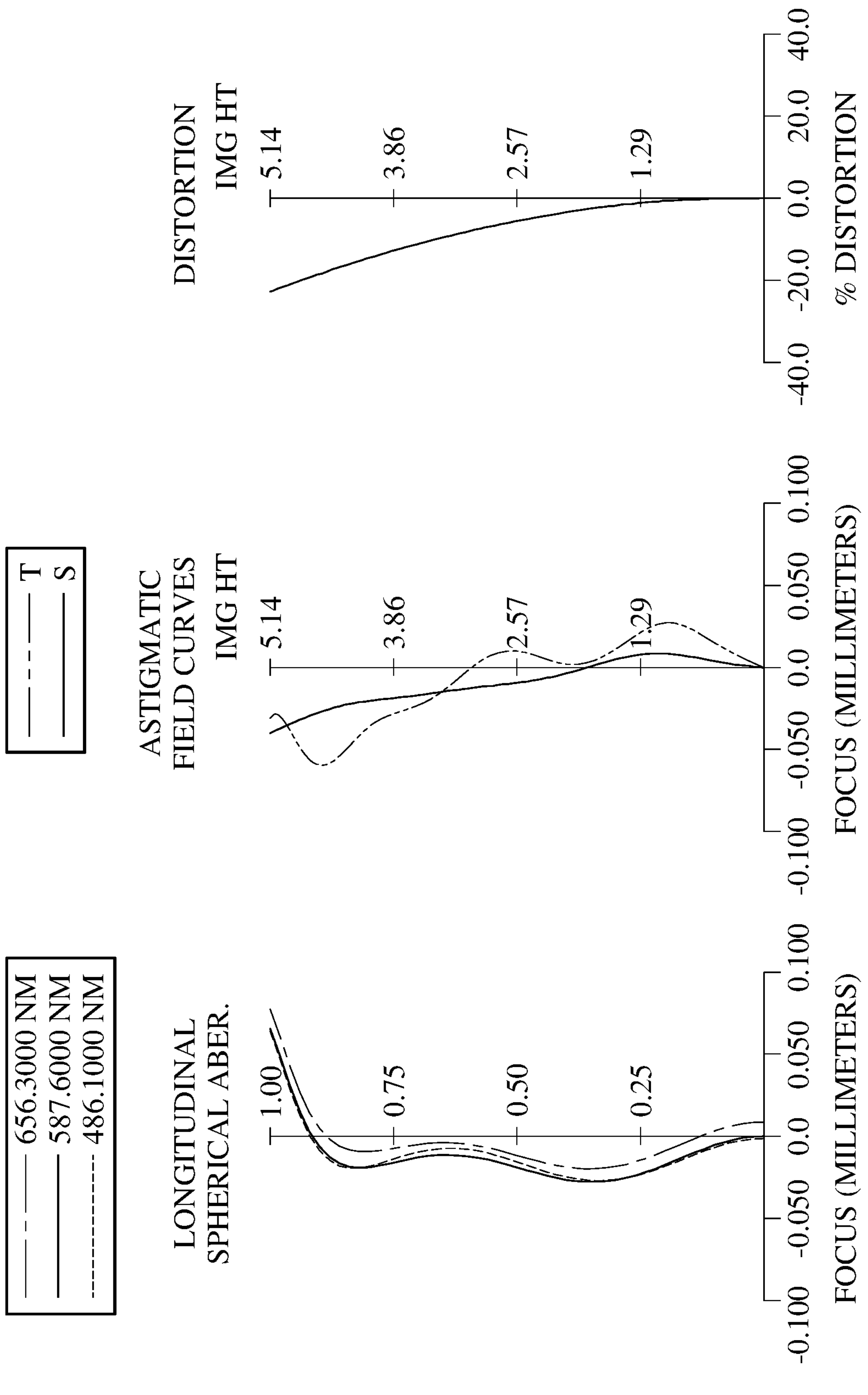
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the imaging optical lens assembly (its reference numeral is omitted) of the present disclosure and an image sensor IS. The imaging optical lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a sixth lens element E6, a seventh lens element E7, an eighth lens element E8, a filter E9 and an image surface IMG. The imaging optical lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both aspheric. The object-side surface of the first lens element E1 has one inflection point.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of glass material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The image-side surface of the fourth lens element E4 has one inflection point.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric. The object-side surface of the fifth lens element E5 has one inflection point.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has one inflection point. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens assembly. The image sensor IS is disposed on or near the image surface IMG of the imaging optical lens assembly.

The detailed optical data of the 10th embodiment are shown in Table 10A and the aspheric surface data are shown in Table 10B below.

TABLE 10A

| 10th Embodiment f = 6.31 mm, Fno = 1.64, HFOV = 46.5 deg. | | | | | | | |
|---|---|---|---|---|---|---|---|
| Surface # | | Curvature Radius | Thickness | Material | Index | Abbe # | Focal Length |
| 0 | Object | infinity | infinity | | | | |
| 1 | Lens 1 | −14.9270 (ASP) | 0.700 | Glass | 1.497 | 81.6 | −7.44 |
| 2 | | 4.9902 (ASP) | 1.726 | | | | |
| 3 | Stop | Plano | 0.138 | | | | |
| 4 | Lens 2 | 45.6898 (ASP) | 2.558 | Plastic | 1.614 | 25.7 | 14.32 |
| 5 | | −10.6519 (ASP) | −0.069 | | | | |
| 6 | Ape. Stop | Plano | 1.706 | | | | |
| 7 | Lens 3 | −13.9728 (ASP) | 0.800 | Glass | 1.808 | 22.7 | −10.99 |
| 8 | | 25.0000 (ASP) | 0.201 | | | | |
| 9 | Lens 4 | 33.2816 (ASP) | 1.909 | Glass | 1.729 | 54.7 | 10.27 |
| 10 | | −9.4340 (ASP) | −0.876 | | | | |
| 11 | Stop | Plano | 0.926 | | | | |
| 12 | Lens 5 | 10.5045 (ASP) | 2.805 | Glass | 1.640 | 60.2 | 11.79 |
| 13 | | −24.0077 (ASP) | 0.174 | | | | |
| 14 | Lens 6 | −54.3117 (ASP) | 2.092 | Plastic | 1.544 | 55.9 | 25.27 |
| 15 | | −11.1111 (ASP) | 0.554 | | | | |
| 16 | Lens 7 | −10.1054 (ASP) | 0.757 | Plastic | 1.656 | 21.3 | −16.92 |
| 17 | | −116.0921 (ASP) | 3.825 | | | | |
| 18 | Lens 8 | 4.3908 (ASP) | 1.398 | Plastic | 1.544 | 55.9 | 30.97 |
| 19 | | 5.2741 (ASP) | 1.855 | | | | |
| 20 | Filter | Plano | 0.900 | Glass | 1.517 | 64.2 | — |
| 21 | | Plano | 0.921 | | | | |
| 22 | Image | Plano | — | | | | |

Note:
Reference wavelength is 587.6 nm (d-line).
An effective radius of the stop S1 (Surface 3) is 2.923 mm.
An effective radius of the stop S2 (Surface 11) is 4.218 mm.

TABLE 10B

| Aspheric Coefficients | | | | | | |
|---|---|---|---|---|---|---|
| Surface # | 1 | 2 | 4 | 5 | 7 | 8 |
| k= | −7.41771E+01 | 3.62481E−01 | −5.42284E+01 | 7.72644E+00 | −9.28384E+00 | −5.63204E+01 |
| A4= | 2.899E−04 | 2.423E−03 | −1.031E−03 | 7.812E−04 | 2.888E−03 | 3.080E−03 |
| A6= | −5.020E−05 | −4.013E−04 | −3.144E−04 | −1.315E−06 | −6.695E−04 | −5.792E−04 |
| A8= | 6.423E−06 | 3.921E−05 | 8.796E−05 | −4.753E−05 | 7.569E−05 | 5.527E−05 |
| A10= | −3.578E−07 | −1.235E−06 | −1.890E−05 | 1.270E−05 | −4.423E−06 | −2.464E−06 |
| A12= | 7.434E−09 | −2.692E−08 | 2.159E−06 | −1.784E−06 | 8.710E−08 | 3.849E−08 |
| A14= | — | — | −1.270E−07 | 1.308E−07 | — | — |
| A16= | — | — | 2.445E−09 | −3.788E−09 | — | — |
| Surface # | 9 | 10 | 12 | 13 | 14 | 15 |
| k= | −5.88285E+01 | −1.41571E+00 | −3.90819E−01 | 1.39956E+00 | −8.78937E+01 | 2.36422E+00 |
| A4= | 1.144E−03 | −3.029E−04 | −6.455E−04 | 1.072E−04 | 1.707E−04 | −7.542E−05 |
| A6= | −6.887E−05 | 4.235E−05 | 3.489E−05 | −1.092E−04 | −1.090E−04 | 4.455E−05 |
| A8= | 1.754E−06 | 4.910E−06 | 7.822E−08 | 1.169E−05 | 1.366E−05 | −6.760E−06 |
| A10= | 5.260E−08 | −6.844E−07 | −1.846E−08 | −4.530E−07 | −6.432E−07 | 5.524E−07 |
| A12= | −2.850E−09 | 1.926E−08 | −8.468E−11 | 5.971E−09 | 9.874E−09 | −2.207E−08 |
| A14= | — | — | — | — | — | 3.287E−10 |
| Surface # | 16 | 17 | 18 | 19 | — | — |
| k= | 2.17515E+00 | −9.00000E+01 | −3.27468E+00 | −4.54733E+00 | — | — |
| A4= | −2.333E−03 | −3.529E−03 | −6.595E−04 | −2.870E−05 | — | — |
| A6= | 6.010E−04 | 6.355E−04 | 1.950E−05 | −2.221E−04 | — | — |
| A8= | −6.664E−05 | −6.053E−05 | −3.440E−05 | 7.685E−06 | — | — |
| A10= | 3.773E−06 | 3.157E−06 | 4.601E−06 | 4.450E−07 | — | — |
| A12= | −1.112E−07 | −8.792E−08 | −3.050E−07 | −5.888E−08 | — | — |
| A14= | 1.392E−09 | 1.051E−09 | 1.001E−08 | 2.247E−09 | — | — |
| A16= | — | — | −1.312E−10 | −2.997E−11 | — | — |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Values of Optical and Physical Parameters/Definitions | | | |
|---|---|---|---|
| f [mm] | 6.31 | CT7/CT1 | 1.08 |
| Fno | 1.64 | T34/CT6 | 0.10 |
| HFOV [deg.] | 46.5 | CT8/CT5 | 0.50 |
| FOV [deg.] | 93.0 | \|Dsr5/Dsr9\| | 0.37 |
| tan(HFOV) | 1.05 | (T12 + T34)/CT6 | 0.99 |
| TD/EPD | 5.54 | (V3 + V7)/V1 | 0.5 |
| TL/f | 3.96 | V3 + V7 + V8 | 99.9 |
| (\|f1\| + \|f7\|)/(\|f2\| + \|f8\|) | 0.54 | V4/N4 | 31.64 |
| f/f2 + f/f3 + f/f8 | 0.07 | (N2 + N6)/N3 | 1.75 |
| f/f1 + f/f7 | −1.22 | ET4/ET5 | 0.69 |
| \|f4/R7\| | 0.31 | Y5R2/Y6R2 | 1.01 |
| \|R2/R3\| | 0.11 | SAG1R2/ET1 | 0.55 |
| R8/R9 | −0.90 | Y5R1/Y3R2 | 1.32 |
| (R11 + R12)/(R11 − R12) | 1.51 | ET6/ET7 | 0.53 |
| (R13 + R14)/(R13 − R14) | −1.19 | SAG7R1/CT7 | −1.88 |
| (R14 − R15)/(R14 + R15) | 1.08 | V2 | 25.7 |

11th Embodiment

Figure 21:
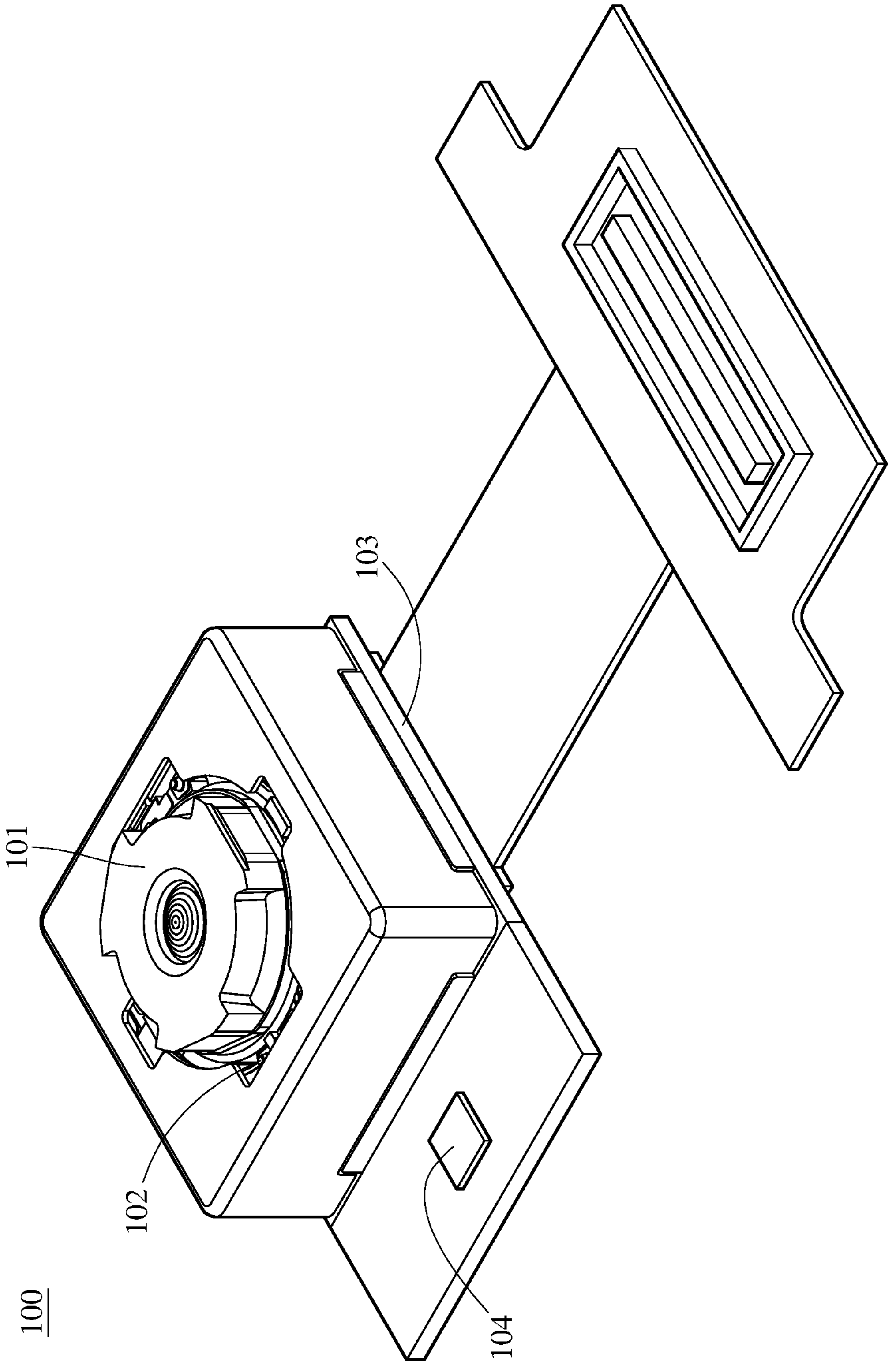
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 100 is a camera module including a lens unit 101, a driving device 102, an image sensor 103 and an image stabilizer 104. The lens unit 101 includes the imaging optical lens assembly as disclosed in the 1st embodiment, a barrel and a holder member (their reference numerals are omitted) for holding the imaging optical lens assembly. However, the lens unit 101 may alternatively be provided with the imaging optical lens assembly as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the imaging optical lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

12th Embodiment

Figure 22:
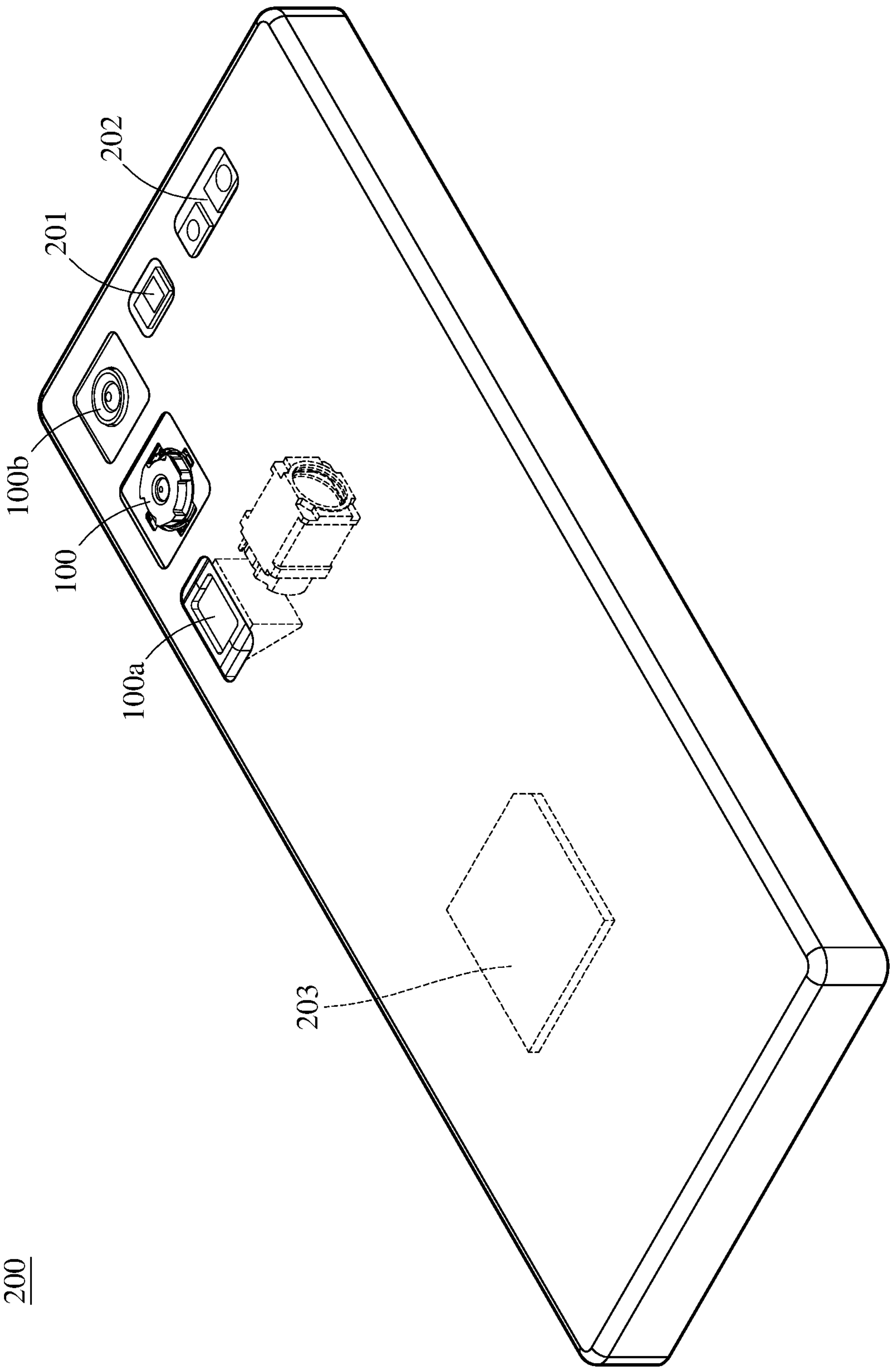
FIG. 22 is one perspective view of an electronic device according to the 12th embodiment of the present disclosure.
Figure 23:
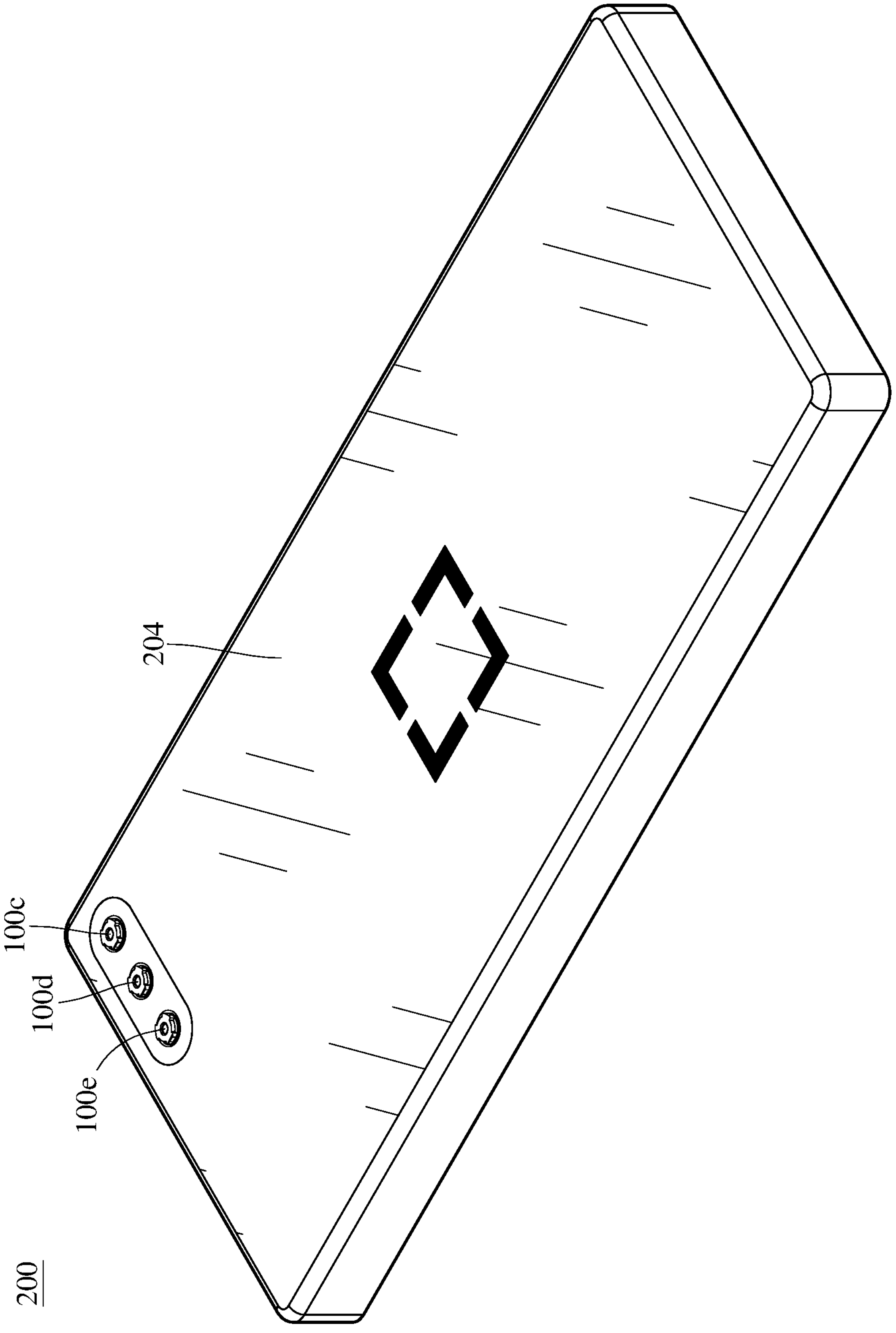
FIG. 23 is another perspective view of the electronic device in FIG. 22.
Figure 24:
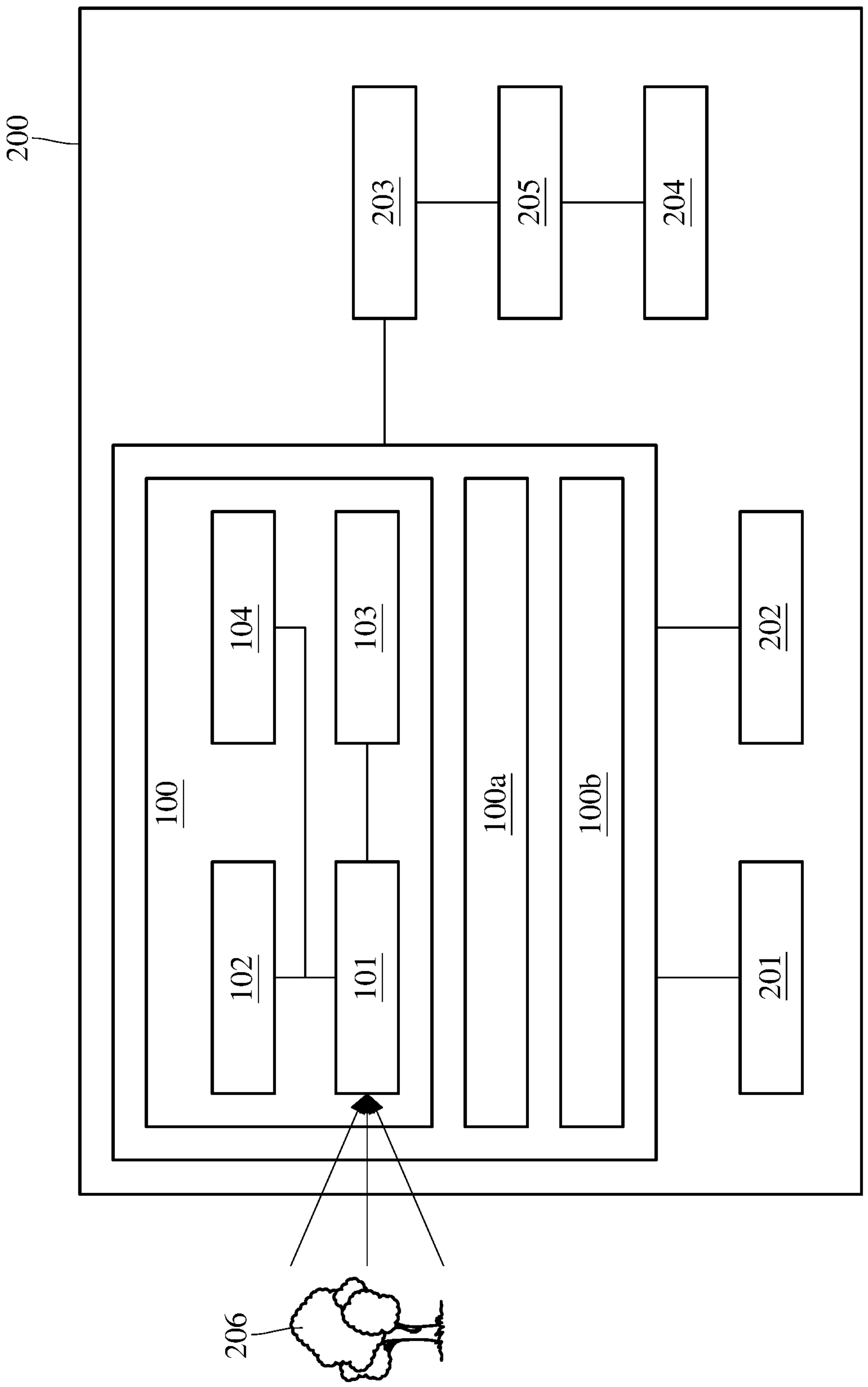
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 200 is a smartphone including the image capturing unit 100 as disclosed in the 11th embodiment, an image capturing unit 100*a*, an image capturing unit 100*b*, an image capturing unit 100*c*, an image capturing unit 100*d*, an image capturing unit 100*e*, a flash module 201, a focus assist module 202, an image signal processor 203, a display module 204 and an image software processor 205. The image capturing unit 100, the image capturing unit 100*a* and the image capturing unit 100*b* are disposed on the same side of the electronic device 200, and each of the image capturing units 100, 100*a* and 100*b* has a single focal point. The focus assist module 202 can be a laser rangefinder or a ToF (time of flight) module, but the present disclosure is not limited thereto. The image capturing unit 100*c*, the image capturing unit 100*d*, the image capturing unit 100*e* and the display module 204 are disposed on the opposite side of the electronic device 200, and the display module 204 can be a user interface, such that the image capturing units 100*c*, 100*d* and 100*e* can be front-facing cameras of the electronic device 200 for taking selfies, but the present disclosure is not limited thereto. Furthermore, each of the image capturing units 100*a*, 100*b*, 100*c*, 100*d* and 100*e* can include the imaging optical lens assembly of the present disclosure and can have a configuration similar to that of the image capturing unit 100. In detail, each of the image capturing units 100*a*, 100*b*, 100*c*, 100*d* and 100*e* can include a lens unit, a driving device, an image sensor and an image stabilizer, and can also include a light-folding element for folding optical path. In addition, each lens unit of the image capturing units 100*a*, 100*b*, 100*c*, 100*d* and 100*e* can include the imaging optical lens assembly of the present disclosure, a barrel and a holder member for holding the imaging optical lens assembly.

The image capturing unit 100 is a wide-angle image capturing unit, the image capturing unit 100*a* is a telephoto image capturing unit with optical path folding function, the image capturing unit 100*b* is an ultra-wide-angle image capturing unit, the image capturing unit 100*c* is a wide-angle image capturing unit, the image capturing unit 100*d* is an ultra-wide-angle image capturing unit, and the image capturing unit 100*e* is a ToF image capturing unit. In this embodiment, the image capturing units 100, 100*a* and 100*b* have different fields of view, such that the electronic device 200 can have various magnification ratios so as to meet the requirement of optical zoom functionality. In addition, the image capturing unit 100*e* can determine depth information of the imaged object. Moreover, the light-folding configuration of the image capturing unit 100*a* can be similar to, for example, one of the configurations as shown in FIG. 33 to FIG. 35, which can be referred to foregoing descriptions corresponding to FIG. 33 to FIG. 35, and the details in this regard will not be provided again. Moreover, each of the image capturing units 100, 100*b*, 100*c*, 100*d* and 100*e* can have a light-folding configuration similar to, for example, one of the configurations as shown in FIG. 33 to FIG. 35, which can be referred to foregoing descriptions corresponding to FIG. 33 to FIG. 35. In this embodiment, the electronic device 200 includes multiple image capturing units 100, 100*a*, 100*b*, 100*c*, 100*d* and 100*e*, but the present disclosure is not limited to the number and arrangement of image capturing units.

When a user captures images of an object 206, the light rays converge in the image capturing unit 100, the image capturing unit 100*a* or the image capturing unit 100*b* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*c*, 100*d* or 100*e* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

13th Embodiment

Figure 25:
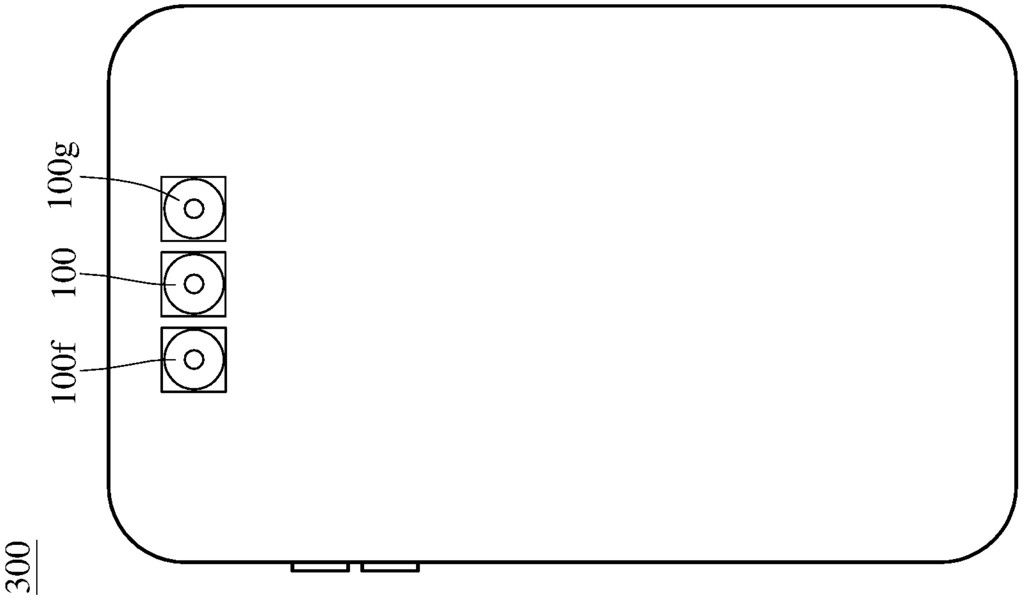
FIG. 25 is one schematic view of an electronic device according to the 13th embodiment of the present disclosure.
Figure 26:
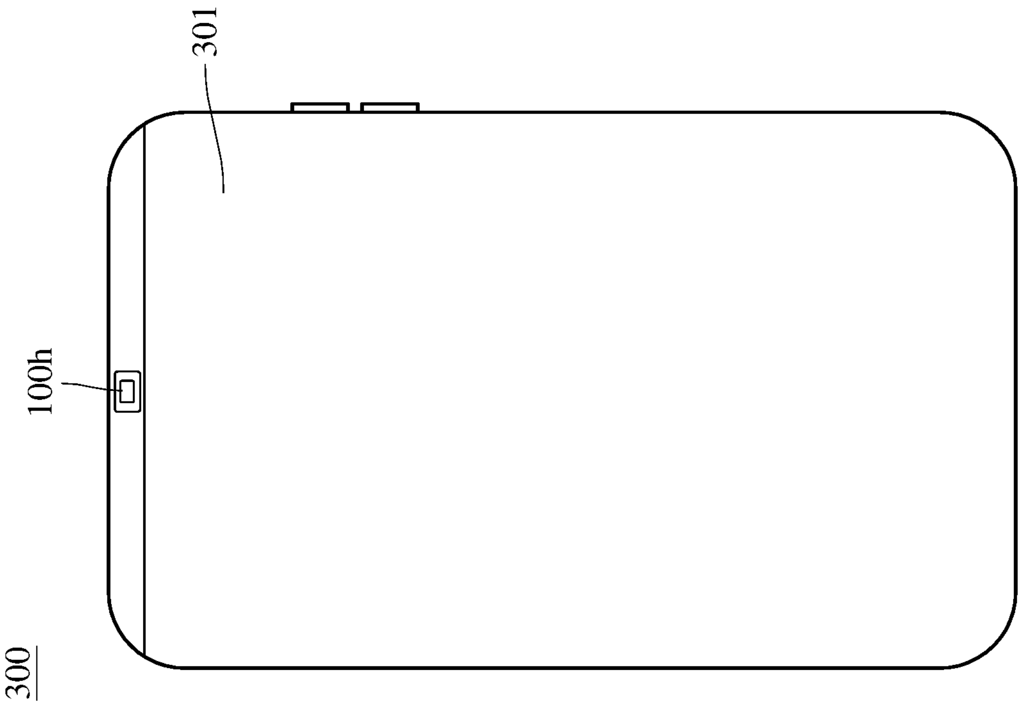
FIG. 26 is another schematic view of the electronic device in FIG. 25.

FIG. 25 is one schematic view of an electronic device according to the 13th embodiment of the present disclosure. FIG. 26 is another schematic view of the electronic device in FIG. 25.

In this embodiment, an electronic device 300 is a smartphone including the image capturing unit 100 as disclosed in the 11th embodiment, an image capturing unit 100*f*, an image capturing unit 100*g*, an image capturing unit 100*h* and a display module 301. As shown in FIG. 25, the image capturing unit 100, the image capturing unit 100*f* and the image capturing unit 100*g* are disposed on the same side of the electronic device 300, and each of the image capturing units 100, 100*f* and 100*g* has a single focal point. As shown in FIG. 26, the image capturing unit 100*h* and the display module 301 are disposed on the opposite side of the electronic device 300, such that the image capturing unit 100*h* can be a front-facing camera of the electronic device 300 for taking selfies, but the present disclosure is not limited thereto. Furthermore, each of the image capturing units 100*f*, 100*g* and 100*h* can include the imaging optical lens assembly of the present disclosure and can have a configuration similar to that of the image capturing unit 100. In detail, each of the image capturing units 100*f*, 100*g* and 100*h* can include a lens unit, a driving device, an image sensor and an image stabilizer. In addition, each lens unit of the image capturing units 100*f*, 100*g* and 100*h* can include the imaging optical lens assembly of the present disclosure, a barrel and a holder member for holding the imaging optical lens assembly.

The image capturing unit 100 is a wide-angle image capturing unit, the image capturing unit 100*f* is a telephoto image capturing unit, the image capturing unit 100*g* is an ultra-wide-angle image capturing unit, and the image capturing unit 100*h* is a wide-angle image capturing unit. In this embodiment, the image capturing units 100, 100*f* and 100*g* have different fields of view, such that the electronic device 300 can have various magnification ratios so as to meet the requirement of optical zoom functionality. In this embodiment, the electronic device 300 includes multiple image capturing units 100, 100*f*, 100*g* and 100*h*, but the present disclosure is not limited to the number and arrangement of image capturing units.

14th Embodiment

Figure 27:
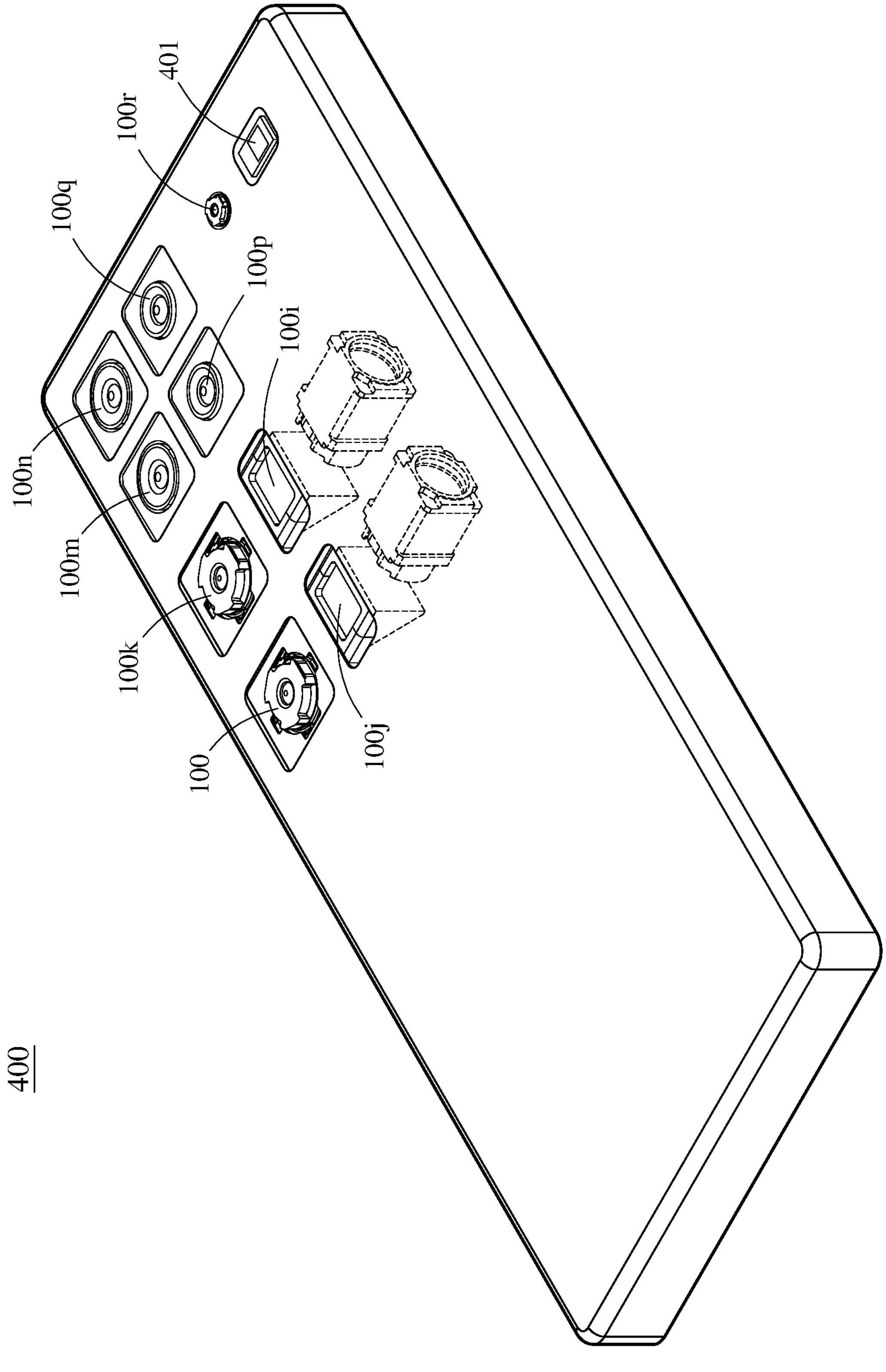
FIG. 27 is one perspective view of an electronic device according to the 14th embodiment of the present disclosure.

FIG. 27 is one perspective view of an electronic device according to the 14th embodiment of the present disclosure.

In this embodiment, an electronic device 400 is a smartphone including the image capturing unit 100 as disclosed in the 11th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the imaging optical lens assembly of the present disclosure and can have a configuration similar to that of the image capturing unit 100, and the details in this regard will not be provided again.

The image capturing unit 100 is a wide-angle image capturing unit, the image capturing unit 100*i* is a telephoto image capturing unit with optical path folding function, the image capturing unit 100*j* is a telephoto image capturing unit with optical path folding function, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p* and 100*q* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100*i* and 100*j* can be similar to, for example, one of the structures shown in FIG. 33 to FIG. 35, which can be referred to foregoing descriptions corresponding to FIG. 33 to FIG. 35, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

15th Embodiment

Figure 28:
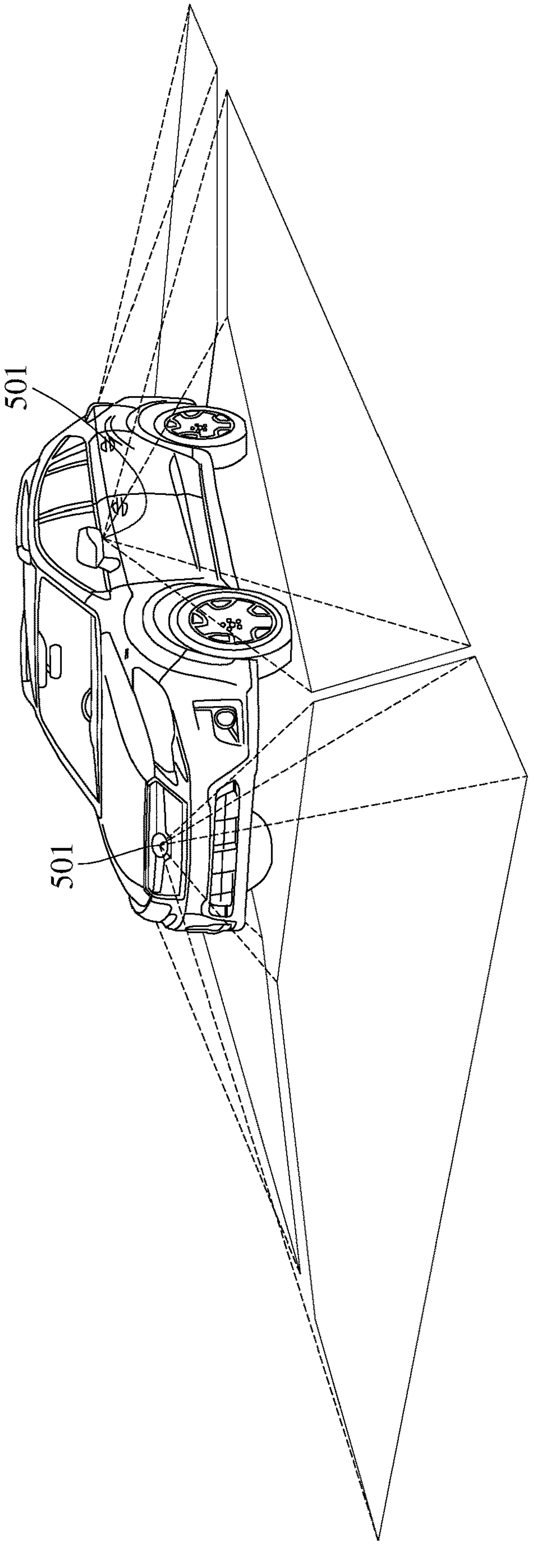
FIG. 28 is a perspective view of an electronic device according to the 15th embodiment of the present disclosure.
Figure 29:
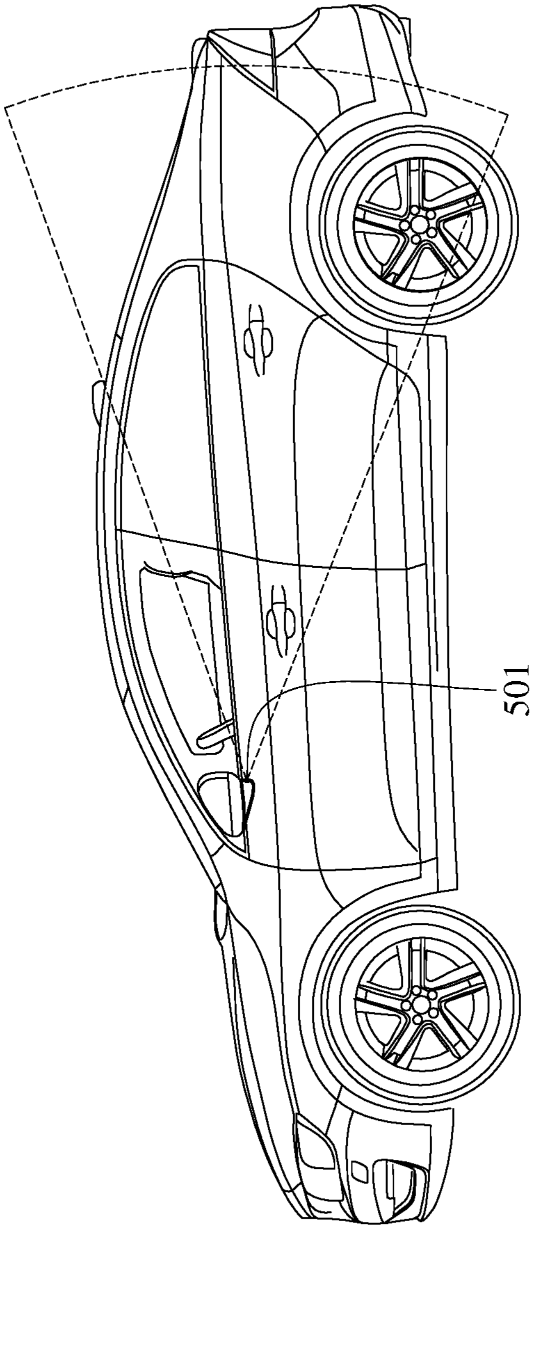
FIG. 29 is a side view of the electronic device in FIG. 28.
Figure 30:
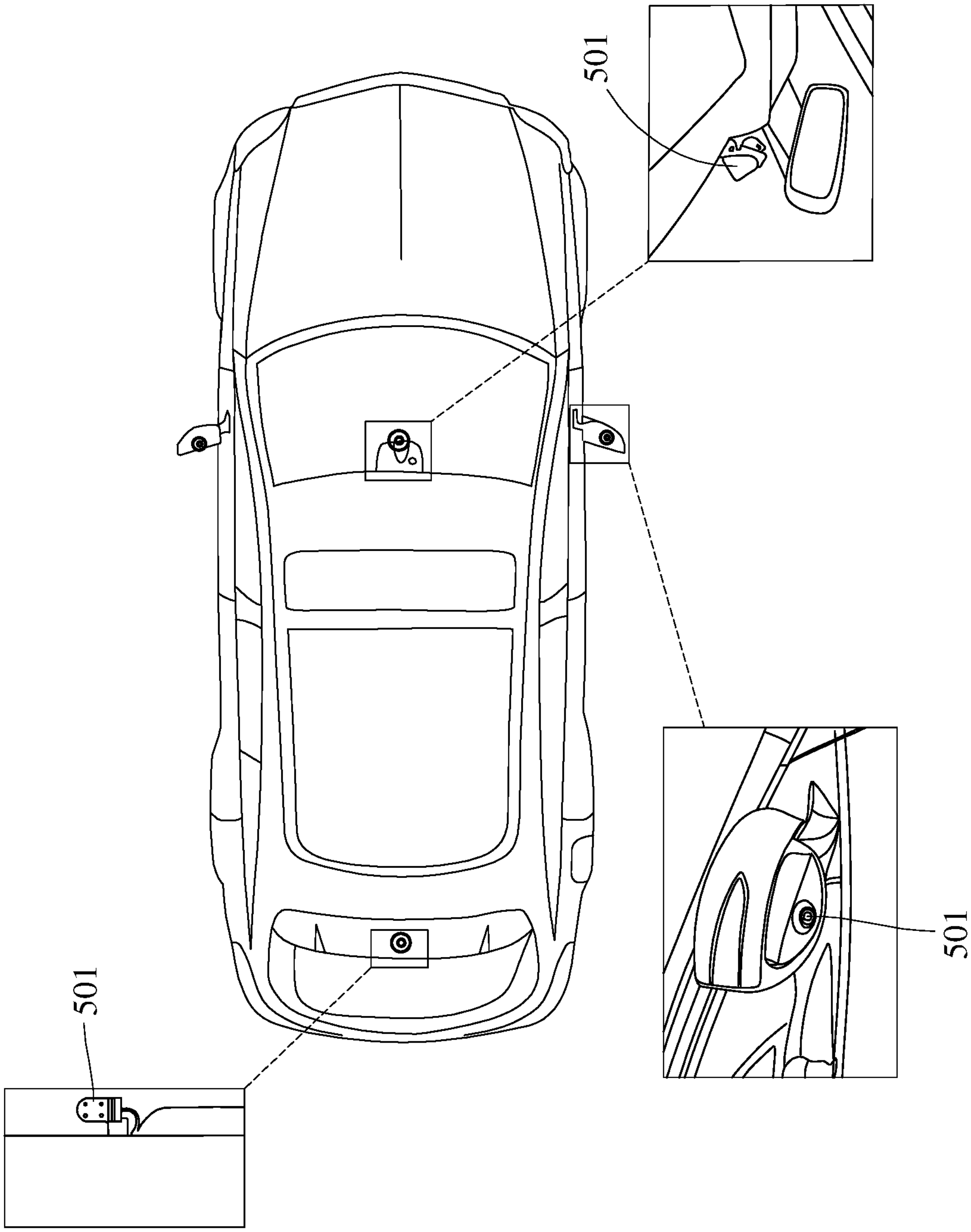
FIG. 30 is a top view of the electronic device in FIG. 28.

FIG. 28 is a perspective view of an electronic device according to the 15th embodiment of the present disclosure. FIG. 29 is a side view of the electronic device in FIG. 28. FIG. 30 is a top view of the electronic device in FIG. 28.

In this embodiment, the electronic device 500 is an automobile, such as a car. The electronic device 500 includes a plurality of image capturing units 501, and the image capturing units 501, for example, each includes the imaging optical lens assembly of the present disclosure. The image capturing units 501 can serve as, for example, panoramic view car cameras, dashboard cameras and vehicle backup cameras. Each of the image capturing units 501 can be a wide-angle image capturing unit.

As shown in FIG. 28 to FIG. 30, the image capturing units 501 are, for example, respectively disposed on the front, rear, side, side mirrors and interior of the automobile to capture images at the periphery of the automobile for recognizing road conditions outside the automobile, thereby achieving automated driver assistance. Moreover, the image software processor may blend the images into one panoramic view image for the driver's checking every corner surrounding the automobile, thereby favorable for driving and parking.

As shown in FIG. 29, the image capturing units 501 are, for example, respectively disposed on the lower portion of the left and right side mirrors to capture images in regions on left and right lanes. As shown in FIG. 30, the image capturing units 501 are, for example, respectively disposed inside the side mirrors and the front and rear windshields for providing external information to the driver, and also providing more viewing angles so as to reduce blind spots, thereby improving driving safety. The arrangement of the aforementioned image capturing units is only exemplary, and the number, positions or imaging direction of the image capturing units can be adjusted according to actual requirements.

The smartphone and the mobile vehicle in the embodiments are only exemplary for showing the image capturing unit of the present disclosure installed in an electronic device, and the present disclosure is not limited thereto. The image capturing unit can be optionally applied to optical systems with a movable focus. Furthermore, the imaging optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, unmanned aerial vehicles, wearable devices, portable video recorders and other electronic imaging devices.

The foregoing description, for the purpose of explanation, has been described with reference to specific embodiments. It is to be noted that TABLES 1A-10C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the fourth lens element has positive refractive power, the fifth lens element has positive refractive power, the object-side surface of the seventh lens element is concave in a paraxial region thereof, the object-side surface of the eighth lens element has at least one inflection point, and the imaging optical lens assembly further comprises an aperture stop disposed between an imaged object and the fourth lens element; and wherein an axial distance between the object-side surface of the first lens element and an image surface is TL, a focal length of the imaging optical lens assembly is f, an axial distance between the first lens element and the second lens element is T12, an axial distance between the third lens element and the fourth lens element is T34, a central thickness of the sixth lens element is CT6, and the following conditions are satisfied:

$$3.00 < TL/f < 6.00; \text{ and}$$

$$0.05 < (T12 + T34)/CT6 < 1.50.$$

2. The imaging optical lens assembly of claim 1, wherein the first lens element has negative refractive power, the sixth lens element has positive refractive power, the image-side surface of the fourth lens element is convex in a paraxial region thereof, the image-side surface of the fifth lens element is convex in a paraxial region thereof, the object-side surface of the eighth lens element is convex in a paraxial region thereof, and at least one lens element is made of glass material and at least one lens element is made of plastic material in the imaging optical lens assembly.

3. The imaging optical lens assembly of claim 1, wherein a curvature radius of the image-side surface of the fourth lens element is R8, a curvature radius of the object-side surface of the fifth lens element is R9, half of a maximum field of view of the imaging optical lens assembly is HFOV, and the following conditions are satisfied:

$$-10.00 < R8/R9 < 0.15; \text{ and}$$

$$0.82 < \tan(HFOV) < 2.75.$$

4. The imaging optical lens assembly of claim 1, wherein the aperture stop is located between the first lens element and the third lens element; and wherein a focal length of the first lens element is f1, a focal length of the second lens element is f2, a focal length of the seventh lens element is f7, a focal length of the eighth lens element is f8, and the following condition is satisfied:

$$0.00 \leq (|f1| + |f7|)/(|f2| + |f8|) < 0.62.$$

5. The imaging optical lens assembly of claim 1, wherein the imaging optical lens assembly comprises at least one cemented lens set, and the at least one cemented lens set is formed by cementing two adjacent lens elements together from among the first lens element, the second lens element, the third lens element, the fourth lens element, the fifth lens element, the sixth lens element, the seventh lens element and the eighth lens element; and wherein a curvature radius of the image-side surface of the first lens element is R2, a curvature radius of the object-side surface of the second lens element is R3, and the following condition is satisfied:

$$0.00 \leq |R2/R3| < 0.45.$$

6. The imaging optical lens assembly of claim 1, wherein an Abbe number of the fourth lens element is V4, a refractive index of the fourth lens element is N4, and the following condition is satisfied:

$$6.50 < V4/N4 < 35.70.$$

7. The imaging optical lens assembly of claim 1, wherein a refractive index of the second lens element is N2, a refractive index of the third lens element is N3, a refractive index of the sixth lens element is N6, and the following condition is satisfied:

$$1.25 < (N2 + N6)/N3 < 1.85.$$

8. The imaging optical lens assembly of claim 1, wherein an f-number of the imaging optical lens assembly is Fno, a distance in parallel with an optical axis between a maximum effective radius position of the object-side surface of the fourth lens element and a maximum effective radius position of the image-side surface of the fourth lens element is ET4, a distance in parallel with the optical axis between a maximum effective radius position of the object-side surface of the fifth lens element and a maximum effective radius position of the image-side surface of the fifth lens element is ET5, and the following conditions are satisfied:

$$1.30 < Fno < 1.85; \text{ and}$$

$$0.15 < ET4/ET5 < 3.00.$$

9. The imaging optical lens assembly of claim 1, wherein a maximum effective radius of the image-side surface of the fifth lens element is Y5R2, a maximum effective radius of the image-side surface of the sixth lens element is Y6R2, and the following condition is satisfied:

$$0.75 < Y5R2/Y6R2 < 1.30.$$

10. An image capturing unit comprising:

the imaging optical lens assembly of claim 1; and an image sensor disposed on the image surface of the imaging optical lens assembly.

11. An electronic device comprising:

the image capturing unit of claim 10.

12. An imaging optical lens assembly comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the fifth lens element has positive refractive power, the sixth lens element has positive refractive power, the image-side surface of the fourth lens element is convex in a paraxial region thereof, the object-side surface of the eighth lens element is convex in a paraxial region thereof, the object-side surface of the eighth lens element has at least one inflection point, and the imaging optical lens assembly further comprises an aperture stop disposed between an imaged object and the fourth lens element; and wherein an axial distance between the object-side surface of the first lens element and an image surface is TL, a focal length of the imaging optical lens assembly is f, a focal length of the second lens element is f2, a focal length of the third lens element is f3, a focal length of the eighth lens element is f8, a curvature radius of the object-side surface of the sixth lens element is R11, a curvature radius of the image-side surface of the sixth lens element is R12, and the following conditions are satisfied:

$$3.00 < TL/f < 6.00;$$

$$-1.50 < f/f2 + f/f3 + f/f8 < 0.38; \text{ and}$$

$$-3.00 < (R11 + R12)/(R11 - R12) < 3.00.$$

13. The imaging optical lens assembly of claim 12, wherein the first lens element has negative refractive power, the fourth lens element has positive refractive power, the image-side surface of the first lens element is concave in a paraxial region thereof, the image-side surface of the fifth lens element is convex in a paraxial region thereof, the object-side surface of the eighth lens element is convex in a paraxial region thereof, and the object-side surface and the image-side surface of the seventh lens element are both aspheric.

14. The imaging optical lens assembly of claim 12, wherein an axial distance between the object-side surface of the first lens element and the image-side surface of the eighth lens element is TD, an entrance pupil diameter of the imaging optical lens assembly is EPD, and the following condition is satisfied:

$$5.10 < TD/EPD < 8.00.$$

15. The imaging optical lens assembly of claim 12, wherein the focal length of the imaging optical lens assembly is f, a focal length of the first lens element is f1, a focal length of the seventh lens element is f7, and the following condition is satisfied:

$$-1.75 < f/f1 + f/f7 < -0.85$$

16. The imaging optical lens assembly of claim 12, wherein a central thickness of the first lens element is CT1, a central thickness of the sixth lens element is CT6, a central thickness of the seventh lens element is CT7, an axial distance between the third lens element and the fourth lens element is T34, and the following conditions are satisfied:

$$0.10 < CT7/CT1 < 2.10; \text{ and}$$

$$0.00 \leq T34/CT6 < 1.10.$$

17. The imaging optical lens assembly of claim 12, wherein a curvature radius of the image-side surface of the first lens element is R2, a curvature radius of the object-side surface of the second lens element is R3, and the following condition is satisfied:

$$0.00 \leq |R2/R3| < 0.60.$$

18. The imaging optical lens assembly of claim 12, wherein an Abbe number of the first lens element is V1, an Abbe number of the third lens element is V3, an Abbe number of the seventh lens element is V7, a curvature radius of the object-side surface of the seventh lens element is R13, a curvature radius of the image-side surface of the seventh lens element is R14, and the following conditions are satisfied:

$$0.3 < (V3+V7)/V1 < 1.0; \text{ and}$$

$$-1.70 < (R13+R14)/(R13-R14) < 0.70.$$

19. The imaging optical lens assembly of claim 12, wherein a displacement in parallel with an optical axis from an axial vertex of the image-side surface of the first lens element to a maximum effective radius position of the image-side surface of the first lens element is SAG1R2, a distance in parallel with the optical axis between a maximum effective radius position of the object-side surface of the first lens element and the maximum effective radius position of the image-side surface of the first lens element is ET1, a maximum effective radius of the image-side surface of the third lens element is Y3R2, a maximum effective radius of the object-side surface of the fifth lens element is Y5R1, and the following conditions are satisfied:

$$0.20 < SAG1R2/ET1 < 0.85; \text{ and}$$

$$1.00 < Y5R1/Y3R2 < 3.50.$$

20. The imaging optical lens assembly of claim 12, wherein a distance in parallel with an optical axis between a maximum effective radius position of the object-side surface of the sixth lens element and a maximum effective radius position of the image-side surface of the sixth lens element is ET6, a distance in parallel with the optical axis between a maximum effective radius position of the object-side surface of the seventh lens element and a maximum effective radius position of the image-side surface of the seventh lens element is ET7, and the following condition is satisfied:

$$0.28 < ET6/ET7 < 1.10.$$

21. An imaging optical lens assembly comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the fourth lens element has positive refractive power, the fifth lens element has positive refractive power, the sixth lens element has positive refractive power, the image-side surface of fifth lens element is convex in a paraxial region thereof, the object-side surface of the eighth lens element has at least one inflection point, and the imaging optical lens assembly further comprises an aperture stop disposed between an imaged object and the fourth lens element; and wherein an axial distance between the object-side surface of the first lens element and an image surface is TL, a focal length of the imaging optical lens assembly is f, an Abbe number of the third lens element is V3, an Abbe number of the seventh lens element is V7, an Abbe number of the eighth lens element is V8, and the following conditions are satisfied:

$$3.00 < TL/f < 6.00; \text{ and}$$

$$18.0 < V3+V7+V8 < 105.0.$$

22. The imaging optical lens assembly of claim 21, wherein the image-side surface of the fourth lens element is convex in a paraxial region thereof, the image-side surface of the sixth lens element is convex in a paraxial region thereof, the object-side surface of the seventh lens element is concave in a paraxial region thereof, and the object-side surface of the eighth lens element is convex in a paraxial region thereof.

23. The imaging optical lens assembly of claim 21, wherein the aperture stop is located between the first lens element and the third lens element; and wherein an Abbe number of the second lens element is V2, and the following condition is satisfied:

$$5.0 < V2 < 53.0.$$

24. The imaging optical lens assembly of claim 21, wherein the imaging optical lens assembly comprises at least one cemented lens set, the at least one cemented lens set is formed by cementing two adjacent lens elements together from among the first lens element, the second lens element, the third lens element, the fourth lens element, the fifth lens element, the sixth lens element, the seventh lens element and the eighth lens element, and two adjacent cemented surfaces of the two adjacent lens elements are both aspheric.

25. The imaging optical lens assembly of claim 21, wherein a focal length of the fourth lens element is f4, a curvature radius of the object-side surface of the fourth lens element is R7, and the following condition is satisfied:

$$0.00 \leq |f4/R7| < 1.20.$$

26. The imaging optical lens assembly of claim 21, wherein a central thickness of the fifth lens element is CT5, a central thickness of the eighth lens element is CT8, an axial distance between the aperture stop and the object-side surface of the third lens element is Dsr5, an axial distance between the aperture stop and the object-side surface of the fifth lens element is Dsr9, and the following conditions are satisfied:

$$0.18 < CT8/CT5 < 1.85;\text{ and}$$

$$0.00 < |Dsr5/Dsr9| < 0.90.$$

27. The imaging optical lens assembly of claim 21, wherein a curvature radius of the image-side surface of the seventh lens element is R14, a curvature radius of the object-side surface of the eighth lens element is R15, and the following condition is satisfied:

$$-0.08 < (R14 - R15)/(R14 + R15) < 6.00.$$

28. The imaging optical lens assembly of claim 21, wherein a displacement in parallel with an optical axis from an axial vertex of the object-side surface of the seventh lens element to a maximum effective radius position of the object-side surface of the seventh lens element is SAG7R1, a central thickness of the seventh lens element is CT7, and the following condition is satisfied:

$$-3.50 < SAG7R1/CT7 < -0.50.$$

29. The imaging optical lens assembly of claim 21, wherein the axial distance between the object-side surface of the first lens element and the image surface is TL, the focal length of the imaging optical lens assembly is f, a focal length of the second lens element is f2, a focal length of the third lens element is f3, a focal length of the eighth lens element is f8, an axial distance between the first lens element and the second lens element is T12, an axial distance between the third lens element and the fourth lens element is T34, a central thickness of the sixth lens element is CT6, a curvature radius of the object-side surface of the sixth lens element is R11, a curvature radius of the image-side surface of the sixth lens element is R12, the Abbe number of the third lens element is V3, the Abbe number of the seventh lens element is V7, the Abbe number of the eighth lens element is V8, and the following conditions are satisfied:

$$3.90 \leq TL/f \leq 5.50;\ 0.43 \leq (T12 + T34)/CT6 \leq 0.99;$$

$$-0.16 \leq f/f2 + f/f3 + f/f8 \leq 0.14;$$

$$0.32 \leq (R11 + R12)/(R11 - R12) \leq 1.51;\ \text{and}$$

$$56.4 \leq V3 + V7 + V8 \leq 99.9.$$

* * * * *